US012559310B2

(12) United States Patent　　　　　(10) Patent No.:　US 12,559,310 B2
Noar et al.　　　　　　　　　　　　(45) Date of Patent:　Feb. 24, 2026

(54) GRID FRAMEWORK STRUCTURE

(71) Applicant: Ocado Innovation Limited, Hatfield (GB)

(72) Inventors: Benjamin Arthur Portnoy Noar, Hatfield (GB); Pawel Karolinczak, Hatfield (GB); Andrew Ingram-Tedd, Hatfield (GB); Stephen Millward, Hatfield (GB); Christopher James Paton, Hatfield (GB)

(73) Assignee: OCADO INNOVATION LIMITED, Hatfield (GB)

( * ) Notice: Subject to any disclaimer, the term of this patent is extended or adjusted under 35 U.S.C. 154(b) by 293 days.

(21) Appl. No.: 18/041,515

(22) PCT Filed: Aug. 12, 2021

(86) PCT No.: PCT/EP2021/072532
　§ 371 (c)(1),
　(2) Date: Feb. 13, 2023

(87) PCT Pub. No.: WO2022/034187
　PCT Pub. Date: Feb. 17, 2022

(65) Prior Publication Data
　US 2024/0010425 A1　　Jan. 11, 2024

(30) Foreign Application Priority Data

Aug. 14, 2020　(GB) ..................................... 2012740
Aug. 14, 2020　(GB) ..................................... 2012751
(Continued)

(51) Int. Cl.
　*B65G 1/04*　　　(2006.01)
　*B65G 1/06*　　　(2006.01)
　*E04B 1/24*　　　(2006.01)

(52) U.S. Cl.
　CPC ......... *B65G 1/0457* (2013.01); *B65G 1/0464* (2013.01); *B65G 1/0478* (2013.01);
　(Continued)

(58) Field of Classification Search
　CPC ...... B65G 1/02; B65G 1/0492; B65G 1/0464; B65G 1/0478; B65G 1/065;
　(Continued)

(56) References Cited

U.S. PATENT DOCUMENTS 3,022,980 A　　2/1962　Barker
10,660,438 B2　5/2020　Hognaland et al.
(Continued)

FOREIGN PATENT DOCUMENTS

CA　　　3080839 A1　5/2019
CN　　　103612882 A　3/2014
(Continued)

OTHER PUBLICATIONS

First Office Action issued on Apr. 16, 2024, by the Japanese Patent Office in corresponding Japanese Patent Application No. 2023-510416, and an English Translation of the Office Action. (8 pages).
(Continued)

*Primary Examiner* — Glenn F Myers
(74) *Attorney, Agent, or Firm* — Buchanan Ingersoll & Rooney P.C

(57)　　　　　　ABSTRACT

A grid framework structure, configured to support one or more load handling devices, includes: a first set of grid members extending in a first direction and a second set of grid members extending in a second direction, to form a grid structure having grid cells. A plurality of vertical uprights create a storage space for storing containers in a stack such that load handling devices operative on the grid structure can lift containers through a grid cell from a stack below the grid structure. The vertical uprights are arranged such that a
(Continued)

section of the grid structure including four adjoined grid cells is supported by five or fewer vertical uprights.

23 Claims, 31 Drawing Sheets

(30)        Foreign Application Priority Data

| Sep. 4, 2020 | (GB) | ..................................... 2013968 |
| Sep. 10, 2020 | (GB) | ..................................... 2016081 |
| Oct. 9, 2020 | (GB) | ..................................... 2016097 |

(52) U.S. Cl.
CPC ............ *B65G 1/065* (2013.01); *E04B 1/2403* (2013.01); *E04B 2001/2406* (2013.01); *E04B 2001/2418* (2013.01)

(58) Field of Classification Search
CPC ........ B65G 2207/40; B65G 2201/0235; E04B 1/2403; E04B 1/24; E04B 1/18; E04B 2001/2406; E04B 2001/2463; E04B 2001/2421; E04B 2001/2418; E04B 2001/2415; E04B 2001/2448; E04B 2001/2439; F16M 1/00; F16M 7/00; B66C 7/00; B66C 7/08; B66C 6/00
See application file for complete search history.

(56)              References Cited

U.S. PATENT DOCUMENTS

| 2004/0182025 A1 | 9/2004 | Moutsokapas et al. |
| 2005/0252161 A1* | 11/2005 | Hovey ...................... E04B 1/24 |
| | | 52/837 |
| 2006/0003667 A1 | 1/2006 | Aisenbrey |
| 2008/0075566 A1 | 3/2008 | Benedict et al. |
| 2008/0213073 A1 | 9/2008 | Benedict et al. |
| 2013/0058029 A1* | 3/2013 | Ootani ................. H05K 7/1497 |
| | | 361/679.31 |
| 2013/0343844 A1 | 12/2013 | Fosnight et al. |
| 2016/0145058 A1 | 5/2016 | Lindbo |
| 2017/0305668 A1 | 10/2017 | Bestic et al. |
| 2017/0355524 A1 | 12/2017 | Hognaland |
| 2018/0035625 A1 | 2/2018 | Lindbo et al. |
| 2018/0037411 A1 | 2/2018 | Lindbo et al. |
| 2018/0044110 A1 | 2/2018 | Clarke et al. |
| 2018/0044111 A1 | 2/2018 | Clarke et al. |
| 2018/0050869 A1 | 2/2018 | Lindbo et al. |
| 2018/0051459 A1 | 2/2018 | Clarke et al. |
| 2018/0086559 A1 | 3/2018 | Lindbo et al. |
| 2018/0086573 A1 | 3/2018 | Lindbo |
| 2018/0093828 A1* | 4/2018 | Lindbo ................... A62C 3/002 |
| 2018/0148259 A1* | 5/2018 | Gravelle .................. B65G 1/04 |
| 2018/0160150 A1 | 6/2018 | Wu et al. |
| 2018/0162639 A1* | 6/2018 | Ingram-Tedd ....... B65G 1/1378 |
| 2018/0194571 A1* | 7/2018 | Fryer .................... B65G 45/10 |
| 2018/0237221 A1 | 8/2018 | Lindbo et al. |
| 2019/0019707 A1 | 1/2019 | Suzuki |
| 2019/0161273 A1 | 5/2019 | Ingram-tedd et al. |
| 2019/0233213 A1 | 8/2019 | Phan-quiroga et al. |
| 2019/0239640 A1 | 8/2019 | Lert et al. |
| 2019/0241362 A1 | 8/2019 | Lindbo et al. |
| 2020/0042563 A1 | 2/2020 | Hognaland |
| 2020/0130934 A1 | 4/2020 | Clarke et al. |
| 2020/0140196 A1 | 5/2020 | Clarke et al. |
| 2020/0148471 A1 | 5/2020 | Lindbo et al. |
| 2020/0208395 A1 | 7/2020 | Hall et al. |
| 2020/0216263 A1* | 7/2020 | Fjeldheim ............ B65G 1/0464 |
| 2020/0231381 A1 | 7/2020 | Lindbo et al. |
| 2020/0318338 A1* | 10/2020 | Austrheim ............ E04B 1/1903 |
| 2020/0343118 A1 | 10/2020 | Torazawa et al. |
| 2020/0361707 A1 | 11/2020 | Lindbo et al. |
| 2020/0391942 A1 | 12/2020 | Lindbo et al. |
| 2021/0169219 A1 | 6/2021 | Lert et al. |
| 2021/0179355 A1 | 6/2021 | Heggebøet al. |
| 2021/0309459 A1 | 10/2021 | Clarke et al. |
| 2023/0019883 A1* | 1/2023 | Austrheim ............. B65G 57/03 |
| 2023/0303323 A1 | 9/2023 | Millward et al. |
| 2023/0303325 A1 | 9/2023 | Kirby et al. |
| 2023/0303326 A1 | 9/2023 | Cogley et al. |
| 2023/0303327 A1 | 9/2023 | Malinowski et al. |

FOREIGN PATENT DOCUMENTS

| CN | 111139939 A | 5/2020 |
| CN | 211365948 U | 8/2020 |
| CN | 109230155 B | 2/2021 |
| DE | 202013007058 U1 | 11/2014 |
| EP | 0081960 A1 | 6/1983 |
| EP | 1116683 A1 | 7/2001 |
| EP | 3017932 A1 | 5/2016 |
| GB | 2012740 A | 8/1979 |
| GB | 2013968 A | 8/1979 |
| GB | 2016081 A | 9/1979 |
| GB | 2016097 A | 9/1979 |
| GB | 2554109 A | 3/2018 |
| GB | 2594559 A | 11/2021 |
| GB | 2594560 A | 11/2021 |
| JP | 3025818 B2 | 6/1996 |
| JP | 2000233812 A | 8/2000 |
| JP | 2003253797 A | 9/2003 |
| JP | 2004091095 A | 3/2004 |
| JP | 2019507714 A | 3/2019 |
| JP | 2020519551 A | 7/2020 |
| JP | 2023512658 A | 3/2023 |
| KR | 20170138396 A | 12/2017 |
| NO | 343387 B1 | 2/2019 |
| NO | 20200118 A1 | 8/2021 |
| WO | 2014195901 A1 | 12/2014 |
| WO | 2015019055 A1 | 2/2015 |
| WO | 2015185628 A2 | 12/2015 |
| WO | 2016029205 A1 | 2/2016 |
| WO | 2016063197 A1 | 4/2016 |
| WO | 2016166294 A1 | 10/2016 |
| WO | 2016172793 A1 | 11/2016 |
| WO | 2016193767 A1 | 12/2016 |
| WO | 2017081281 A1 | 5/2017 |
| WO | 2017122150 A1 | 7/2017 |
| WO | 2017153583 A1 | 9/2017 |
| WO | 2017220651 A1 | 12/2017 |
| WO | 2018049441 A1 | 3/2018 |
| WO | 2018146304 A1 | 8/2018 |
| WO | 2018210952 A1 | 11/2018 |
| WO | 2019032651 A1 | 2/2019 |
| WO | 2019087618 A1 | 5/2019 |
| WO | 2019094511 A1 | 5/2019 |
| WO | 2019101367 A1 | 5/2019 |
| WO | 2019101725 A1 | 5/2019 |
| WO | 2019157197 A1 | 8/2019 |
| WO | 2019238702 A1 | 12/2019 |
| WO | 2020074257 A1 | 4/2020 |
| WO | 2020092149 A1 | 5/2020 |
| WO | 2020094339 A1 | 5/2020 |
| WO | 2020224828 A1 | 11/2020 |
| WO | 2021152170 A1 | 8/2021 |
| WO | 2021175873 A1 | 9/2021 |
| WO | 2022048973 A1 | 3/2022 |

OTHER PUBLICATIONS

Office Action (Examination Report No. 1) issued on Jun. 7, 2024, by the Australian Patent Office in corresponding Australian Patent Application No. 2021399015. (4 pages).

Office Action issued on Jun. 27, 2024, by the Canadian Patent Office in corresponding Canadian Patent Application No. 3, 190,648. (6 pages).

Office Action issued on Jun. 28, 2024, by the Canadian Patent Office in corresponding Canadian Patent Application No. 3,190,629. (5 pages).

International Search Report (PCT/ISA/210) and Written Opinion (PCT/ISA/237) mailed on Nov. 11, 2021, by the European Patent

(56)                  References Cited

OTHER PUBLICATIONS

Office as the International Searching Authority for International Application No. PCT/EP2021/072532. (20 pages).

International Search Report (PCT/ISA/210) and Written Opinion (PCT/ISA/237) mailed on Nov. 12, 2021, by the European Patent Office as the International Searching Authority for International Application No. PCT/EP2021/072547. (20 pages).

International Search Report (PCT/ISA/210) and Written Opinion (PCT/ISA/237) mailed on Nov. 30, 2021, by the European Patent Office as the International Searching Authority for International Application No. PCT/EP2021/072539. (14 pages).

International Search Report (PCT/ISA/210) and Written Opinion (PCT/ISA/237) mailed on Nov. 5, 2021, by the European Patent Office as the International Searching Authority for International Application No. PCT/EP2021/072538. (12 pages).

International Search Report (PCT/ISA/210) and Written Opinion (PCT/ISA/237) mailed on Nov. 8, 2021, by the European Patent Office as the International Searching Authority for International Application No. PCT/EP2021/072536. (13 pages).

Patents Act 1977: Combined Search and Examination Report under Sections 17 and 18(3) dated Feb. 4, 2022 issued by the United Kingdom Intellectual Property Office in Application No. GB2111578.7. (3 pages).

Patents Act 1977: Combined Search and Examination Report under Sections 17 and 18(3) dated Feb. 4, 2022 issued by the United Kingdom Intellectual Property Office in Application No. GB2111587.8. (2 pages).

Patents Act 1977: Combined Search and Examination Report under Sections 17 dated Feb. 8, 2022 issued by the United Kingdom Intellectual Property Office in Application No. GB2111607.4. (9 pages).

Patents Act 1977: Examination Report under Sections 18(3) dated Nov. 9, 2022 issued by the United Kingdom Intellectual Property Office in Application No. GB2111607.4. (5 pages).

Patents Act 1977: Search Report under Sections 17 dated Dec. 14, 2021 issued by the United Kingdom Intellectual Property Office in Application No. GB2109567.4. (1 page).

Patents Action 1977: Combined Search and Examination Report under Section 17 & 18(3) dated Feb. 4, 2022 issued by the United Kingdom Intellectual Property Office in Application No. GB2111597.7. (4 pages).

Patents Action 1977: Combined Search and Examination Report under Section 17 and 18(3) dated Feb. 8, 2023, issued by the United Kingdom Intellectual Property Office in Application No. GB2218269.5. (5 pages).

Patents Action 1977: Combined Search and Examination Report under Sections 17 & 18(3) dated Feb. 4, 2022 issued by the United Kingdom Intellectual Property Office in Application No. GB2111582.9. (5 pages).

Patents Action 1977: Search Report under Section 17 dated Feb. 1, 2022 issued by the United Kingdom Intellectual Property Office in Application No. GB2111587.8. (1 page).

Patents Action 1977: Search Report under Section 17 dated Feb. 3, 2022 issued by the United Kingdom Intellectual Property Office in Application No. GB2111578.7. (2 pages).

Patents Action 1977: Search Report under Section 17(5) dated Feb. 15, 2021 issued by the United Kingdom Intellectual Property Office in Application No. GB2012751.0. (4 pages).

Patents Action 1977: Search Report under Section 17(5) dated Feb. 7, 2021 issued by the United Kingdom Intellectual Property Office in Application No. GB2012740.3. (3 pages).

Patents Action 1977: Search Report under Section 17(5) dated Jun. 16, 2021 issued by the United Kingdom Intellectual Property Office in Application No. GB2016081.8. (3 pages).

Patents Action 1977: Search Report under Section 17(5) dated May 20, 2021 issued by the United Kingdom Intellectual Property Office in Application No. GB2016097.4. (4 pages).

Office Action issued on Jun. 3, 2024, by the Canadian Patent Office in corresponding Canadian Patent Application No. 3,191,155. (8 pages).

Office Action issued on Jun. 3, 2024, by the Canadian Patent Office in corresponding Canadian Patent Application No. 3,191,324. (4 pages).

Office Action issued on Jun. 4, 2024, by the Canadian Patent Office in corresponding Canadian Patent Application No. 3,190,958. (4 pages).

The extended European Search Report issued on Jun. 14, 2024, by the European Patent Office in corresponding European Application No. 24164309.7. (11 pages).

Office Action issued on Dec. 30, 2024, by the U.S. Patent and Trademark Office in co-pending U.S. Appl. No. 18/041,530. (12 pages).

First Office Action issued on Feb. 13, 2024, by the Japanese Patent Office in corresponding Japanese Patent Application No. 2023-510417, and an English Translation of the Office Action. (6 pages).

First Office Action issued on Feb. 13, 2024, by the Japanese Patent Office in corresponding Japanese Patent Application No. 2023-510419, and an English Translation of the Office Action. (8 pages).

First Office Action issued on Mar. 19, 2024, by the Japanese Patent Office in corresponding Japanese Patent Application No. 2023-510421, and an English Translation of the Office Action. (10 pages).

Office Action (Examination Report No. 1) issued on Apr. 17, 2024, by the Australian Patent Office in corresponding Australian Patent Application No. 2021325368. (4 pages).

Office Action (Examination Report No. 1) issued on Apr. 4, 2024, by the Australian Patent Office in corresponding Australian Patent Application No. 2021324116. (4 pages).

Office Action (Examination Report No. 1) issued on Jan. 15, 2024, by the Australian Patent Office in corresponding Australian Patent Application No. 2021325730. (4 pages).

Office Action (Examination Report No. 1) issued on Jan. 30, 2024, by the Australian Patent Office in corresponding Australian Patent Application No. 2021325729. (4 pages).

Office Action (Examination Report No. 1) issued on Mar. 22, 2024, by the Australian Patent Office in corresponding Australian Patent Application No. 2021324385. (4 pages).

Office Action issued on Jan. 15, 2025 by the Australian Patent Office in corresponding Australian Application No. 2021324116 (4 pages) corresponding to Applicant's U.S. Appl. No. 18/041,515.

Office Action issued on Feb. 25, 2025 by the Korean Patent Office in corresponding Korean Application No. 10-2023-7008087 (9 pages) corresponding to Applicant's U.S. Appl. No. 18/041,515.

Office Action issued on Apr. 16, 2025 by the European Patent Office in corresponding European Application No. 21762447.7 (9 pages) corresponding to Applicant's U.S. Appl. No. 18/041,515.

* cited by examiner

700
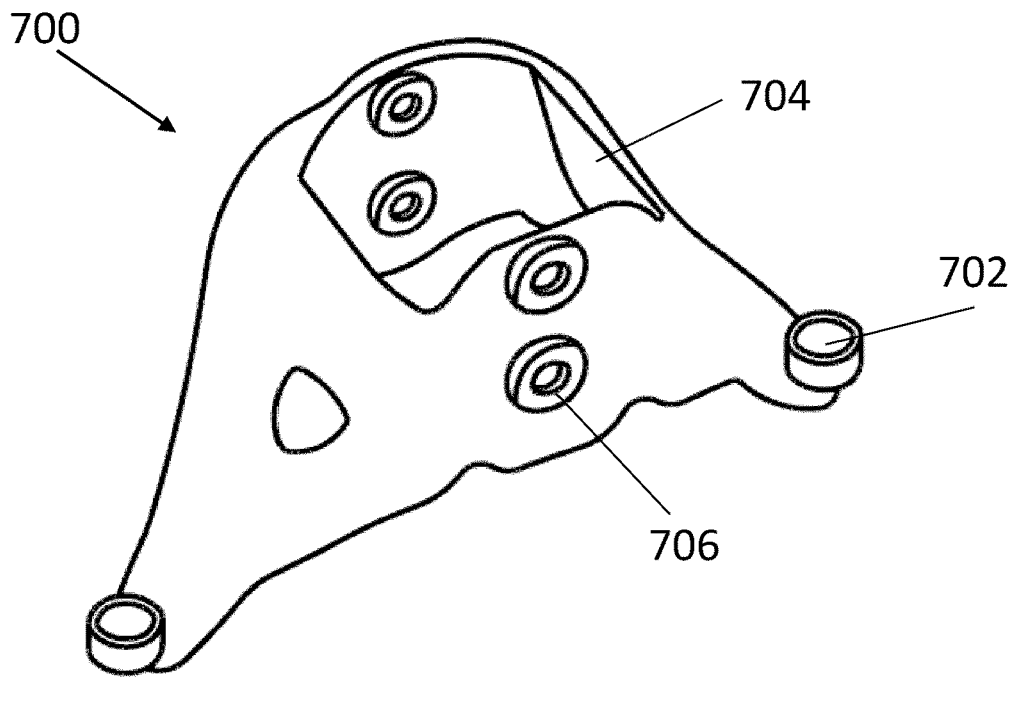
704
702
706
(a)
716
700
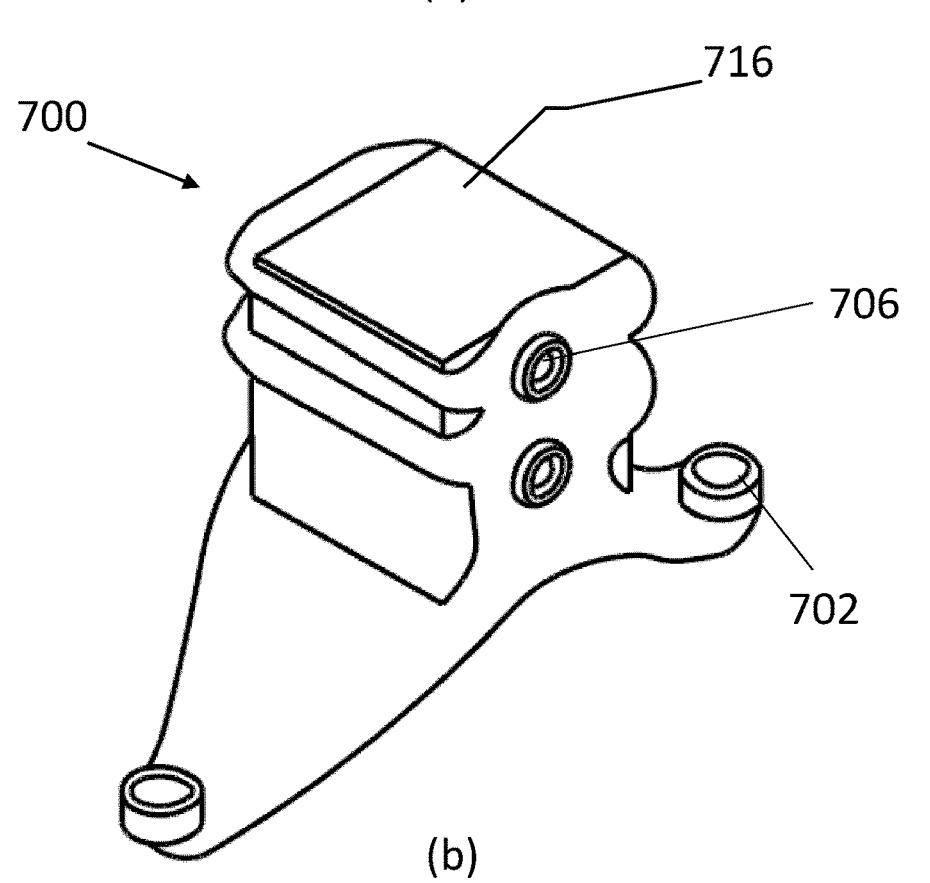
706
702
(b)
Figure 37

GRID FRAMEWORK STRUCTURE

FIELD OF INVENTION

The present invention relates to the field of remotely operated load handling devices on tracks located on a grid framework structure for handling storage containers or bins stacked in the grid framework structure, more specifically to a grid framework structure for supporting the remotely operated load handling devices.

BACKGROUND

Storage systems 1 comprising a three-dimensional storage grid framework structure, within which storage containers/bins are stacked on top of each other, are well known. PCT Publication No. WO2015/185628A (Ocado) describes a known storage and fulfilment or distribution system in which stacks of bins or containers are arranged within a grid framework structure. The bins or containers are accessed by load handling devices remotely operative on tracks located on the top of the grid framework structure. A system of this type is illustrated schematically in FIGS. 1 to 3 of the accompanying drawings.

As shown in FIGS. 1 and 2, stackable containers, known as storage bins or containers 10, are stacked on top of one another to form stacks 12. The stacks 12 are arranged in a grid framework structure 14 in a warehousing or manufacturing environment. The grid framework is made up of a plurality of storage columns or grid columns. Each grid in the grid framework structure has at least one grid column for storage of a stack of containers. FIG. 1 is a schematic perspective view of the grid framework structure 14, and FIG. 2 is a top-down view showing a stack 12 of bins 10 arranged within the framework structure 14. Each bin 10 typically holds a plurality of product items (not shown), and the product items within a bin 10 may be identical, or may be of different product types depending on the application.

In detail, the grid framework structure 14 comprises a plurality of vertical uprights or upright members or upright columns 16 that support horizontal grid members 18, 20. A first set of parallel horizontal grid members 18 is arranged perpendicularly to a second set of parallel horizontal grid members 20 to form a grid structure or grid 15 comprising a plurality of grid cells 17. The grid cell has an opening to allow a load handling device to lift a container or storage bin through the grid cell. In the grid structure, the first set of parallel horizontal grid members 18 intersect the second set of parallel horizontal grid members at nodes. The grid structure is supported by the upright members 16 at each of the nodes or at the point where the grid members intersect such that the upright members are interconnected at their tops ends by the intersecting grid members. The grid members 16, 18, 20 are typically manufactured from metal and typically welded or bolted together or a combination of both. The storage bins or containers 10 are stacked between the upright members 16 of the grid framework structure 14, so that the upright members 16 guards against horizontal movement of the stacks 12 of bins and guides vertical movement of the storage bins 10.

The top level of the grid framework structure 14 includes rails 22 arranged in a grid pattern across the top of the stacks 12. Referring additionally to FIG. 3, the rails 22 support a plurality of load handling devices 30. A first set 22a of parallel rails 22 guide movement of the robotic load handling devices 30 in a first direction (for example, an X-direction) across the top of the grid framework structure 14, and a second set 22b of parallel rails 22, arranged perpendicular to the first set 22a, guide movement of the load handling devices 30 in a second direction (for example, a Y-direction), perpendicular to the first direction. In this way, the rails 22 allow movement of the robotic load handling devices 30 laterally in two dimensions in the horizontal X-Y plane, so that a load handling device 30 can be moved into position above any of the stacks 12.

A known load handling device otherwise known as a bot 30 shown in FIGS. 4 and 5 comprising a vehicle body 32 is described in PCT Patent Publication No. WO2015/019055 (Ocado), hereby incorporated by reference, where each load handling device 30 only covers a single grid space or grid cell of the grid framework structure 14. Here, the load handling device 30 comprises a wheel assembly comprising a first set of wheels 34 consisting of a pair of wheels on the front of the vehicle body 32 and a pair of wheels 34 on the back of the vehicle body 32 for engaging with the first set of rails or tracks to guide movement of the device in a first direction and a second set of wheels 36 consisting of a pair of wheels 36 on each side of the vehicle body 32 for engaging with the second set of rails or tracks to guide movement of the device in a second direction. Each of the sets of wheels are driven to enable movement of the vehicle in X and Y directions respectively along the rails. One or both sets of wheels can be moved vertically to lift each set of wheels clear of the respective rails, thereby allowing the vehicle to move in the desired direction, e.g. X or Y direction on the grid structure.

The load handling device 30 is equipped with a lifting device or crane mechanism to lift a storage container from above. The crane mechanism comprises a winch tether or cable 38 wound on a spool or reel (not shown) and a grabber device 39 in the form of a lifting frame. The lifting device comprise a set of lifting tethers 38 extending in a vertical direction and connected nearby or at the four corners of the lifting frame 39, otherwise known as the grabber device (one tether near each of the four corners of the grabber device) for releasable connection to a storage container 10. The grabber device 39 is configured to releasably grip the top of a storage container 10 to lift it from a stack of containers in a storage system of the type shown in FIGS. 1 and 2.

The wheels 34, 36 are arranged around the periphery of a cavity or recess, known as a container-receiving recess or container receiving space 41, in the lower part. The recess is sized to accommodate the container 10 when it is lifted by the crane mechanism, as shown in Figure (a and b). When in the recess, the container is lifted clear of the rails beneath, so that the vehicle can move laterally to a different location. On reaching the target location, for example another stack, an access point in the storage system or a conveyor belt, the bin or container can be lowered from the container receiving portion and released from the grabber device. The container receiving space may comprise a cavity or recess arranged within the vehicle body, e.g. as described in WO 2015/019055 (Ocado Innovation Limited). Alternatively, the vehicle body of the load handling device may comprise a cantilever as taught in WO2019/238702 (Autostore Technology AS) in which case the container receiving space is located below a cantilever of the load handing device. In this case, the grabber device is hoisted by a cantilever such that the grabber device is able to engage and lift a container from a stack into a container receiving space below the cantilever.

To ensure stability of the grid framework structure, prior art storage systems are largely dependent on various supports and bracing arranged within or at least partly along the periphery of the grid framework structure. However, the use of various supports and bracing (anti-movement braces) to stabilise the grid framework structure from internal and external forces is disadvantageous for a number of reasons. The grid framework structure occupies space or area which could be utilised to store containers; in that it prevents optimum usage of available space or area for the storage of containers. The need of a supporting structure may limit the available options for positioning of the grid framework structure since any auxiliary grid supporting structure often requires connection to a surrounding structure such as the inner walls of a building. The requirement of a supporting structure to stabilise the grid framework structure is generally not cost efficient and occupies useful storage space.

WO2019/101367 (Autostore Technology AS) teaches a free-standing storage grid requiring a less extensive auxiliary grid supporting structure by integrating a grid supporting structure in the storage grid structure. The grid supporting structure is made up of four storage columns interconnected by multiple vertically inclined support struts. The storage column profiles have a cross-section comprising a hollow centre section and four corner sections, each corner section comprises two perpendicular bin guiding plates for accommodating a corner of a storage bin. The support struts have a width which allows them to fit in between two parallel guiding plates so as to not compromise the ability of the storage columns to accommodate a stack of containers or storage bins.

To erect the grid framework structure in the art, a plurality of vertical uprights are individually positioned in a grid-like pattern on the ground. The height of the vertical uprights, and thus the level of the grid mounted thereon, is adjusted by one or more adjustable feet at the base or bottom end of each of the vertical uprights. A sub-group of the vertical uprights are braced together to provide structural stability to the grid framework structure. The vertical uprights are interconnected at their top ends by grid members so that the grid members adopt the same grid pattern as the vertical uprights, i.e. the vertical uprights support the grid members at the points where the grid members intersect in the grid pattern. For the purpose of explanation of the present invention, the points or junctions where the grid members intersect or are interconnected constitute the nodes of the grid structure and correspond to the area where the grid structure is supported by a vertical upright. The resultant grid framework structure can be considered as a free standing rectilinear assemblage of upright columns supporting the grid formed from intersecting horizontal grid members, i.e. a four wall shaped framework.

The arrangement of the vertical uprights provides multiple vertical storage columns for the storage of one or more containers in a stack. The vertical uprights help to guide the grabber device of the lifting mechanism as it engages with a container within the grid framework structure and is lifted towards the load handling device operative on the grid. The size of the grid framework structure, and thus the ability to store containers containing different items or stock keeping units (SKUs), is largely dependent on the number of vertical uprights spanning over a given footprint of the grid framework structure. However, one of the biggest bottlenecks in the building of a fulfilment or distribution centre is the erection of the grid framework structure. The time and cost to assemble the grid framework structure represents a huge proportion of the time and cost to build a fulfilment or distribution centre. The biggest and the more time consuming operation involves erecting the vertical uprights individually and fixing the grid structure to the vertical uprights.

A grid framework structure is thus required that allows the grid framework structure to be erected quicker and/or cheaper than current grid framework structures in the art. Moreover, the grid framework structure should also maximise the available space or area for the storage of multiple containers.

This application claims priority from GB patent application numbers GB2012740.3 filed 14 Aug. 2020, GB2012751.0 filed 14 Aug. 2020, GB2013968.9 filed 4 Sep. 2020, GB2016081.8 filed 9 Oct. 2020, and GB2016097.4 filed 9 Oct. 2020, the contents being herein incorporated by reference.

SUMMARY OF INVENTION

The present invention has mitigated the above problem by providing a grid framework structure configured to support one or more load handling devices thereupon, said grid framework structure comprising:

i) a first set of grid members extending in a first direction;

ii) a second set of grid members extending in a second direction, the first direction being substantially perpendicular to the second direction to form a grid structure comprising a plurality of grid cells lying in a horizontal plane; and ii) a plurality of vertical uprights for supporting the grid structure above the ground to create a space for the storage of one or more containers in a stack such that, in use, one or more load handling devices operative on the grid is able to lift one or more containers through a grid cell from a stack below the grid structure;

characterised in that:

the plurality of vertical uprights are arranged such that a section of the grid structure comprising four adjoined grid cells is supported by five or fewer vertical uprights.

Conventional wisdom in the industry is of the opinion that the grid structure is supported by a vertical upright at each node or junction where the grid members intersect or are interconnected in order to: (i) support one or more load handling devices operative on the grid structure; and (ii) to help guide the grabber device of the load handling device into engagement with a container in a stack. Each of the vertical uprights can be considered to function as a structural element under compression for supporting the grid structure above. However, in contradistinction to conventional wisdom, the present invention has realised that the grid structure can be supported by fewer vertical uprights than are currently required at each node of the grid structure. More specifically, the support of the grid structure is such that a section or portion of the grid structure comprising four adjoined grid cells can be supported by five or fewer vertical uprights. For the purpose of the present invention, the term "adjoined" in the context of the grid structure is limited to a collection of four adjacent grid cells, i.e. each of the grid cells in the section are directly adjacent to each other or in a 2×2 grid arrangement. In the present invention, a section of or at least a portion of the grid structure comprising four adjoined grid cells is supported by five or fewer vertical uprights. The section of four adjoined grid cells can be anywhere within the grid structure. Optionally, the section of the grid structure comprises a corner section of the grid structure.

There are different examples of the present invention where this is possible. In a first embodiment of the present invention, preferably, the grid structure has a rectangular or square configuration comprising four corner sections, each corner section being supported by a single vertical upright.

5
6

By supporting the grid structure at the corners of the grid structure, an open storage space is created below the grid structure for the storage of one or more containers in a stack. Whilst conventional wisdom requires that the grabber device of the lifting mechanism and the containers in a stack below the grid structure are guided along a storage column at all four corners of a container cooperating with the vertical uprights as it is lifted or hoisted towards the load handling device operative on the grid structure so as to prevent the containers from swinging side to side, the present invention defies such conventional wisdom by allowing the containers to be lifted in free space towards the grid, i.e. without vertical uprights to guide the containers. In the present invention, it is realised that the grabber device and the lifting tethers used to engage and lift a container from storage towards the grid structure is stable enough to sufficiently lift the container vertically through a grid cell towards the load handling device without excessive swaying or fouling or hitting the grid cell or another container from an adjacent stack as the container approaches the grid. Typically, the load handling device is equipped with a lifting device or crane device arranged to lift a storage container from above. The lifting device comprises a set of lifting tethers extending in a vertical direction and connected at the four corners of a lifting frame, otherwise known as a grabber device (one tether near each of the four corners of the grabber device) for releasable connection to a storage container. The grabber device is configured to releasably grip the top of a storage container to lift it from a stack of containers in a storage system of the type shown in FIGS. 1 and 2. The lifting tethers supporting the grabber device at the four corners is sufficiently stable as it is hoisted in a near vertical direction towards the grid structure along a vertical axis with little or no swaying of the grabber device and the container engaged thereon.

This allows multiple adjacent stacks of containers to be stored side by side, each stack of containers located below a respective grid cell such that a load handling device operative on the grid structure is able to hoist the relevant container from storage. The removal of the vertical uprights for guiding the containers towards the grid structure minimises the effect of the vertical uprights impacting on the available space or area for the storage of containers. As a result, stacks of one or more containers can be stored closer together and therefore occupy spaces that were once occupied by the vertical uprights.

To improve the structural integrity and stability of the grid framework structure as a free standing structure, preferably, the vertical uprights are braced by at least one bracing member. Optionally, the at least one bracing member extends longitudinally between the tops of the vertical uprights to form a substantially rectangular or square perimeter bracing structure or frame. Optionally, the at least one bracing member is a diagonal bracing member or a straight horizontal bracing member. Bracing the four vertical uprights by a straight horizontal bracing member forms at least one drag strut or collector commonly known in the art. A drag strut or collector is where at least two vertical uprights are braced by the horizontal frame beams at the top of the two vertical uprights and functions to collect and transfer diaphragm shear forces to the vertical uprights.

To further conserve space taken up by the vertical uprights, preferably, the plurality of vertical uprights comprises four vertical frame members arranged in a rectangular or square configuration to accommodate one or more grid cells so that one or more containers can be stacked between the four vertical frame members. Assembling the plurality of vertical uprights to accommodate or support one or more grid cells for the storage of one or more containers in one or more stacks allows the vertical upright supporting the grid structure to double up as a storage column for storing one or more containers in multiple stacks. Optionally, the four vertical frame members are configured to accommodate a single grid cell such that the vertical upright provides a storage column for a single stack of containers. The four vertical frame members of the vertical upright are able to guide one or more containers stored between the four vertical frame members towards the grid structure. While not strictly necessary, this additional function of guiding the containers in their vertical motion may be advantageous in some examples. To provide structural integrity to the vertical upright, optionally at least two or a pair of the four vertical frame members are braced together by at least one diagonal bracing member. Optionally, the braced vertical frame members form a vertical truss. The braced vertical frame members constituting a vertical upright provide increased structural support to the grid structure to resist lateral forces.

It is not necessary to engage or accommodate all four corners of a container along the vertical uprights as the container is hoisted towards the grid structure by the lifting mechanism of the load handling device. In another embodiment of the present invention, the plurality of vertical uprights are arranged to support the grid or grid structure at alternate nodes in the first direction (e.g. x direction) and in the second direction (e.g. y direction) such that the one or more containers are stacked between two vertical uprights and are guided by the two vertical uprights. By supporting the grid structure at alternative nodes or intersections, half of the number of vertical uprights will be needed to support the grid structure. Additionally, the grabber device and the container is only accommodated at two of its corners with the vertical uprights. Preferably, the vertical uprights are arranged to engage with a pair of diagonally opposing corners of the grabber device and the containers, i.e. the grabber device and/or the containers are guided along their diagonally opposing corners. This gives the grabber device and the containers a level of lateral stability in the X and Y direction as the container is hoisted along diagonally opposed vertical uprights.

In a further embodiment of the present invention, the vertical uprights are braced together by at least one brace member extending from each of the vertical uprights to form a modular frame. For example, four vertical uprights can be braced together by at least one brace member extending from each of the four vertical uprights to form a modular box frame. Preferably, the grid structure is supported by one or more modular frames, i.e. the grid structure is able to extend across multiple modular frames. The grid structure is supported by the modular frames so that each of the one or more modular frames supports a plurality of a grid cells, thereby providing a storage volume for the storage of multiple stacks of containers. Multiple modular frames can be assembled together to create a larger storage volume than can be provided by a single modular frame. The modular frames are easily transportable and can be assembled together to create a space for the storage of containers in a stack. For example, the modular frames can be container frames, e.g. shipping container frames. Preferably, the one or more modular frames are arranged in a stack such that the one or more stacks of containers extends through the one or more modular frames. Individual containers are stacked in vertical layers, and their locations in the grid framework structure or "hive" may be indicated using co-ordinates in three dimensions to represent the load handling device or a container's position and a container depth (e.g. container at (X, Y, Z), depth W). Equally, locations in the grid framework structure may be indicated in two dimensions to represent the load handling device or a container's position and a container depth (e.g. container depth (e.g. container at (X, Y), depth Z). For example, Z=1 identifies the uppermost layer of the grid, i.e. the layer immediately below the rail system, Z=2 is the second layer below the rail system and so on to the lowermost, bottom layer of the grid. The modular frames can be stacked on top of each other to increase the height of the grid framework structure and thus increase the depth Z value, thereby allowing containers stacked vertically to extend through one or more modular frames.

By using fewer vertical uprights to support the grid structure, more emphasis is shifted towards strengthening the grid structure. In yet a further embodiment of the present invention, said grid structure comprises:

i) an upper grid structure; and ii) a lower grid structure, each of the upper and the lower grid structures comprising a first set of grid members extending in the first direction and a second set of grid members extending in the second direction to form a plurality of grid cells, the upper grid structure being vertically spaced from the lower grid structure such that the grid cells in the upper grid structure are in registration with the grid cells in the lower grid structure, wherein the upper grid structure and the lower grid structure are connected together by a plurality of diagonal and straight bracing members to form an assembly of trusses.

To enable the grid structure to resist vertical and lateral forces as a result of one or more load handling devices travelling on the grid structure while remaining lightweight to provide a rigid structure, the grid structure can be formed from an assembly of trusses. The upper grid structure and lower grid structure connected together by a plurality of diagonal and straight bracing members can be regarded as a truss assembly comprising a plurality of equally spaced, parallel trusses lying in a horizontal plane. Each of the plurality of trusses can be considered as comprising an upper elongated truss member (upper chord) and a lower elongated truss member (lower chord) connected together by one or more diagonal braces and one or more straight vertical webs. The upper and lower elongated truss members form top or upper and bottom or lower chords of an individual truss. The top chord is typically placed in compression and the bottom chord is typically placed in tension under the weight of one or more load handling devices operative on the grid structure. The plurality of trusses are connected together in a parallel arrangement but are separated or spaced apart by a plurality of straight horizontal upper cross webs between neighbouring upper elongated truss members. Equally, a plurality of straight horizontal lower cross webs connect between neighbouring lower elongated truss members. The plurality of straight horizontal upper cross webs are substantially equally spaced or separated along the longitudinal length of the upper elongated truss members such that the upper elongated truss members and the plurality of straight horizontal upper cross webs connecting adjacent trusses together are arranged in a grid like pattern to form a grid structure (upper grid structure) comprising a plurality of grid cells. Equally, the plurality of straight horizontal lower cross webs are substantially equally spaced along the longitudinal length of the lower elongated truss members such that the lower elongated truss members and the plurality of straight horizontal lower cross webs connecting adjacent trusses together are arranged in a grid like pattern to form a grid structure (lower grid structure) comprising a plurality of grid cells.

Preferably, the plurality of diagonal and straight bracing members extend between either opposing first set or second set of grid members in the upper and lower grid structure. Optionally, the plurality of diagonal bracing members are arranged to form a K brace between the opposing first set or second set of grid members in the upper grid structure and the lower grid structure. However, other bracing assemblies are permissible in the present invention including but are not limited to an X brace.

To permit one or more load handling devices to travel on the grid structure, preferably a plurality of tracks are mounted to the upper grid structure. Optionally, the first set of grid members comprises a first set of tracks and the second set of grid members comprises a second set of tracks. Optionally, the first set of grid members comprises a first set of track supports and the second set of grid members comprises a second set of track supports. Optionally, the first set of tracks are snap fitted to the first set of track supports and the second set of tracks are snap fitted to the second set of track supports of the upper grid structure. Equally plausible in the present invention is that the plurality of tracks can be integrated into the first and second set of track supports such that the grid members of the upper grid structure comprises both the tracks and the track supports.

Optionally, the grid structure is fabricated from a fibre reinforced composite material. In yet another option, the grid structure is fabricated from a polymer material.

For the purpose of all of the embodiments of the present invention, the grid members can comprise the tracks integrated into the grid members or equally, the tracks can be a separate component to the grid members and the tracks can be mounted to the grid members. Where the tracks are mounted to the grid members, the grid members comprise a track support and the track is mounted to the track support. For the purpose of the present invention, the track can either comprise a single track or a double track. A double track allows two load handling devices to pass side-by-side.

The present invention further provides a storage system comprising:

i) a grid framework structure as defined above;

ii) a plurality of a stack of containers located below the grid structure, wherein each of the stack of containers occupies a single grid space or grid cell;

iii) one or more load handling devices remotely operated to move the one or more containers stored in the grid framework structure, each of the one or more load handling devices comprising:

i) a wheel assembly for guiding the load handling device on the grid structure;

ii) a container-receiving space located above the grid structure; and iii) a lifting device arranged to lift a single container from a stack into the container-receiving space.

Preferably, the lifting device comprises a lifting drive assembly and a grabber device configured, in use, to releasably grip a container and lift a container from the stack into the container-receiving space and a driving mechanism operatively arranged for moving the load handling device on the grid structure.

Optionally, the vehicle body of the load handling device may comprise a cantilever as taught in WO2019/238702 (Autostore Technology AS) in which case the container receiving space is located below a cantilever of the load handing device. In this case, the grabber device is hoisted by a cantilever such that the grabber device is able to engage and lift a container from a stack into a container receiving space below the cantilever.

Further features of the present invention will be apparent from the detailed description with reference to the drawings.

DESCRIPTION OF DRAWINGS

Further features and aspects of the present invention will be apparent from the following detailed description of an illustrative embodiment made with reference to the drawings, in which:

FIG. 13 is a perspective view of a storage system comprising a grid framework structure according to a first embodiment of the present invention.

FIG. 25 is a top plan view of a section of neighbouring grid structures from four adjacent modular units, each modular unit comprising the grid framework structure of FIG. 23.

FIG. 37 (a and b) is a perspective view of an anchor foot for anchoring the vertical uprights to the floor according to an embodiment of the present invention.

FIG. 41 (a and b) is a perspective view of the adjustable grid levelling mechanism according to an embodiment of the present invention.

DETAILED DESCRIPTION

Figures 6, 7:
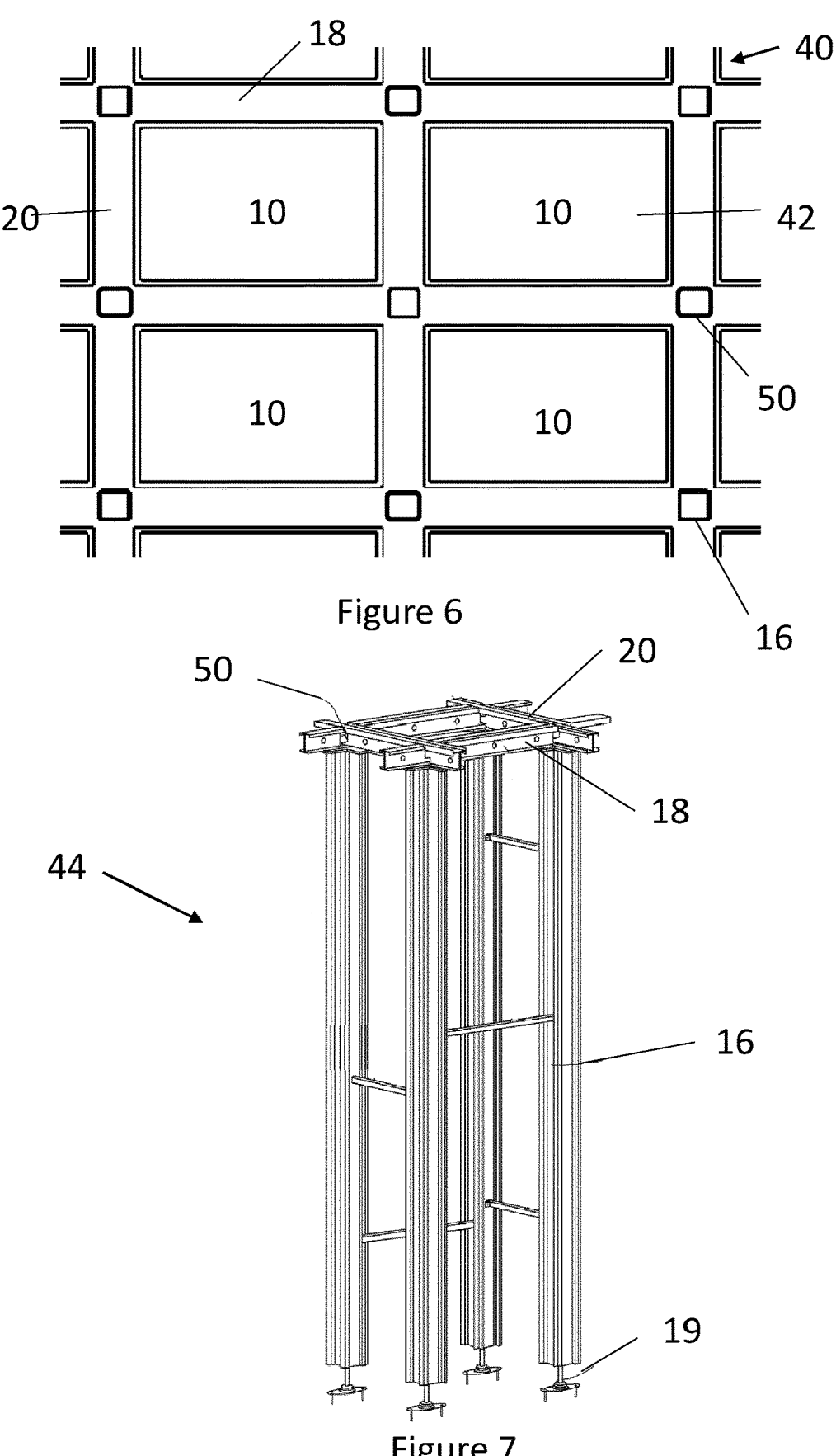
FIG. 6 is a top plan view of a section of a known grid structure comprising four adjoined grid cells showing the intersections or nodes of the grid members being supported by a vertical upright, each of the grid cells constituting a storage column.
FIG. 7 is a perspective view showing four vertical uprights making up a storage space or storage column within a grid framework structure.

It is against the known features of the storage system such as the grid framework structure and the load handling device described above with reference to FIGS. 1 to 5, that the present invention has been devised. FIG. 6 shows a top view of a section or a portion of a traditional grid structure 40 comprising four adjoined grid cells 42 and FIG. 7 shows a perspective side view of a single grid cell 42 supported by four vertical uprights 16 to form a single storage column 44 for the storage of one or more containers 10 in a stack. For the purpose of the present invention, the term "adjoined" is construed to mean that each grid cell in a section of the grid structure 40 is directly adjacent to each other in the section either diagonally or laterally as shown in FIG. 6. For example, the term "adjoined" does not include a grid cell in a section that is not directly adjacent to another grid cell in the section.

Each of the vertical uprights 16 is generally tubular. In transverse cross-section in the horizontal plane of the storage column 44 shown in FIG. 2, each of the vertical uprights 16 comprises a hollow centre section 46 (typically a box section) with one or more guides 48 mounted to or formed at the corners of the hollow centre section 46 that extends along the longitudinal length of the vertical upright 16 for guiding the movement of the containers along the storage column 44. The one or more guides 48 comprises two perpendicular container guiding plates. The two perpendicular container guiding plates are arranged to accommodate a corner of a container or a corner of a stack of containers. In other words, each of the corners of the hollow centre section 46 defines two sides of a substantially triangular area which may accommodate a corner of a container or storage bin. The corners are evenly arranged around the hollow centre section 46, such that multiple vertical uprights 16 may provide multiple adjacent storage columns, wherein each vertical upright 16 may be common or shared for up to four separate storage columns. Also shown in FIG. 7 is that each of the vertical uprights 16 are mounted on an adjustable grid levelling mechanism 19 at the foot of the vertical uprights comprising a base and a threaded shaft that can be extended or retracted to compensate for an uneven floor.

Figure 1:
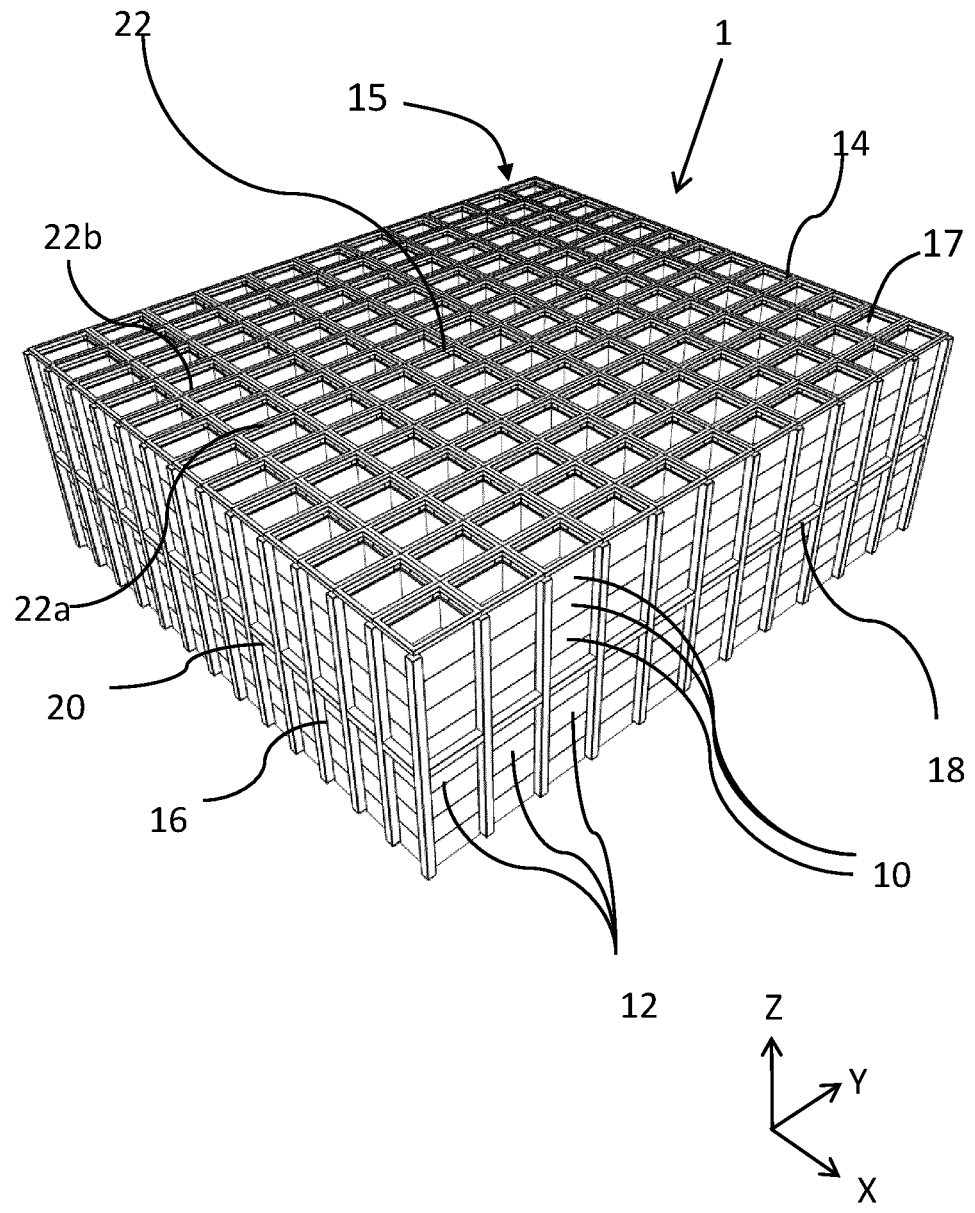
FIG. 1 is a schematic diagram of a grid framework structure according to a known system.
Figure 2:
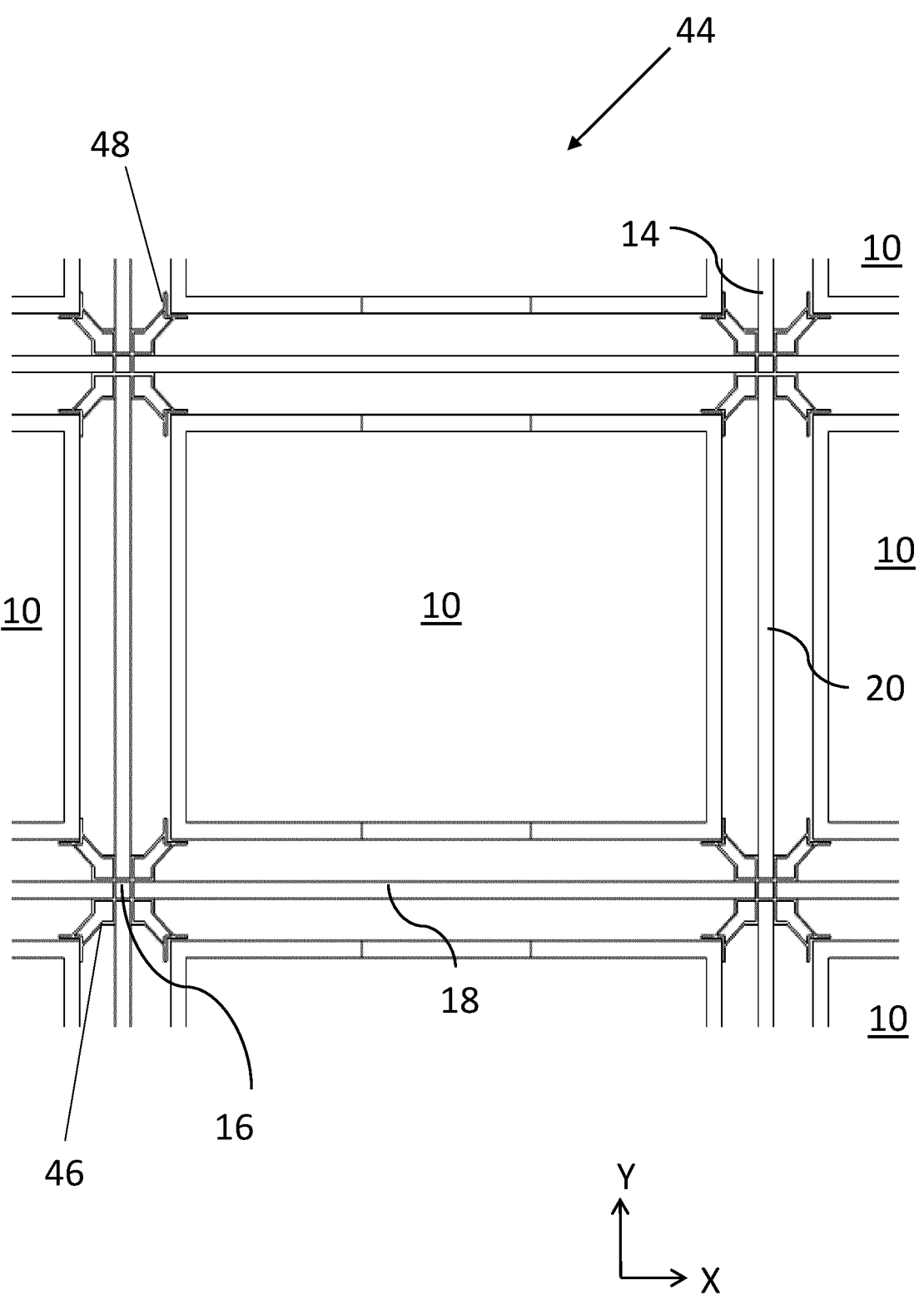
FIG. 2 is a schematic diagram of a top down view showing a stack of bins arranged within the framework structure of FIG. 1.
Figure 3:
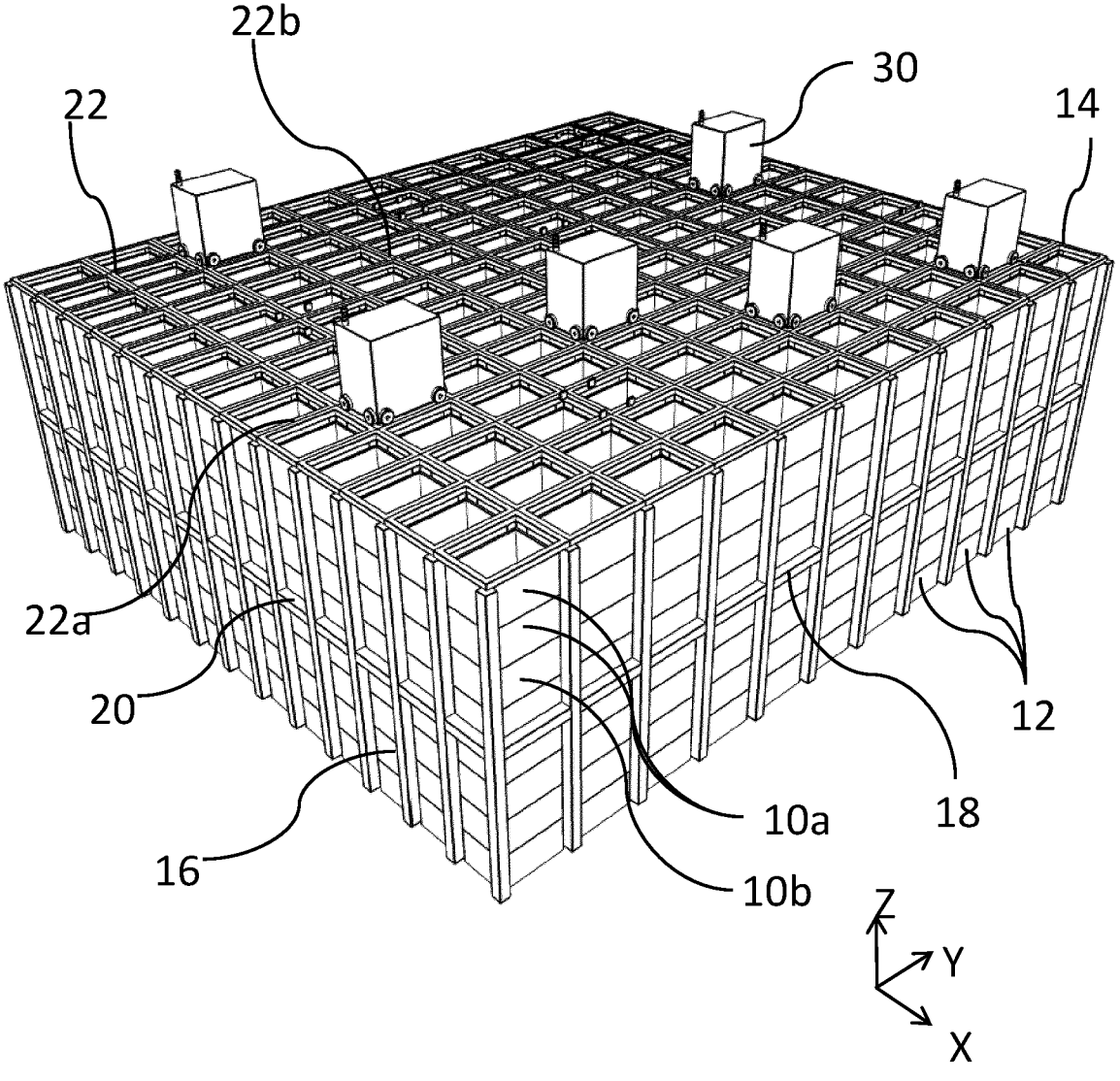
FIG. 3 is a schematic diagram of a known storage system of a load handling device operating on the grid framework structure.
Figure 4:
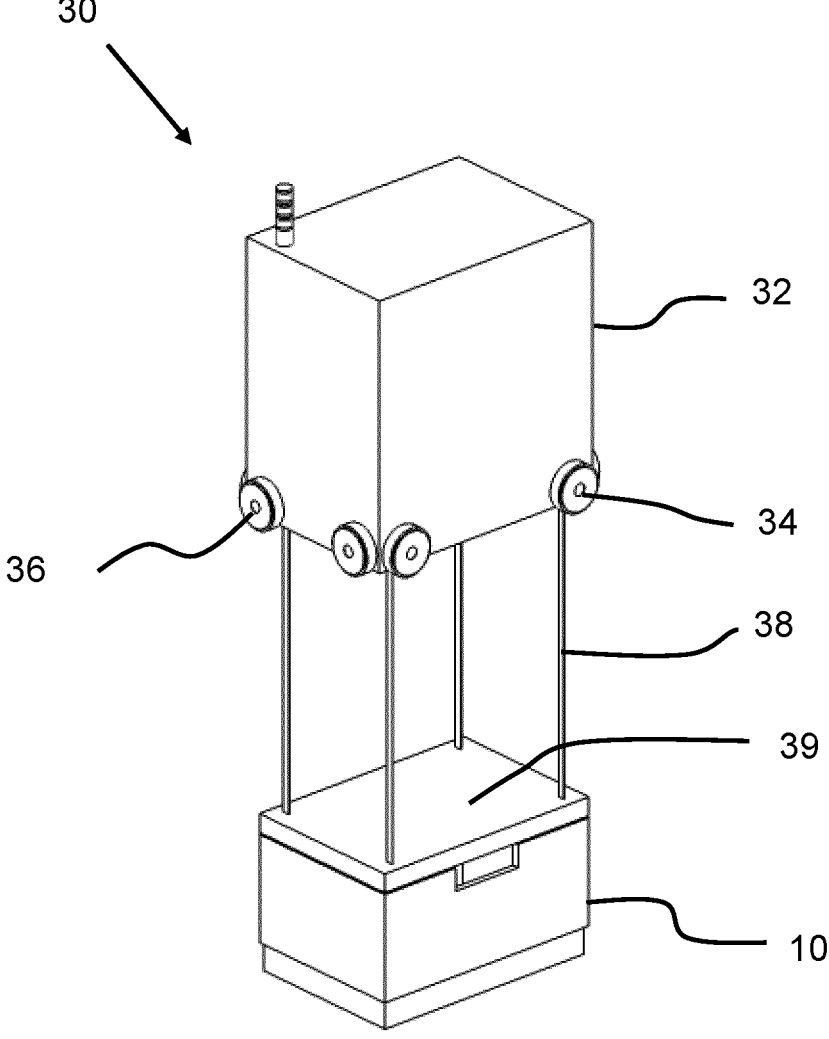
FIG. 4 is a schematic perspective view of the load handling device showing the lifting device gripping a container from above.
Figure 5:
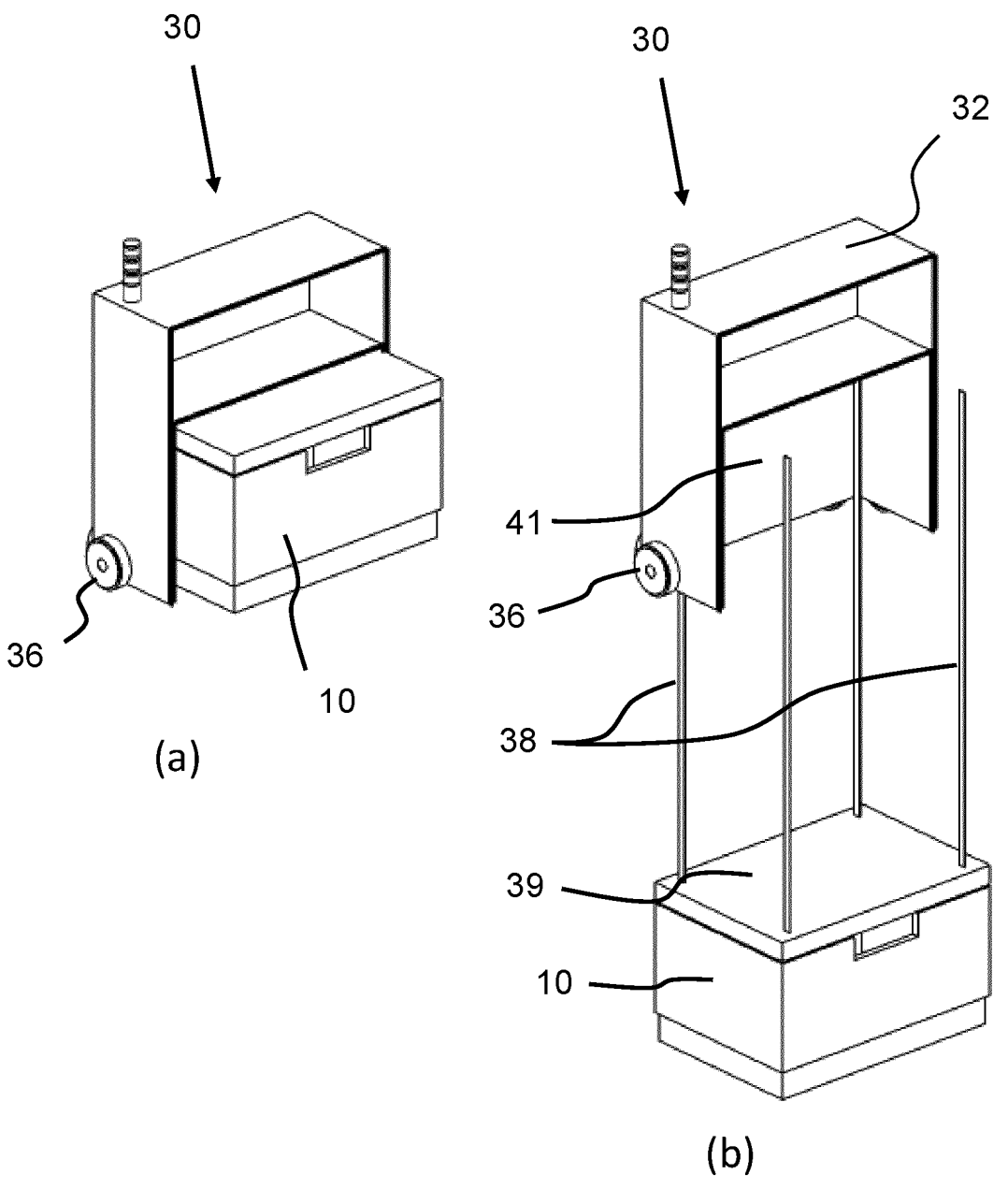
FIGS. 5(*a*) and 5(*b*) are schematic perspective cut away views of the load handling device of FIG. 4 showing (a) a container accommodated within the container receiving space of the load handling device and (b) the container receiving space of the load handling device.

The transverse cross-section in the horizontal plane of the storage column 44 in FIG. 2 shows that an individual storage column 44 is made up of four vertical uprights 16 arranged at the corners of the container or storage bin 10. A storage column 44 corresponds to a single grid cell. The cross section of the vertical upright 16 is constant over the whole length of the vertical upright. The periphery of a container or storage bin in the horizontal plane in FIG. 2 shows the container or storage bin having four corners and the arrangement of four vertical uprights 16 at the corners of the containers or storage bins within the storage column 44. A corner section of each of the four vertical uprights, one from each of the four vertical uprights, ensures that a container or storage bin stored in the storage column 44 is guided into a correct position relative to any container or storage bin stored within the storage column and the stacks of containers or storage bins in the surrounding storage columns. A load handling device operative (not shown) on the grid structure

40 is able to lift a container or storage bin as it is guided along the vertical uprights 16 through a grid cell 42. Thus, conventional belief in the industry is that vertical uprights 16 have a dual purpose; (a) to structurally support the grid structure 40, and (b) to guide the containers or storage bins 10 in the correct position through a respective grid cell 42.

A top plan view of a section of the grid structure 40, shown in FIG. 6, shows a series of horizontal intersecting beams or grid members 18, 20 arranged to form a plurality of rectangular frames constituting grid cells 42, more specifically a first a set of grid members 18 extend in a first direction x and a second set of grid members 20 extend in a second direction y, the second set of grid members 20 running transversely to the first set of grid members 18 in a substantially horizontal plane, i.e. the grid structure is represented by Cartesian coordinates in the X and Y direction. The term "vertical upright(s)", "upright member(s)" and "upright column(s)" are used interchangeably in the description to mean the same thing. For the purpose of explanation of the present invention, the point or junction where the grid members intersect or cross shown by the squares in FIG. 6 can be defined as nodes or intersections 50. It is clearly apparent from the layout of at least a portion or section of a known grid structure 40 constituting four adjoining grid cells 42 shown in FIG. 6, each intersection or node 50 of the grid structure 40 is supported by a vertical upright 16. From the section or at least a portion of the grid structure 40 shown in FIG. 6, the four adjoining grid cells are supported by nine vertical uprights 16, i.e. three sets of vertical uprights 16 supporting the grid structure in three rows, where each row comprises three nodes 50.

Figure 8:
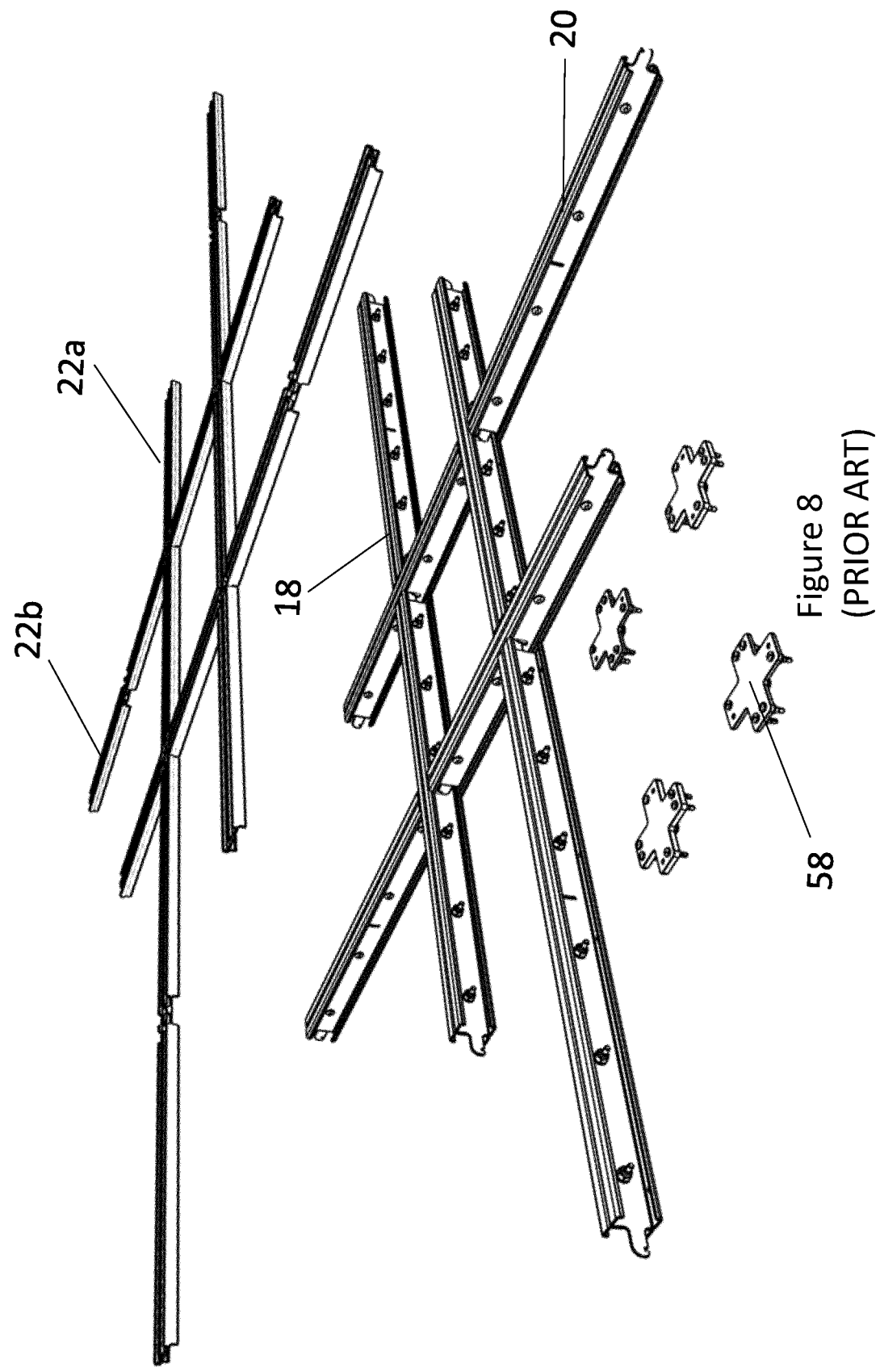
FIG. 8 is a perspective view showing the arrangement of the tracks and track supports interconnected at their nodes or intersections by a cap plate.
Figure 9:
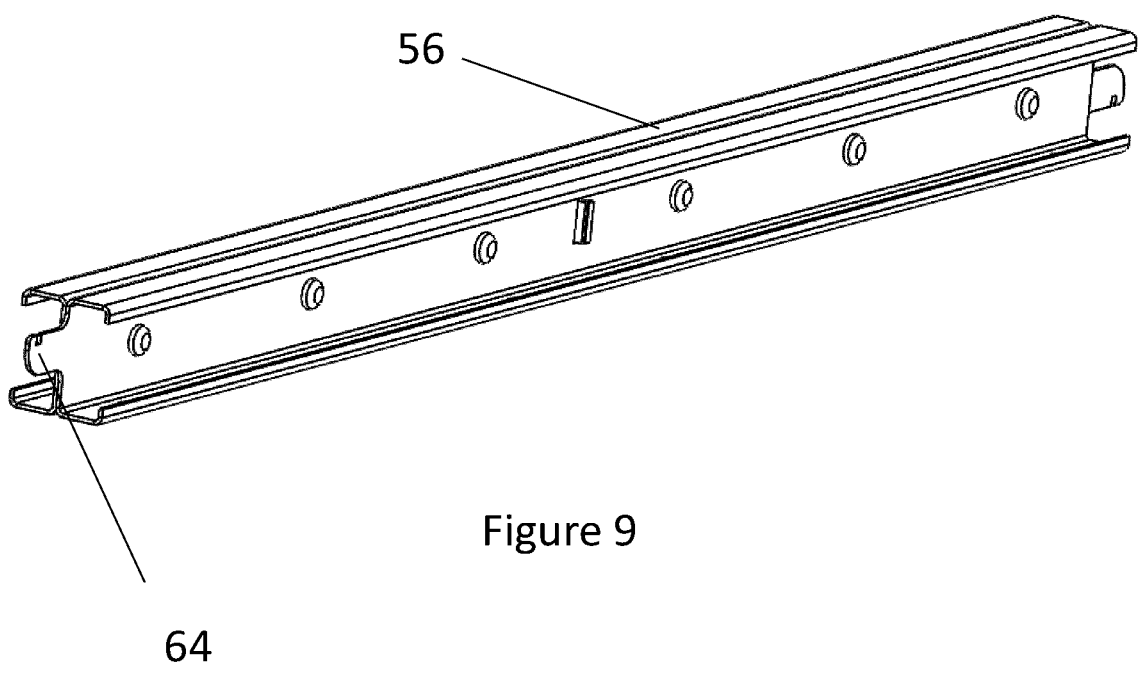
FIG. 9 is a perspective view of a track support.

Each of the grid members of the present invention can comprise a track support 18, 20 and/or a track or rail 22a, 22b (see FIG. 8) whereby the track or rail 22a, 22b is mounted to the track support 18, 20. A load handling device is operative to move along the track or rail 22a, 22b of the present invention. Alternatively, the track 18, 20 can be integrated into the track support 18, 20 as a single body, e.g. by extrusion. In the particular embodiment of the present invention, the grid member comprises a track support 18, 20 and/or a track 22a, 22b whereby the track or rail 22a, 22b is mounted to the track support 18, 20. At least one grid member in a set, e.g. a single grid member, can be subdivided or sectioned into discrete grid elements that can be joined or linked together to form a grid member 18, 20 extending in the first direction or in the second direction. Where the grid members comprises a track support, the track support can also be sub-divided into discrete track support elements that are linked together to form the track support. The discrete track support elements making up a track support extending in the first axial direction and in the second axial direction is shown in FIG. 8. An individual track support element 56 used to make up a track support 18, 20 is shown in FIG. 9. The track support 18, 20 in transverse cross section can be a solid support of C-shaped or U-shaped or I-shaped cross section or even double-C or double-U shaped support. In the particular embodiment of the present invention, the track support element 56 comprises double back-to-back C sections bolted together.

Figure 10:
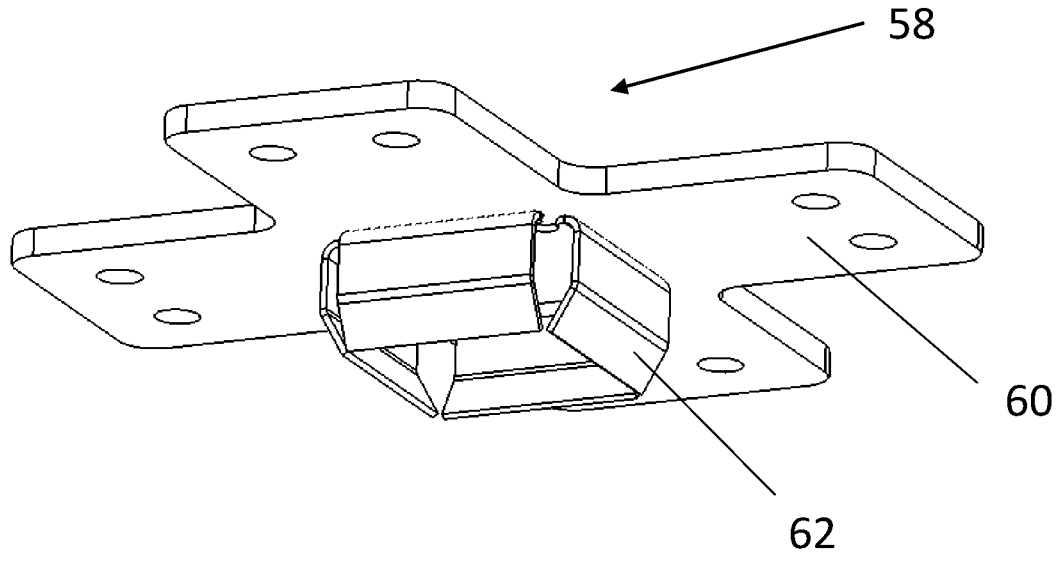
FIG. 10 is a perspective view of a cap plate for interconnecting the vertical uprights to the grid members at the nodes.
Figure 11:
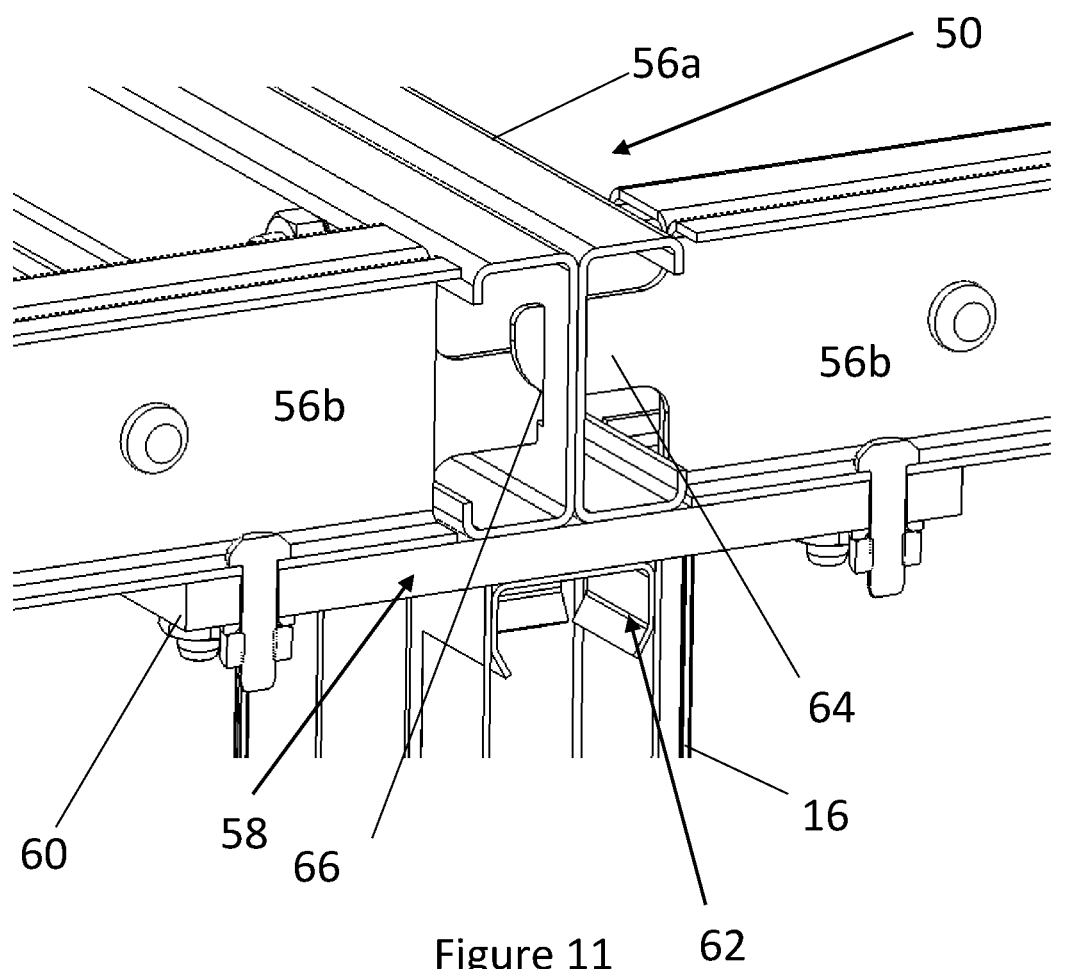
FIG. 11 is a perspective cross sectional view of the interconnection of the vertical uprights to the grid members by the cap plate at a node.

A connection plate or cap plate 58 as shown in FIG. 8 can be used to link or join the individual track support elements 56 together in both the first and the second direction at the junction where multiple track support elements cross in the grid structure 40, i.e. the cap plate 58 is used to connect the track support elements 56 together to the vertical uprights 16. As a result, the vertical uprights 16 are interconnected at their upper ends at the junction where the multiple track support elements cross in the grid structure 40 by the cap plate 58, i.e. the cap plate is located at the node 50 of the grid structure 40. As shown in FIG. 10, the cap plate 58 is cross shaped having four connecting portions 60 for connecting to the ends or anywhere along the length of the track support elements 56 at their intersections 50. The interconnection of the track support elements to the vertical uprights at the nodes by the cap plate 58 is demonstrated in the cross-sectional profile of the node 50 shown in FIG. 11. The cap plate 58 comprises a spigot or protrusion 62 that is sized to sit in the hollow central section 46 of the vertical upright 16 in a tight fit for interconnecting the plurality of vertical uprights 16 to the track support elements as shown in FIG. 11. Also shown in FIG. 11 are the track support elements 56a, 56b extending in both perpendicular directions corresponding to the first direction (x-direction) and the second direction (y-direction). The connecting portions 60 are perpendicular to each other to connect to the track support elements 56a, 56b extending in the first direction and in the second direction. The cap plate 58 is configured to be bolted to the ends of the track support elements 56a, 56b or along the length of the track support elements. Each of the track support elements 56a, 56b is arranged to interlock with one another at the nodes to form the grid structure 40 according to the present invention. To achieve this, distal or opposing ends of each of the track support elements 56a, 56b comprise locking features 64 for interconnecting to corresponding locking features 66 of adjacent track support elements. In the particular embodiment of the present invention, opposing or distal ends of one or more track support elements comprise at least one hook or tongue 64 that is receivable in openings or slot 66 midway of an adjacent track support element 56 at the junction where the track support elements cross in the grid structure 40. Referring back to FIG. 9 in combination with FIG. 11, the hooks 64 at the end of a track support element 56 are shown received in an opening 66 of an adjacent track support element extending across a vertical upright 16 at the junction where the track support elements 56 cross. Here, the hooks 64 are offered up to an opening 66 either side of a track support element 56b. In the particular embodiment of the present invention, the opening 66 is halfway along the length of the track support element 56 so that when assembled together, adjacent parallel track support elements 56 in the first direction and in the second direction are offset by at least one grid cell. This is demonstrated in FIG. 8.

Figure 12:
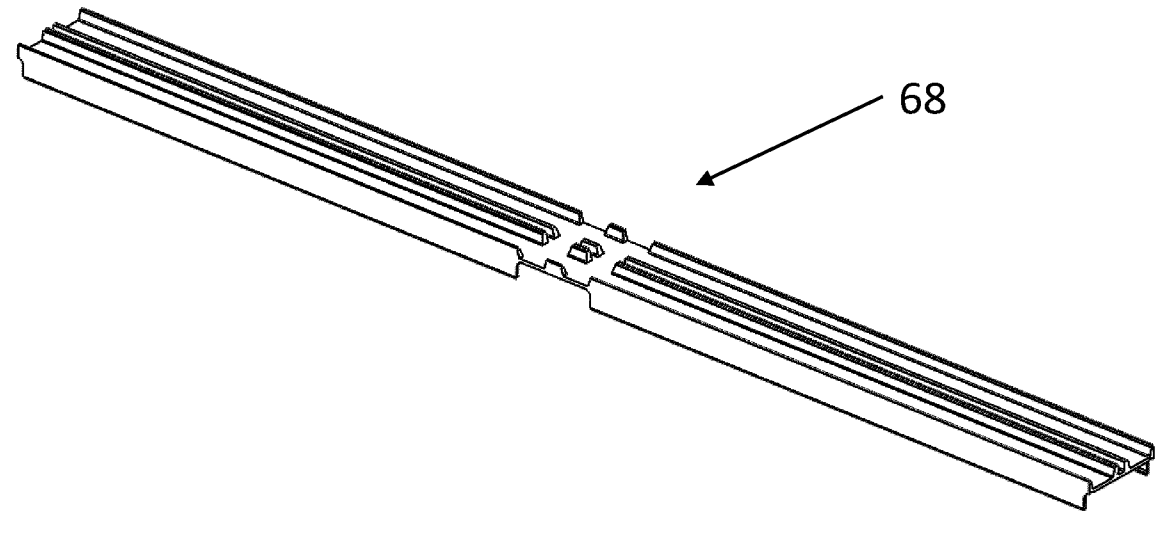
FIG. 12 is a perspective view of a track or rail.

To complete the grid structure 40 once the track support elements 56 are interlocked together to form a grid pattern comprising track supports 18 extending in the first direction and track supports 20 extending in the second direction, a track 22a, 22b is mounted to the track support elements 56. The track 22a, 22b is either snap-fitted and/or fitted over the track support 18, 20 in a slide fit arrangement (see FIG. 8). Like the track support of the present invention, the track comprises a first set of tracks 22a extending in the first direction and a second set of tracks 22b extending in the second direction, the first direction being perpendicular to the second direction. A first set of tracks 22a is sub-divided into multiple track elements 68 in the first direction such that when assembled adjacent parallel track elements in the first direction are offset by at least once grid cell. Similarly, a second set of tracks 22b is sub-divided into multiple track elements 68 in the second direction such that when assembled adjacent track elements in the second direction are offset by at least one grid cell. This is demonstrated in FIG. 8. An example of a single track element 68 is shown in FIG. 12. As with the track support elements, multiple track elements in the first direction and the second direction are laid together to form a track in both directions. The fitting of the track element 68 to the track support 18, 20 comprises an inverted U-shaped cross-sectional profile that is shaped to cradle or overlap the top of the track support 18, 20. One or more lugs extending from each branch of the U shape profile engage with the ends of the track support 18, 20 in a snap fit arrangement. Equally, plausible in the present invention is that the track 22a, 22b can be integrated into the track supports 18, 20 rather than being separate components.

Conventional wisdom is of the belief that to structurally support the grid structure 40 above the ground, it is necessary to support the grid structure 40 by vertical uprights 16 at each of the nodes 50. The vertical uprights 16 are, therefore, held under compression by the weight of the grid structure 40 and one or more load handling devices operative on the grid structure 40. In addition, the vertical uprights 16 double up as guides for guiding a grabber device 39 (see FIG. 4) and the containers in a stack through a respective grid cell. However, the present invention defies conventional wisdom, and the vertical uprights 16 can be arranged to structurally support the grid structure 40 without the need to support the grid structure at every node or intersection 50 of the grid structure 40. These range from transferring a greater portion of the load bearing capacity of the grid framework structure to the grid structure 40 rather than the vertical uprights 16 alone to balancing the number of vertical uprights 16 necessary to provide the load bearing capacity of the grid structure. In a broad aspect of the present invention, a plurality of vertical uprights 16 are arranged such that a section or at least a portion of the grid structure comprising four adjoined grid cells 42 is supported by five or fewer vertical uprights 16. The vertical uprights 16 function as structural elements in compression to bear the weight of the grid structure 40 and the one or more load handling devices operative on the grid structure 40.

Below describes the different embodiments of the present invention where a plurality of vertical uprights 16 are arranged such that a section of the grid structure 40 comprising four adjoined grid cells 42 is supported by five or fewer vertical uprights 16.

Single Vertical Upright Grid Section Support

Figure 13:
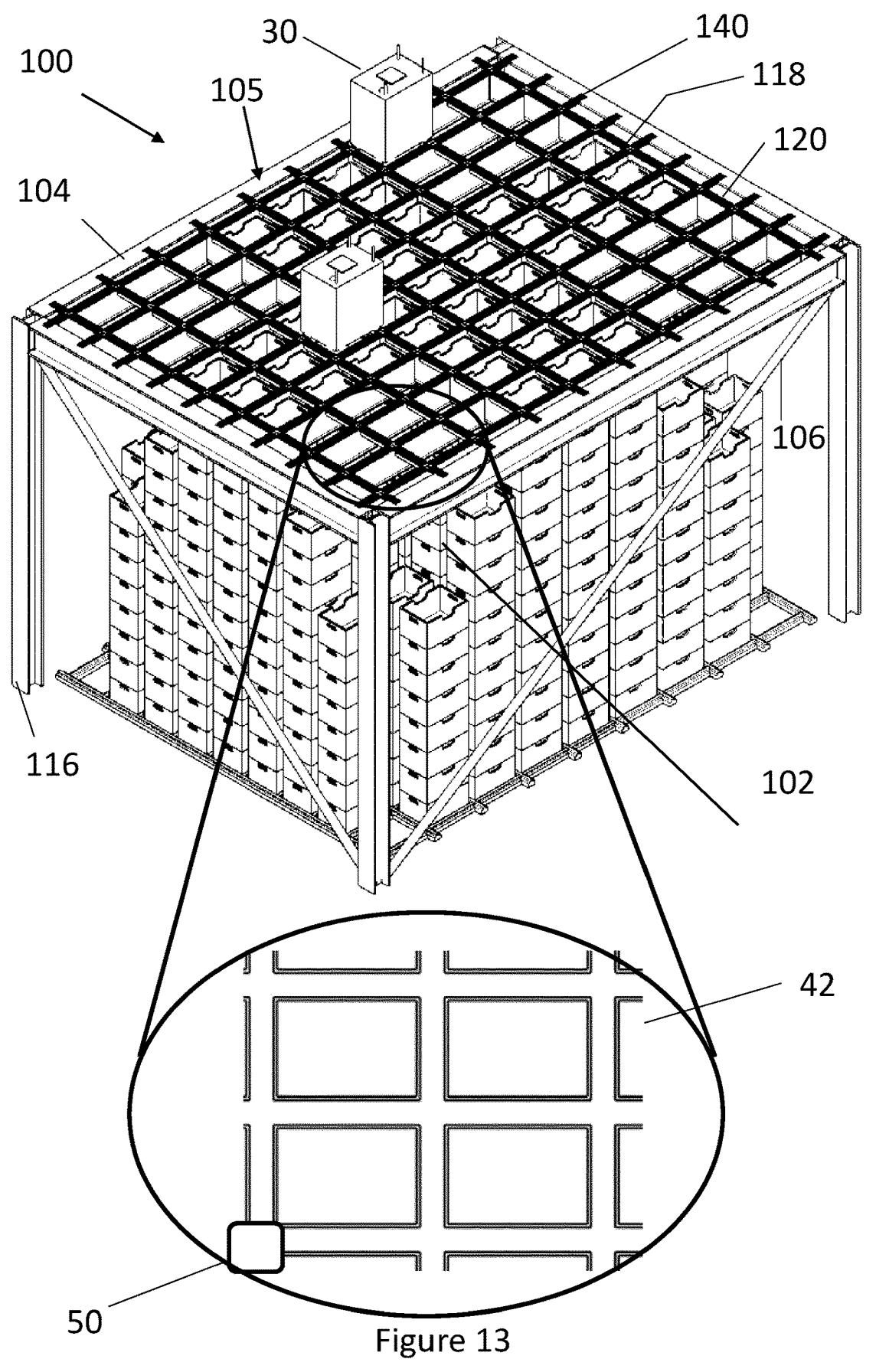

In a first embodiment of the present invention of the storage system 100 shown in FIG. 13, the grid structure 140 is configured such that a corner section 102 of the grid structure 140 comprising four adjoined grid cells 42 is supported by a single vertical upright 116. This is demonstrated by the enlarged view of the corner section 102 shown in FIG. 13. Whilst FIG. 13 shows the corner section 102 being supported by a single vertical upright 116 at a node or intersection 50 of the grid structure 140, the present invention is not limited to the corner section 102 of the grid structure 140 being supported at a node or intersection 50. The corner section 102 of the grid structure 140 can be supported along any portion of the corner section 102. For the purpose of the present invention, the term "support" is construed to cover any form of mechanical connection between the vertical upright 116 and the grid structure 140 or at least a section of the grid structure 140.

As the grid structure 140 is supported by four vertical uprights 116 at the corner sections 102 of the grid structure 140 and since the grid structure 140 bears the weight of one or more load handling devices operative on the grid structure 140, the vertical uprights 116 can be made more substantial than traditional vertical uprights commonly known in art discussed above with respect to FIGS. 2 and 7. In the particular embodiment of the present invention shown in FIG. 13, each vertical upright 116 can be a solid support beam of I-shape or H-shape comprising opposing beam flanges. The vertical uprights 116 at the corner sections of the grid structure 140 can be considered as load bearing beams that are placed in compression under the weight of the grid structure 140 and the one or more load handling devices 30 operative on the grid structure 140. Other types of vertical uprights that function as a load bearing beam for supporting the grid structure at the corner sections of the grid structure are applicable in the present invention. These include but are not limited to load bearing beams having cross-sectional shapes such as L-shape (angles), C-shape (channels), or tubes.

In addition to using load bearing beams as the vertical uprights, multiple bracing members 104, 106 shown in FIG. 13 are disposed around the periphery of the grid structure 140 to form a unitary frame body. In the particular embodiment of the present invention shown in FIG. 13, the grid structure 140 has a rectangular or square configuration comprising four corner sections 102. The grid structure 140 is supported by four vertical uprights 116 at each of the four corner sections 102 of the grid structure. Each of the four vertical uprights 116 at the corner sections are braced together by at least one horizontal bracing member 104 extending longitudinally from an upper end of the vertical uprights 116 at the corner sections 102 to form a perimeter bracing structure 105 surrounding or at least partially surrounding the perimeter of the grid structure 140. The horizontal bracing members 104 provide structural support to the grid structure 140 around the periphery of the grid structure. In the particular embodiment of the present invention, the perimeter bracing structure 105 is supported above the ground by the four vertical uprights 116 at the corners of the perimeter bracing structure to create an open space below for the storage of one or more stacks of containers. Four horizontal bracing members 104 are mounted to an upper end of each of the four vertical uprights 116 so as to extend from each corner of the perimeter bracing structure 105. Like the vertical uprights, the horizontal bracing members 104 function as a load bearing beam extending between the vertical uprights and can be an I or H beam or other cross-sectional shapes that provide a load bearing beam around the periphery of the grid structure. These include but are not limited to load bearing beams having cross-sectional shapes like L (angles), C (channels), or tubes. In the particular embodiment shown in FIG. 8, the horizontal bracing members are I beams.

The horizontal bracing members 104 can envisaged to represent the top chords that connect two vertical uprights 116 at their upper ends of the perimeter bracing structure 105. Bracing at least two of the vertical uprights at the upper end of the vertical uprights by at least one horizontal bracing member 104 forms at least one drag strut or collector commonly known in the art. A drag strut or collector is where the at least two vertical uprights are braced by a horizontal beam at the upper end of two vertical uprights and functions to collect and transfer diaphragm shear forces to the vertical uprights. Also shown in FIG. 13, the four vertical uprights 116 are arranged at four corners of the grid structure 140 to form a cuboid structure having a top face and four side faces. The assemblage of the vertical uprights 116 at the corner sections of the grid structure, together with the perimeter bracing structure 105, form an exoskeleton supporting the grid structure. The exoskeleton provides structural support to resist lateral forces experienced by the grid structure, i.e. the exoskeleton forms a moment resisting frame. The exoskeleton together with the grid structure form the grid framework structure according to an embodiment of the present invention.

In addition to at least one horizontal bracing member 104 extending between the vertical uprights 116, at least one diagonal bracing member 106 can be connected to the vertical uprights 116 to provide additional stability to the exoskeleton. The bracing members 104, 106 extending between the vertical uprights 116 are designed to work in tension and compression similar to a truss. In the particular embodiment shown in FIG. 13, a first end of the diagonal bracing member 106 is connected to a lower end of a first vertical upright 116 and a second end of the diagonal bracing member is connected to an upper end of a second vertical upright 116 at one or more faces of the exoskeleton. In the particular embodiment of the present invention, each face of the exoskeleton comprises at least one diagonal bracing member extending between two vertical uprights. More than one diagonal bracing member can be disposed between two vertical uprights to form a cross ('X') brace at one or more sides or faces of the exoskeleton. The bracing members are fixedly connected to the vertical uprights by connections or joints commonly known in the art. These include but are not limited to welding or the use of suitable fasteners commonly known in the art such as bolts or rivets or a combination thereof.

Figure 14:
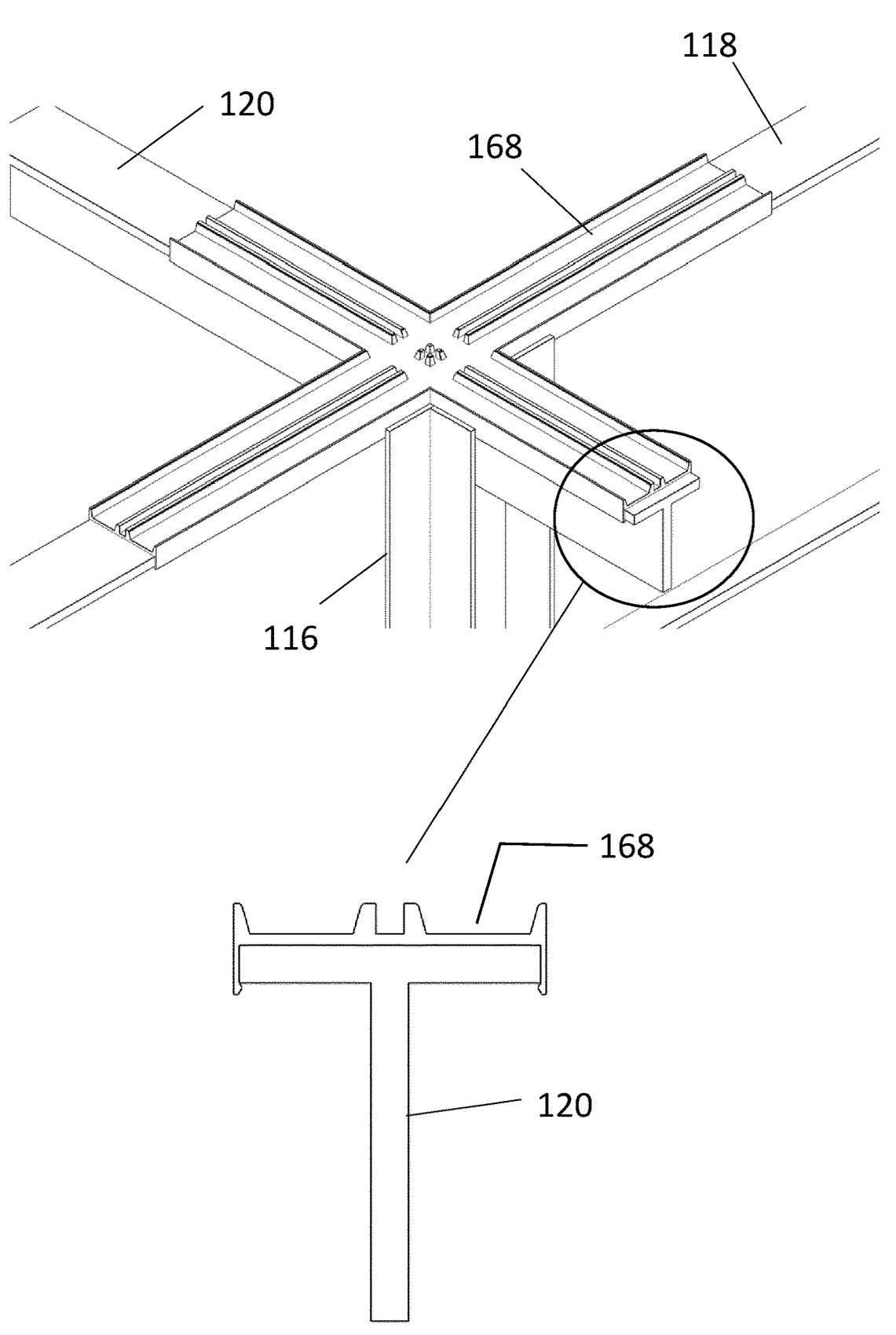
FIG. 14 is an expanded view of the grid structure of FIG. 13 at the node or intersection of the track supports showing the tracks mounted to the track support.
Figure 15:
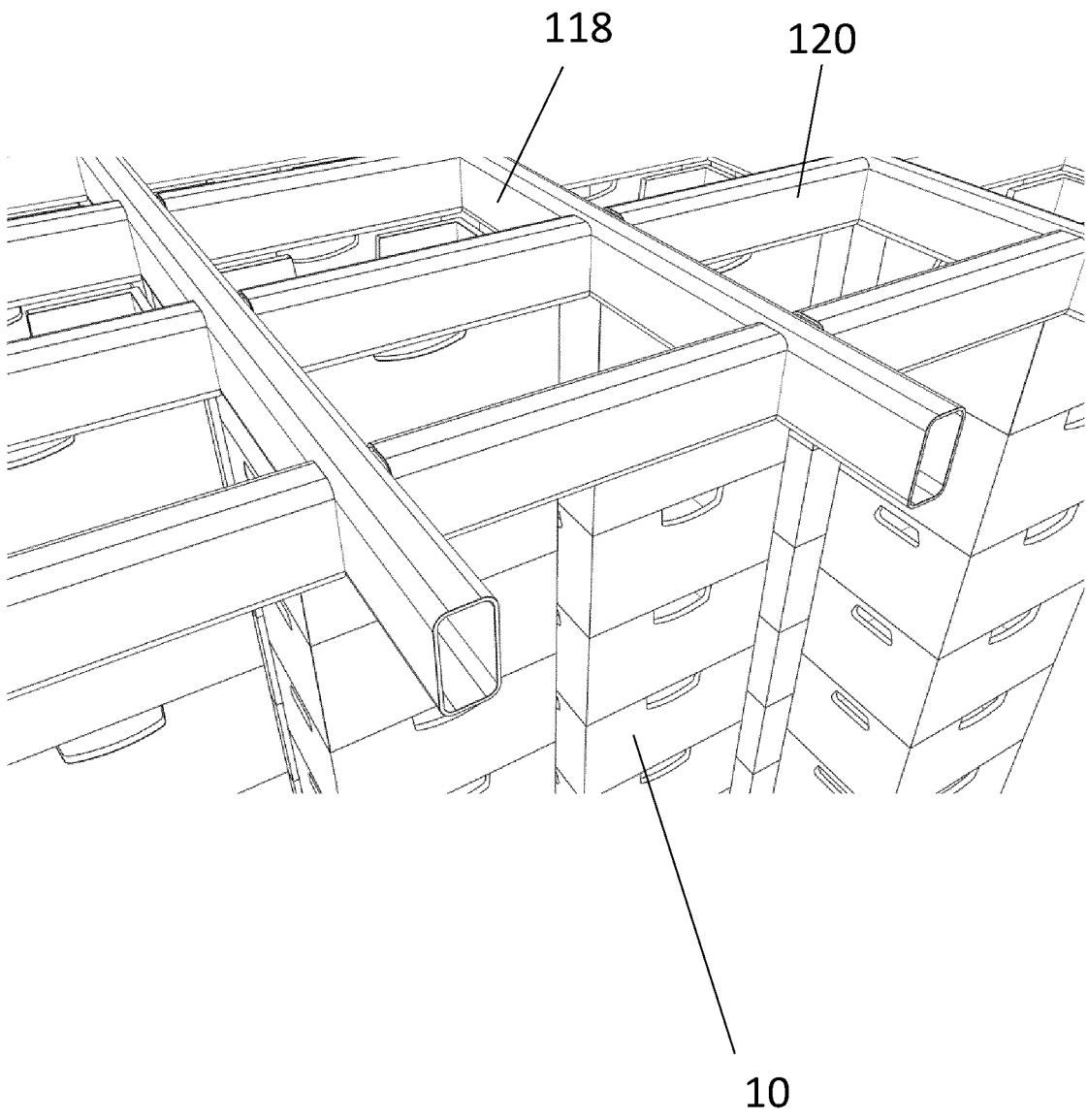
FIG. 15 is a perspective view showing another embodiment of the grid structure of the grid framework structure shown in FIG. 13.
Figure 16:
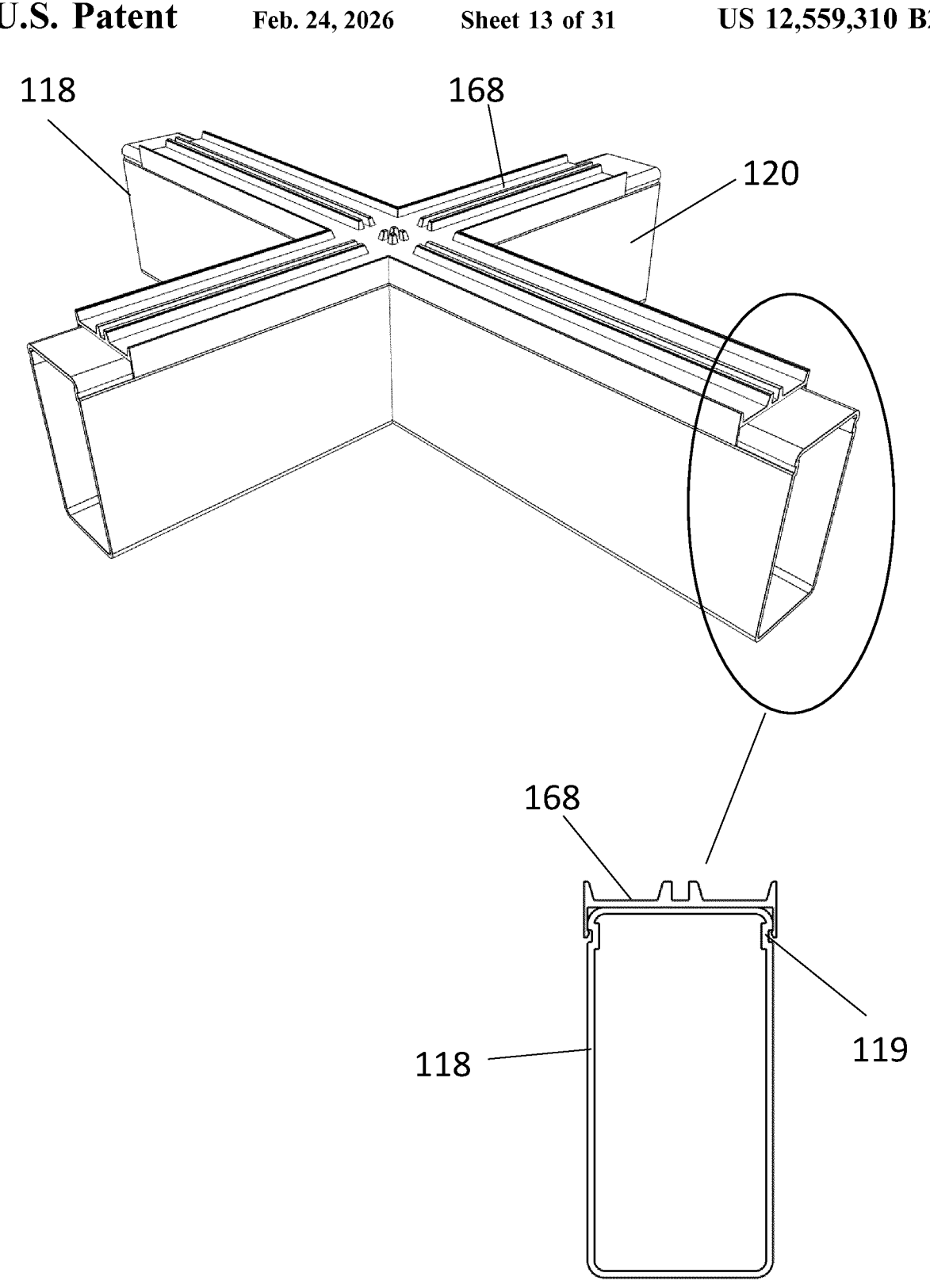
FIG. 16 is an expanded view of the intersection of the track supports of the grid structure of FIG. 15 showing tracks mounted onto the track supports.

The removal of the vertical uprights at each of the intersections or nodes of the grid members has meant that the support at the intersections or nodes of the grid structure is not present compared to the support provided by a traditional grid framework structure in the art discussed above where a vertical upright is present at each of the intersections of the grid members. The exoskeleton comprising the perimeter bracing structure 105 supported by the vertical upright at the corners is able to resist the lateral forces experienced by the grid structure. However, in order for the bulk of the lateral forces to be transferred to the exoskeleton and to compensate for the loss of support at each of the intersections of grid structure, the grid members 118, 120 making up the grid structure 140 are made more substantial than the grid members in the art. In comparison to the grid structure of the grid framework structure in the art, which largely comprises back to back C sections that are bolted together, the grid members of the present invention can comprise I-beams or tubular beams. In practice, back-to-back C sections which are bolted together are considered too weak to be self-supporting alone. For the purpose of the present invention, the term "self-supporting" is construed to mean that four adjoined grid cells are supported by five or fewer vertical uprights. FIG. 14 is an example where the grid members 118, 120 of the grid structure 140 are T-beams having a T-shaped cross section with an upper beam flange and which are able to resist the load from one or more load handling devices operative on the grid structure. Like the tracks discussed above, the track or rail 168 have engagement portions that enable them to be simply snap fitted onto a beam flange of the T-beam 118, 120. Whilst T-beams provide superior support in the vertical direction, in another example of the present invention, the grid members can be largely fabricated from I-beams comprising opposing beam flanges connected by a web, tubular or box section beams. As shown in FIG. 15, tubular beams 118, 120 offer improved rigidity and strength in comparison to the back-to-back C sections and I-beams. The tubular cross-sectional profile of the grid members as shown in FIG. 15 offer resistance to bending moments in multiple directions, and thus bending moments experienced by the grid structure can be transferred to the exoskeleton, which largely absorbs the lateral forces. The exterior surface of the tubular beams 118, 120 has indentations or depressions 119 extending along the longitudinal length of opposing walls of the tubular beam to enable a track or rail 168 to be snap fitted or slide fitted onto the tubular beam as shown in FIG. 16, i.e. the track support is integrated and forms part of the grid members 118, 120. In both embodiments of the present invention shown in Figure and FIG. 16, the term "grid members" is loosely defined as comprising track supports and/or tracks. The tracks can be integrated into the track supports. For example, the profile of the tracks can be shaped into the track supports.

Alternatively, a separate track support element can be mounted directly to the grid members to permit the track to be mounted thereon. The track support element offers a key to allow a track or rail to be securely fitted to the grid members 118, 120. Multiple track support elements are distributed on the grid members having a profile that is shaped to receive a track. Thus, in comparison to the grid members of the grid structure discussed above where the track support elements is integrated into the body of the grid members, the track support elements of the grid structure may be separate to the grid members and provide a key for fixing the tracks. The track is fitted to the grid member via the track support element by a snap fit and/or slide fit arrangement. The track support elements can be welded to the grid member. The grid framework structure of the present invention is not restricted to the track support element being a separate component that is welded to the grid elements of the grid. The track support elements can be integrated into the body of the tubular grid members. For example, the profile of the track support elements can be extruded together with the grid members as a single body or the profile of the grid members can be shaped to include a track support element.

In an aspect of the present invention, the grid members 118, 120 are welded together at the intersections instead of being bolted together to provide a more rigid and sturdy joint than can be provided by bolting alone. Thus, lateral forces generated in the grid structure are transferred as bending moments at the joints where the grid members cross at each of the nodes 50. In accordance with one aspect of the present invention, the grid members at the intersections are rigidly connected together to form at least one Vierendeel truss. As commonly known in the art, a Vierendeel truss comprises chords separated by web members formed as a series of rectangular frames. The rectangular openings of Vierendeel trusses make the Vierendeel trusses ideally suited for a load handling device to move one or more containers stored below the trusses, i.e. the grid of the present invention functions as at least one Vierendeel truss assembly.

The entire grid structure 140 can be pre-assembled together prior to being mounted to or fixed to the perimeter bracing structure 105 and/or the vertical uprights. By pre-assembling the grid members 118, 120 together, the health and safety aspects as a result of welding the grid members together on-site would be mitigated as the grid members can be welded remotely in a safer environment, e.g. the use of robotic welding. The pre-assembled grid structure can then be subsequently mounted to or fixed to the vertical uprights 116 at the corner section 102 of the grid structure 140 on site. Welding the grid members together on site or in situ may fall foul of health and safety legislation due to exposure of welding fumes and being a fire risk. Further detail of the connection of the grid structure 140 to the vertical uprights 116 at the corner sections 102 is discussed below. Whilst the grid members 118, 120 are shown to be tubular, other cross-sectional shapes with the required load bearing properties to support one or more load handling devices operative on the grid structure are applicable in the present invention. These include but are not limited to I-shape comprising opposing beam flanges connecting by a web, box shape, L-shape, or even a C-channel.

The grid structure in the particular embodiment shown in FIG. 13 is configured such that the intersecting grid members are enclosed within a rectilinear outer frame forming the perimeter bracing structure 105. The rectilinear outer frame surrounding the intersecting grid members 118, 120 provides an area for the grid structure 140 to be mounted to or connected to the rectilinear outer frame. Alternatively, the grid structure can be mounted to a separate structural support base (not shown) comprising cross members extending between opposing horizontal bracing members of the perimeter bracing structure 105. A first set of cross members extend in a first direction and a second set of cross members extend in a second direction. The first direction and the second direction correspond to the orientation of the first set of grid members and the second set of grid members of the grid structure. The first set of cross members are distributed across the underneath of the grid structure in the first direction so that individual cross members are spaced apart in the second direction by one or more grid cells. Likewise, the second set of cross members are distributed across the underneath of the grid structure in the second direction so that the individual cross member extending in the second direction are spaced apart in the first direction by one or more grid cells. In on example, the first set of cross members are spaced apart across the grid structure in the second direction by three grid cells and the second set of cross members are spaced apart across the grid structure in the first direction by a single grid cell. The first set of cross members and the second set of cross members provides the necessary structural base to support the grid structure mounted thereon. The cross members can be I-beams or other cross-sectional shape necessary to resist the bending moments of one or more load handling devices operative on the grid structure. These include but are not limited to a box section, L-shape or C-channel, etc. The structural support base can made to bear a greater portion of the load and thus, resist the bending moments of the load handling devices operative on the grid structure. As a result, the grid structure mounted thereon does not need to bear the full weight of the load, i.e. the load on the grid structure can be distributed between the structural support base supporting the grid structure and the grid structure itself. Thus, the grid members can be made less substantial and can even be based on the existing grid structure elements comprising back to back C-sections. In an alternative embodiment of the present invention shown in FIG. 13, the grid members 118, 120 around the periphery of the grid structure 140 provide a mounting surface for the grid structure 140 to be mounted on the periphery bracing structure, more specifically the grid members overhang at the edges of the grid structure so providing a mounting surface to be mounted to the horizontal bracing members 104. This is clearly demonstrated in FIG. 13.

Figure 17:
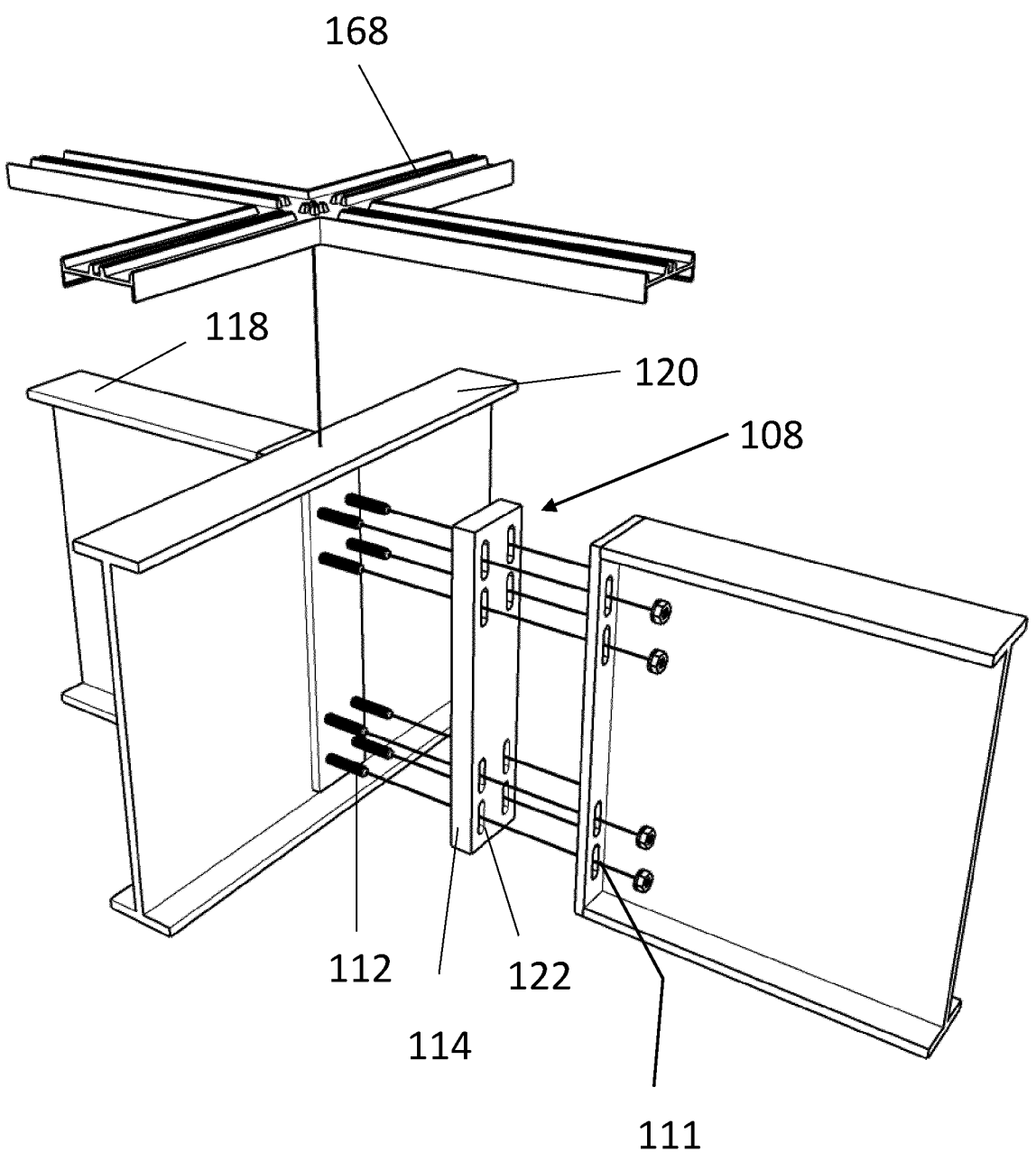
FIG. 17 is a perspective view showing the connection of the track supports at a node by a slip joint.

Various structural joints or connectors can be used to rigidly fix the grid structure to the horizontal bracing members and/or the structural support base extending between the vertical uprights. These include but are not limited to welding, bolts and/or rivets. The structural joints or connectors can also include one or more slip joints 108 for providing relative movement or "slip" between any of the connections of the perimeter bracing structure 105 and the grid structure as shown in FIG. 17. The slip joint 108 provides slip when the connections between adjacent grid members 118, 120 exceeds a predetermined load. This allows for the joint or connector to accommodate movement as a result of the differing thermal expansion between, for example, adjacent grid members 118, 120 of the grid structure 140 and/or the components of the perimeter bracing structure. Various slip joints commonly known in the art are applicable in the present invention. For example, slip joints may be used for fixedly attaching the grid structure and/or the structural support base to the perimeter bracing structure, and allow the grid structure and/or the structural support base to move relative to the perimeter bracing structure when the connection between the grid structure and/or the structural base to the horizontal bracing member exceeds a predetermined load as a result of the differing thermal expansion between their respective components. For example, one or more slotted holes 111 can be provided in either the grid members 118, 120 of the grid structure or the horizontal bracing members when joining the grid structure to the perimeter bracing structure by one or more bolts 112 so as to allow the one or more bolts to travel along the slotted holes 111. The same slip joint can be applied between the grid structure and the perimeter bracing structure and/or between the structural support base and the perimeter bracing structure to allow relative movement between the cross members and the bracing members of the perimeter bracing structure 105.

In the case where the grid member is an I beam, a set of slotted holes can be provided in the web of the grid member which are arranged to align with a set of holes with a mating surface of an adjacent grid member at a node or intersection as shown in FIG. 17. As is commonly known in the art, one or more bolts connecting the grid members together in the grid structure are placed under tension so as to allow the bolts to travel along the slotted holes when an applied load exceeds a predetermined threshold as a result of thermal expansion. To control the 'slip' between the grid members of the grid structure at the node or intersection, the slip joint can be the one described in U.S. Pat. No. 10,400,468 (Scott Randall Beard) whereby an attachment plate 114 is interposed between adjacent grid members of the grid structure and/or between the grid member and the perimeter bracing structure. The attachment plate 114 can be welded or fixedly attached to one face of a grid member. A set of vertically orientated slotted holes 122 are provided in the attachment plate 114 that align with corresponding holes in a connecting grid member 118 to cause a connecting grid member at a node or intersection to move relative to the attachment plate. A fastener arrangement of bolts, nuts and optional washers is inserted through the slotted holes and holes in order to connect the grid members together at the node or intersection and/or grid structure to the perimeter bracing structure via the attachment plate 114.

To control the coefficient of friction between the attachment plate 114 and a connecting grid member 118, 120, a shim (not shown) can be disposed between the attachment plate 114 and the connecting grid member 118, 120. The shim can include corresponding slotted holes which are aligned with the slotted holes of the attachment plate and the slotted holes of the connecting grid member. As the bolts are allowed to travel along the slotted holes, the grid members at the nodes or the intersections are allowed to move or slip relative to each other. When assembled, the tension on the bolts can be selected to work with the coefficient of friction in the shim so that the attachment plate is prohibitive to move relative to the grid member when the load is less than a preselected value while allowing relative movement between the attachment plate and the grid member when the applied load is greater than a predetermined amount. The same slip joint can be applied to the joint between the grid structure and the perimeter bracing structure 105 and/or any of the joints connecting the vertical uprights to the perimeter bracing structure.

Figure 18:
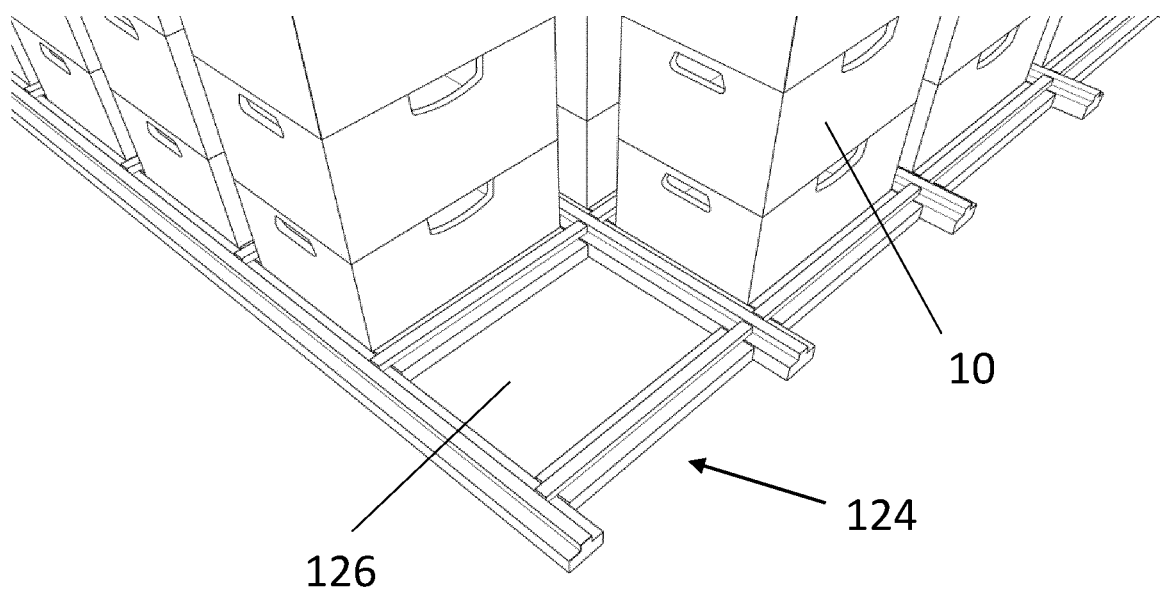
FIG. 18 is a perspective view showing the arrangement of stacks of containers on a floor rail according to an embodiment of the present invention.

The grid structure 140 is raised above the ground by being mounted to the vertical uprights to create an open storage space for the storage of multiple stacks of containers. Traditionally, as discussed above, the containers or storage bins in a stack are guided through a respective grid cell by vertical uprights at each of the node or intersections of the grid members. The removal of the vertical uprights has meant that the containers are lifted and raised through a grid cell in free space by a load handling device operative on the grid structure. The present applicant has learnt that the set of lifting tethers or tapes 38 at the four corners of the grabber device 39 (see FIG. 5) provides sufficient lateral stability of the grabber device 39 and the container attached thereto to lift the container through a grid cell without colliding or disrupting neighbouring containers being lifted from adjacent stacks of containers. As shown in FIG. 13 and FIG. 15, the stacks of containers or storage bins 10 are sufficiently spaced apart to prevent storage bins or containers in neighbouring stacks colliding with each other as they are lifted through a respective grid cell. To ensure that neighbouring stacks of containers are sufficiently spaced apart in the storage space, one or more stacks of containers are placed on floor rails 124 arranged in a grid pattern comprising one or more grid cells 126 as shown in FIG. 18. The arrangement of the floor rails 124 ensure that the grid pattern comprising the one or more grid cells 126 of the floor rails 124 aligns with the one or more grid cells 42 of the grid structure 140 above. This is to enable the stacks of containers to be arranged on the floor rail 124 in the same grid pattern as the grid structure 140. Thus, the floor rails 124 allow one or more load handling devices operative on the grid structure 140 to be able to lower containers or storage bins in their correct position in the storage space.

Figure 19:
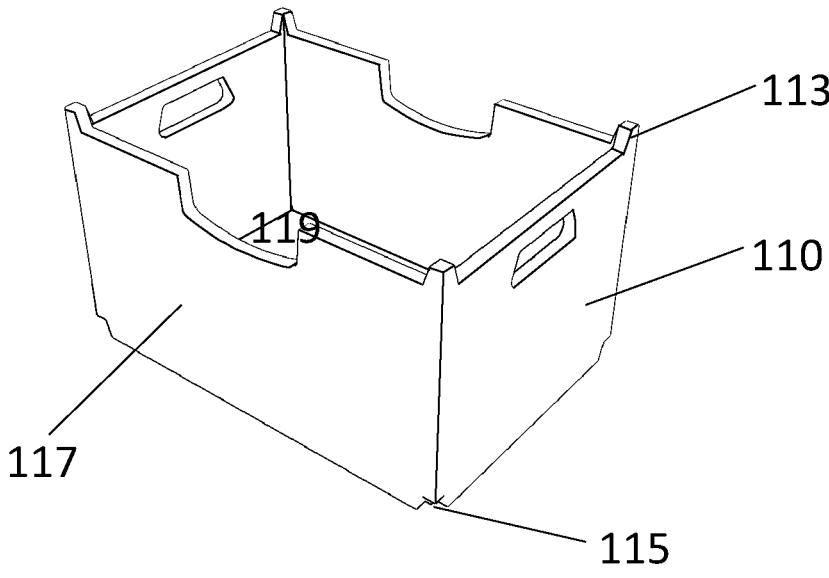
FIG. 19 is a perspective view showing an example of a self-stacking container or storage bin according to an embodiment of the present invention.

To facilitate the containers or storage bins to be stacked in the correct position in the storage space, the containers or storage bins 110 can be modified with one or more interlocking features that cooperate with corresponding interlocking features of an adjacent storage container in a stack. For example, the interlocking feature may comprise one or more locating pins or bosses 113 that are arranged to cooperate with correspondingly shaped recesses 115 in an adjacent container when placed on top in a stack. In the particular embodiment shown in FIG. 19, each of the containers or storage bins 110 comprises sidewalls 117 and a bottom wall 119 arranged in the form of a box with an open end for receiving goods or items to be stored. Each of the container or storage bin walls are modified to comprise one or more locating pins 113 at the rim of the container 110 and a corresponding recess 115 at the base or bottom wall 119 of the container. The rim of the container comprising the one or more locating pins or bosses 113 are shaped to be receivable in a corresponding shaped recess 115 in the bottom wall 119 of another container directly above in a stack. Using the terminology to describe the location of the containers in the grid framework structure discussed above where the container depth in storage is described by a depth value Z, where Z=1 is the uppermost layer and Z=2 is the layer below the uppermost layer and so on as Z increases to the lowermost layer. The locating pins 113 of a container in a lower layer (higher Z value) are arranged to be receivable in the recesses 115 in a container in an upper layer (lower Z value) as a top container is lowered vertically along a vertical axis by the load handling device. The locating pins 113 in the bottom container and the recesses 115 in the top container help to guide the containers into the correct position vertically in the stack. The locating pins and corresponding shaped recesses also help to stabilise multiple containers vertically in a stack.

The locating pins/recesses formed in the walls of each of the containers or storage bins together with the ability of the grabber device to be hoisted at all four corners of the grabber device mitigates the need to provide additional guidance in the form of the vertical uprights when positioning individual containers in a given stack in a storage column. However, where the vertical uprights provide a dual purpose of supporting the grid structure at the intersections and guiding the containers along the vertical uprights in a stack, the ability to support the grid structure at the corner sections as shown in FIG. 13 removes the need to support the grid structure at each of the intersections or nodes. Whilst support of the grid structure has been transferred to the corner sections 102, any additional guidance of the containers or storage bins into their correct stack in the storage space need not have the necessary structural characteristics to support the grid structure at the intersections or nodes as the vertical uprights in the art, i.e. a compression member.

Figure 20:
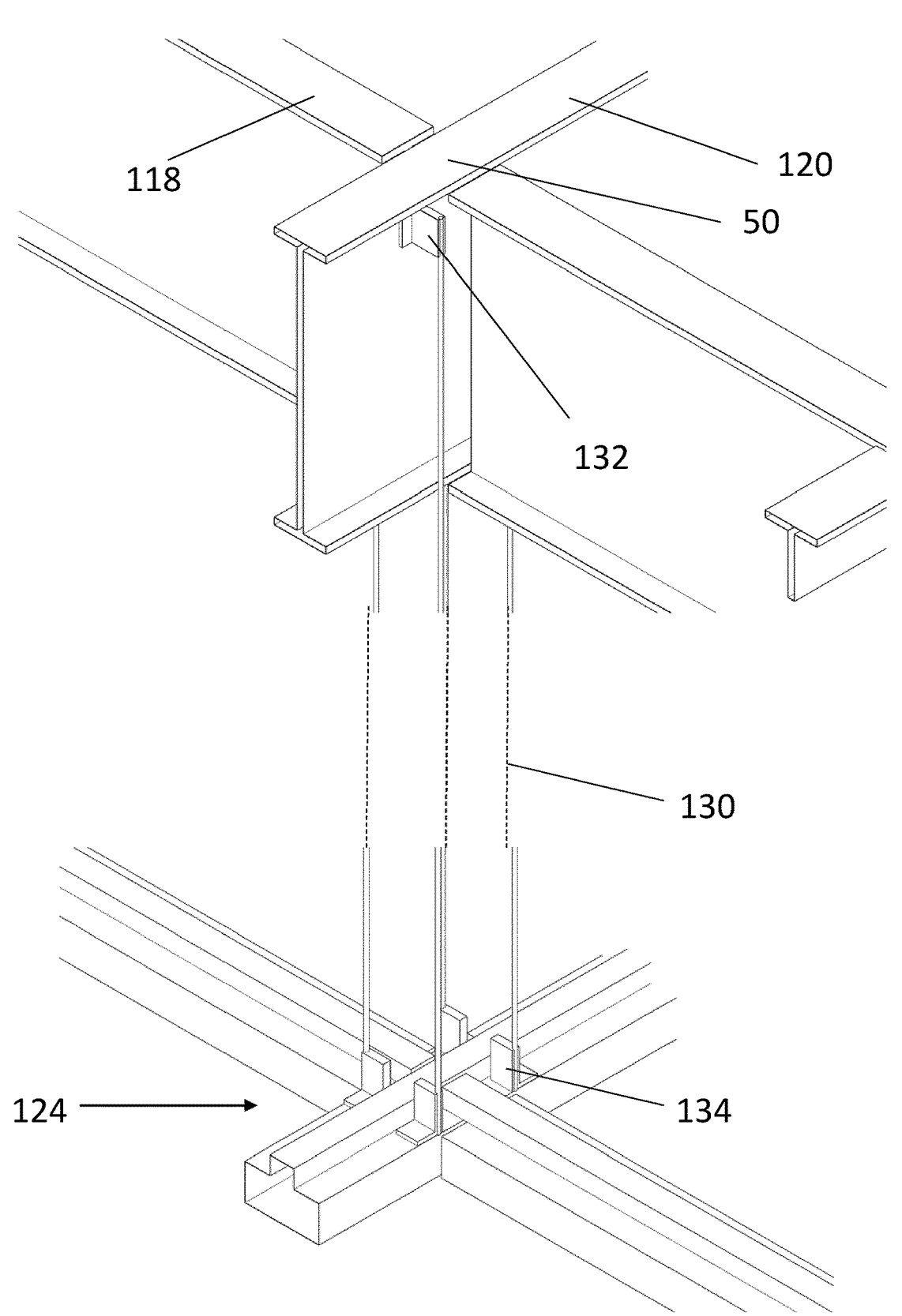
FIG. 20 is a perspective view of cable guides at the nodes or intersections of the grid members for guiding the movement of the storage bin or container in a stack.

In one aspect of the present invention, cables or tethers (or guiding tethers) 130 can be arranged to extend between one or more intersections or nodes 50 of the grid structure and the floor. The cables or tethers 130 can be tensioned, i.e. using a pre-tensioner (not shown) commonly known in the art, to provide a surface for guiding the movement of the containers or storage bins along the tethers or cables 130 into their correct position into a stack. FIG. 20 shows a perspective view of multiple cables or tethers 130 anchored 132 at a node or intersection 50 of the grid structure 140 to one or more anchor points 134 strategically placed on the ground or floor corresponding to the corners of the grid cells such that one or more containers are guided along the tethers into the correct position in a stack. In the particular embodiment of the present invention shown in FIG. 20, a first end of a cable or guiding tether 130 is anchored 132 to a grid member at a node 50 and a second end of the cable or guiding tether 130 is anchored 134 to a point where the floor rails 124 intersect on the ground.

The tethers or cables 130 are sufficiently tensioned to provide a guiding surface for the containers or storage bins to be lowered or to be lifted in the correct position vertically in a stack or through a grid cell and thereby prevent containers in neighbouring stacks from colliding with each other as they are being lifted or lowered. Guiding of the containers vertically into a stack or through a grid cell is not limited to the tethers being anchored at the intersections or nodes of the grid cell since the containers or storage bins can be guided along any contact surface or wall of the containers or storage bins so as to allow the containers or storage bins to be positioned into the correct stack. For example, the containers or storage bins can be guided along any of the sidewalls of the containers or storage bins. Like the vertical uprights, a group of two or more tethers or cables 130 can be arranged to extend between the grid structure and the floor to create a single storage column for one or more containers or storage bins to be stored in a stack. Multiple tethers or cables 130 can be arranged to extend between the grid structure and the floor to create multiple storage columns. Each tether or cable 130 in the grid framework structure may be common for up to two or more separate storage columns, i.e. one or more tethers may be shared amongst adjacent storage columns. Four guiding tethers are shown in FIG. 20 extending between the grid structure and the floor rail at a node of the grid structure to provide a guiding surface for four adjacent containers or storage bins. This is repeated at one or more nodes of the grid structure.

Figure 21:
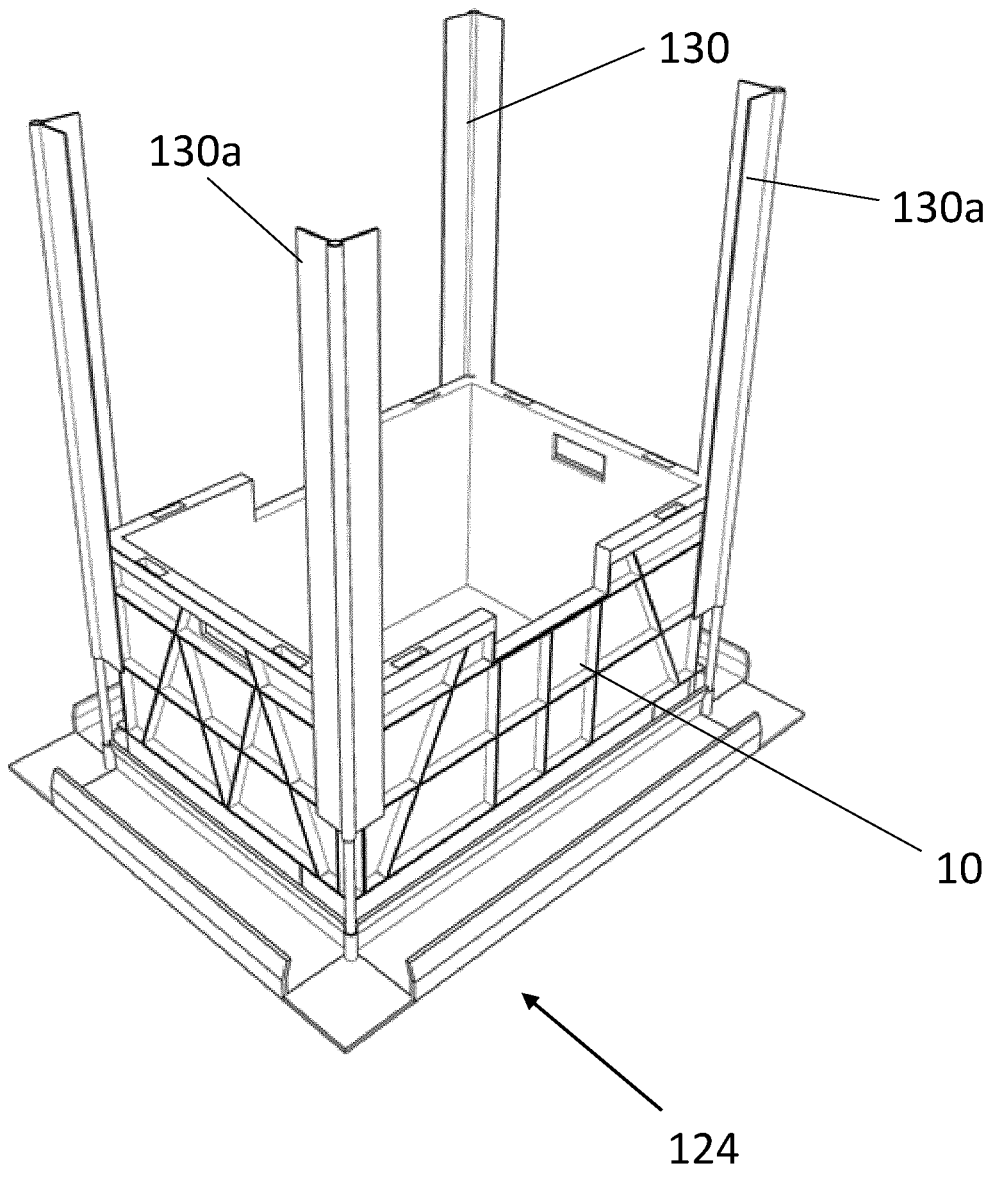
FIG. 21 is a perspective view of the cable guides comprising sleeves that are shaped to accommodate the corners of a storage bin or container according to an embodiment of the present invention.

Various known fixtures can be used to anchor the tethers or cables to the grid structure and the ground or floor. These include but are not limited to hooks. Tensioners include but are not limited to sprung based tensioners commonly known in the art. The guiding tethers 130 can be any cabling including but are not limited to steel cabling, rope, etc. The guiding tethers 130 can comprise a sleeve 130*a* or can be coated with a polymeric material to facilitate the movement of the containers or storage containers along the guiding tethers to minimise abrasion to the containers or storage bins, which may be largely composed of plastic, or wear to the guiding tethers. The sleeve 130*a* can be shaped to correspond to a corner section of container or storage bin. In the particular embodiment of the present invention shown in FIG. 21, the sleeve 130*a* is shaped to comprise two perpendicular bin guiding plates for accommodating a corner of a storage bin.

In assembling the grid framework structure of the present invention, the vertical uprights 116 are erected in strategic positions braced by at least one bracing member 104, 106 extending from each of the upper ends of the vertical uprights to create a perimeter bracing structure around the grid structure 140. An additional bracing member can extend between each of the vertical uprights. In the particular example of the present invention shown in FIG. 13, at least one diagonal bracing member 106 extends between each of the vertical uprights 116. The grid structure 140 is mounted to the perimeter bracing structure and/or the vertical uprights. Optionally, guiding tethers 130 can be anchored at strategic locations to the grid structure 140 and the floor or floor rail 124 for guiding the movement of the containers in their correct position in a stack.

In comparison to having vertical uprights at each of the intersections or nodes of the grid structure, the grid framework structure of the present invention supported by five or fewer vertical uprights (in this case a single vertical upright at each of the corner sections of the grid structure) greatly reduces the processing steps required to erect the grid framework structure which are largely absorbed by the time to erect the vertical uprights at each of the intersections or nodes of the grid structure.

Figure 22:
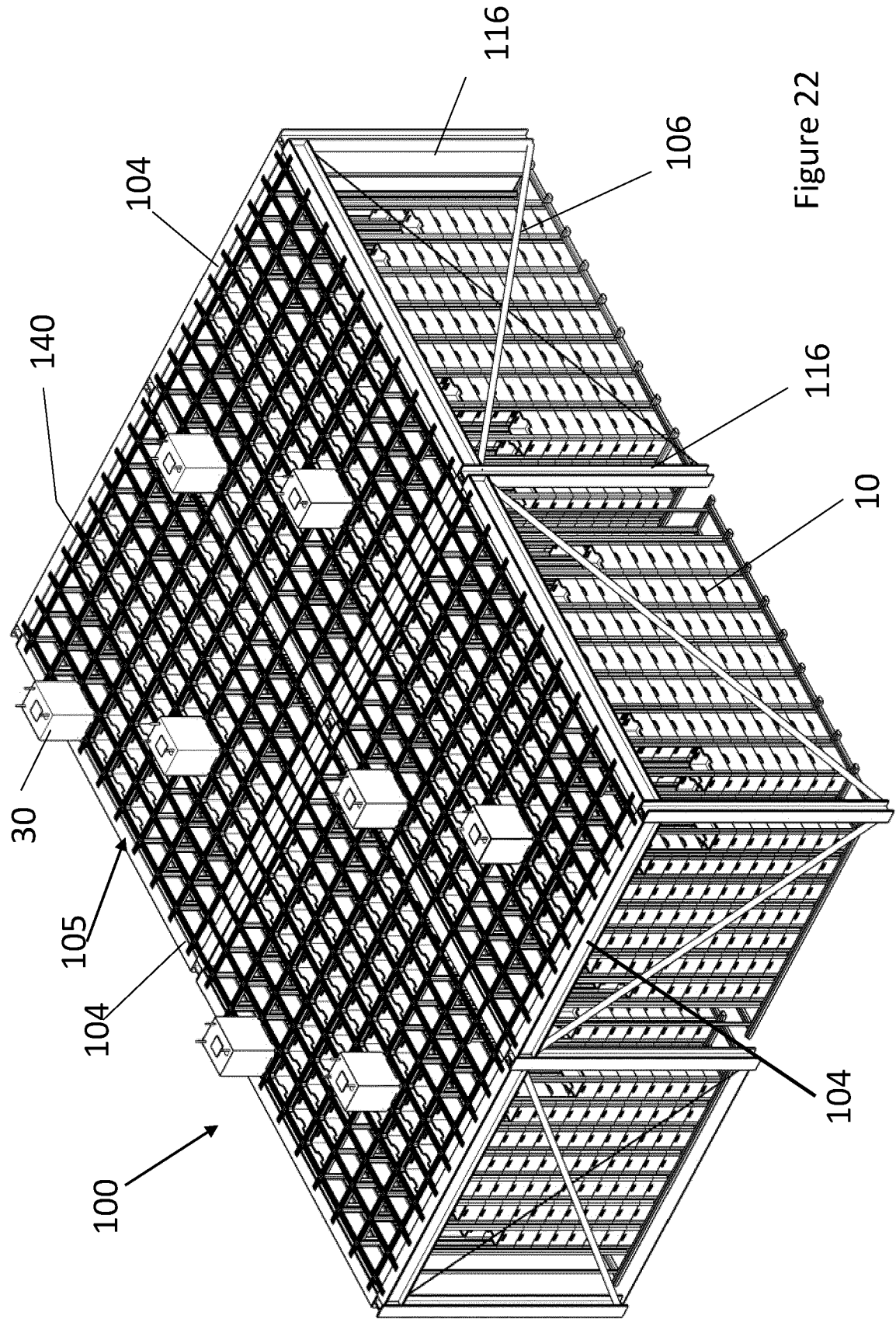
FIG. 22 is a perspective view of an assembly of multiple modular units, each modular unit being the grid framework structure of FIG. 13.

The grid framework structure shown in FIG. 13 can form part of a modular unit 100. Multiple modular units 100 can be assembled together to create a larger storage space for the storage of multiple stacks of containers, i.e. the storage space of a modular unit can be extended into multiple modular units. The vertical uprights 116 and the perimeter bracing structure 105 can be shared amongst neighbouring modular units such that the at least one common horizontal bracing member 104 is shared with an adjacent or neighbouring modular units. This can be demonstrated by the schematic representation of an assembly of multiple modular units shown in FIG. 22. The grid structure 140 can be arranged to extend across multiple modular units such that the grid structure extends across the perimeter bracing structure shared with an adjacent or neighbouring modular unit whilst still supporting a corner section of the grid structure, the corner section comprising four adjoined grid cells within each modular unit supported by five or fewer vertical uprights. However, the drawback with this arrangement is that maximum storage space is not attainable due to the perimeter bracing structure 105 between neighbouring modular units, in particular the horizontal bracing member 104 occupying a portion of the grid structure extending between neighbouring modular units, i.e. occupying useful storage space. In the particular embodiment shown in FIG. 22, a row of grid cells, and thus valuable storage space, is lost as a result of the horizontal bracing member 104 extending between the vertical uprights at the junction between neighbouring modular units.

To overcome this drawback between adjacent or neighbouring modular units impinging on one or more grid cells, in another embodiment of the present invention, each of the vertical uprights 216 can be configured to occupy one or more storage columns such that one or more containers in a stack can be stored within the vertical upright 216. In the particular embodiment of the storage system 200 shown in FIG. 23, each of the vertical uprights 216 is configured to occupy a single storage column. Thus, the vertical upright 216 has a dual purpose of providing structural support to the grid structure 240 but also providing the ability to provide a storage column for the storage of one or more containers in a stack. This prevents the vertical uprights and the horizontal bracing member occupying valuable storage space that can be used for the storage of containers in a stack below the grid structure. In the particular embodiment shown in FIG. 23, each of the vertical uprights 216 comprises an assemblage of truss members 219 arranged in a square configuration having a cross sectional shape corresponding to a single grid cell. More specifically, each of the vertical uprights 216 comprises four vertical frame members 220 arranged in a square or rectangular configuration braced by one or more diagonal bracing members 222. The top of the vertical upright 216 comprise straight members 224 extending from each of the four vertical frame members 220 and arranged in a square or rectangular configuration so as to provide a surface for mounting the grid structure 240 at a corner section. The square or rectangular configuration corresponds to a single grid cell such that the grid structure can either be mounted on the vertical uprights or the vertical upright can be incorporated into a corner section of the grid structure to accommodate a single grid cell. However, the present invention is not limited to the four vertical frame members 220 arranged to correspond to a single grid cell at a corner section, the vertical upright 216 can equally be arranged to occupy to one or more grid cells.

Figures 23, 24:
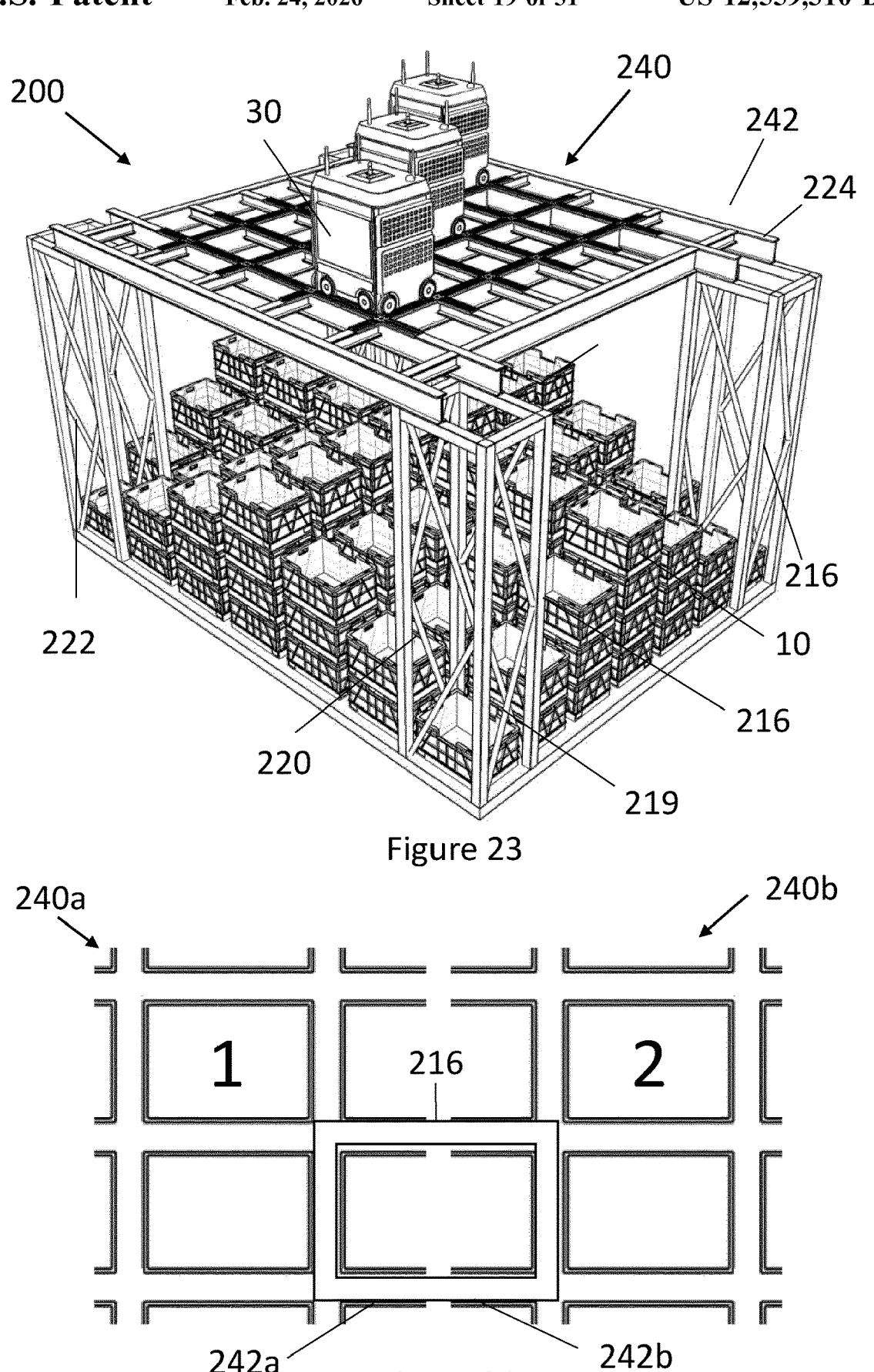
FIG. 23 is a perspective view of a storage system comprising a grid framework structure according to a second embodiment of the present invention.
FIG. 24 is a top plan view of a section of neighbouring grid structures from two adjacent modular units, each modular unit comprising the grid framework structure of FIG. 23.

In the particular embodiment of the present invention shown in FIG. 23, the grid structure is mounted onto the vertical uprights 216 at the corner sections of the grid structure such that a single grid cell at the corner section of the grid structure overlaps the square or rectilinear configuration of the vertical upright 216, i.e. the corner section of the grid structure constituting a single grid cell overlaps a single storage column of the vertical upright 216. A load handling device operative on the grid structure at a corner section can therefore lower a container or storage bin through a grid cell and into the vertical upright 216 where it is stored in a stack. The advantage of configuring the vertical upright to comprise a single storage column for the storage of one or more containers in a stack is that it not only reduces the operations required to assemble the grid framework structure but also adjacent grid framework structures can be assembled together without affecting the storage capability of the complete assembly.

The grid framework structure shown in FIG. 23 can form a single modular unit 200. Multiple modular units can be assembled together to create a larger storage space for the storage of multiple stacks of containers below an extended grid structure, i.e. the storage space of one modular unit can be extended into multiple adjacent modular units. Also shown in FIG. 23 is that only a fraction 242 of a grid cell at a corner section is supported by at least a portion of the vertical upright 216. The grid cell at the corner section is completed by another fraction of a grid cell from a neighbouring modular unit. Thus, the vertical upright 216 at the corner sections only supports a fraction of a grid cell. The fraction could be half a grid cell 242a, 242b or even a quarter of a grid cell 242a, 242b, 242c, 242d. The smaller the fraction supported by the vertical upright at the corner of a grid structure, the greater the number of modular units from adjacent or neighbouring modular units can share a common vertical upright. This allows multiple modular units to be assembled together to complete a grid cell at the vertical upright. This is demonstrated by the different assembly options shown in FIGS. 24 and 25 which shows a top plan view at a corner section of multiple adjacent or neighbouring modular units.

Figure 26:
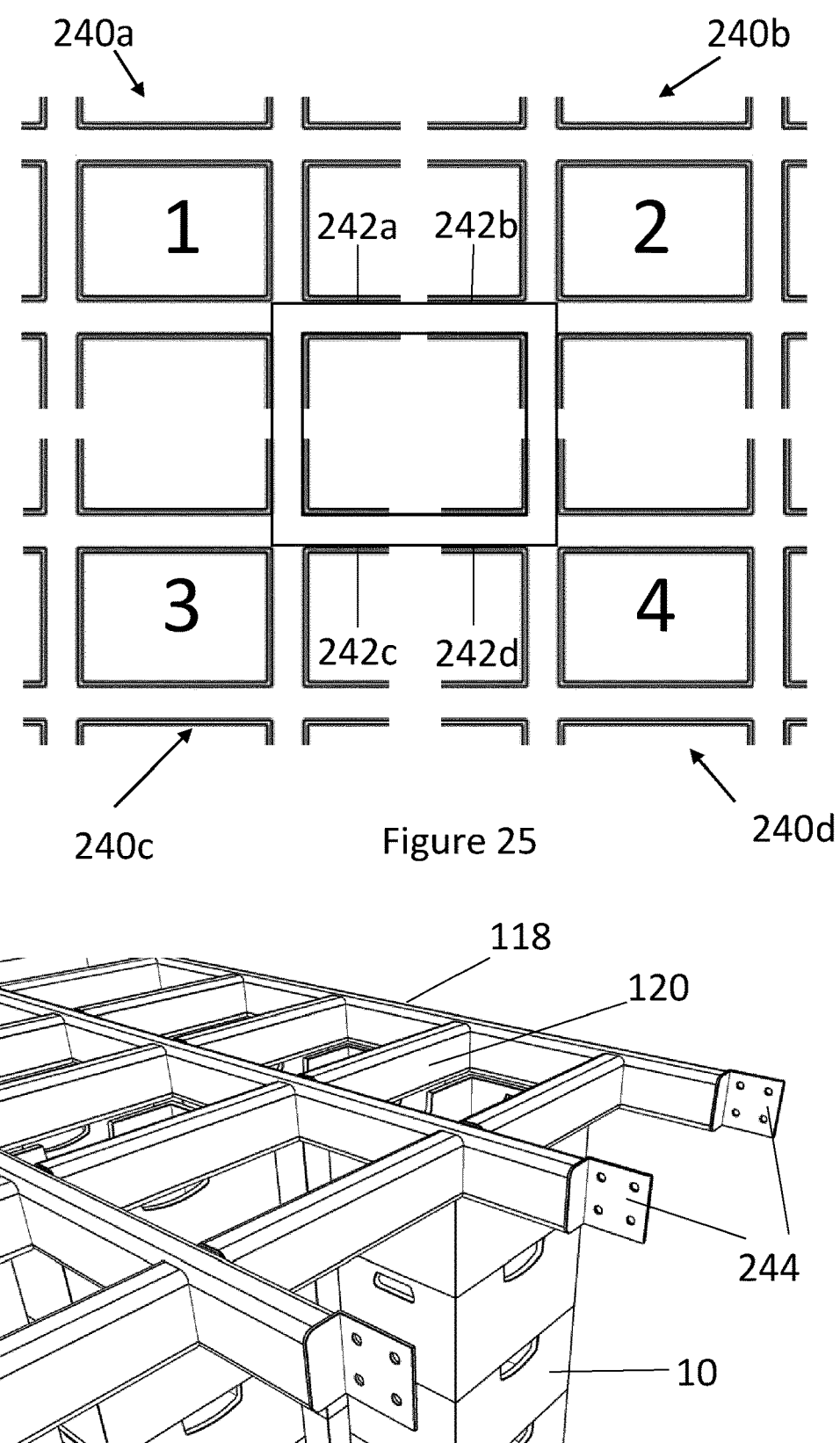
FIG. 26 is a perspective view of a section of a grid structure showing the linkages of the grid members for connection to a neighbouring grid structure.

In FIG. 24, the fraction of the grid cell at the corner section is half 242a, 242b such that the grid structures 240a, 240b from two modular units share a common vertical upright. In FIG. 25, the fraction of the grid cell at the corner section is a quarter 242a, 242b, 242c, 242d such that the grid structures 240a, 240b, 240c, 240d from four modular units share a common vertical upright. The linkages joining adjacent grid structures from neighbouring modular units together can include but are not limited to welding, bolts, and/or rivets. The linkages joining adjacent grid structures from neighbouring modular units together can comprise a connection plate 244 that mates with a corresponding connection plate 244 of an adjacent grid structure to complete a grid cell or at least a portion of a grid cell depending on whether the fraction is half a grid cell or a quarter of a grid cell. In the particular embodiment shown in FIG. 26, the connection plate 244 extends from the grid members 118, 120 and is orientated with the greatest surface area lying perpendicular to the horizontal plane in which the grid lies and comprises one or more holes to receive bolts. When adjacent grid structures are brought together their corresponding connection plates 244 mate to complete a grid cell or at least a portion of a grid cell. Multiple grid structures 240 from neighbouring modular units can be joined together to form an extended grid structure according to an embodiment of the present invention.

Figure 27:
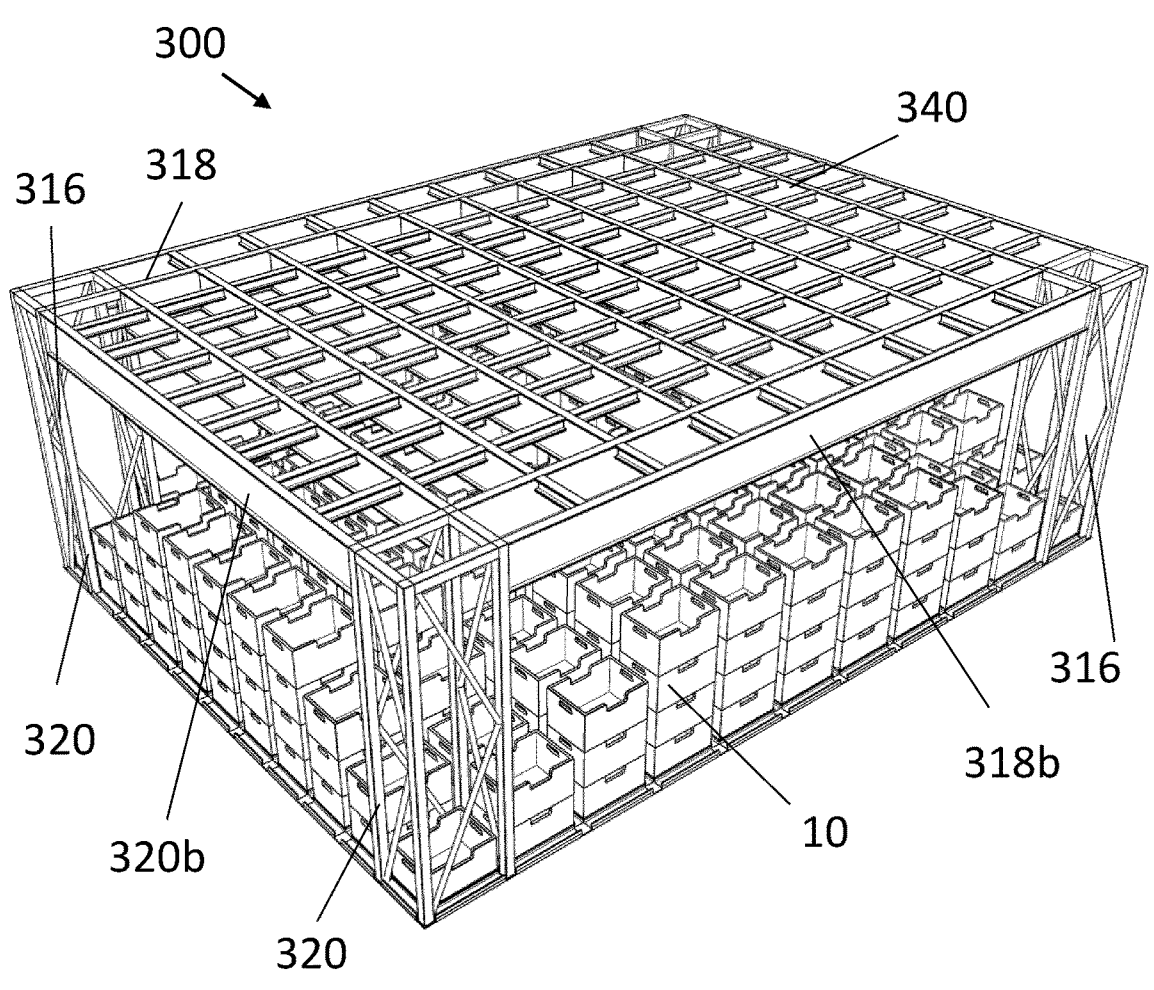
FIG. 27 is a perspective view of a storage system comprising a grid framework structure according to a third embodiment of the present invention.

In yet a further embodiment of the present invention, the connection between the grid structure 340 at the corner section and the vertical upright 316 can be such that the square or rectilinear configuration of the vertical upright 316 forms a single grid cell at the corner of the grid structure 340, i.e. the grid structure 340 accommodates the square or rectilinear configuration of the vertical upright 316 at the corner of the grid structure 340. In other words, the square or rectilinear configuration of the vertical uprights 316 can be incorporated into the grid pattern of the grid structure, particularly at the corners of the grid structure. The same vertical upright discussed above with reference to FIG. 23 can be used but the grid structure is mounted to the side of the vertical upright 316 rather than being mounted on top of the vertical upright. Cut-outs 318 to the size of a single grid cell is made at the corners of the grid structure 340 to accommodate the vertical upright 316. This is demonstrated by the embodiment of the storage system 300 shown in FIG. 27. The missing grid cell at the corner sections of the grid structure 340 can be connected to the side of the vertical frame members 320 of the vertical uprights 316 to complete the grid structure such that the square or rectilinear configuration of the vertical uprights 316 is flush with the surface of the grid structure. A load handling device operative on the grid structure can thus travel over the vertical upright 316 and therefore treat the vertical upright as a grid cell. Whilst the particular embodiment shown in FIG. 27 shows the vertical upright accommodating a single grid cell in a storage column, the vertical upright can be sized to accommodate one or more grid cells. The grid members 318*b*, 320*b* around the periphery of the grid structure 340 can be made more substantial in comparison to the grid members throughout the interior of the grid structure so as to provide sufficient structural support for connection to the vertical uprights 316.

Figure 28:
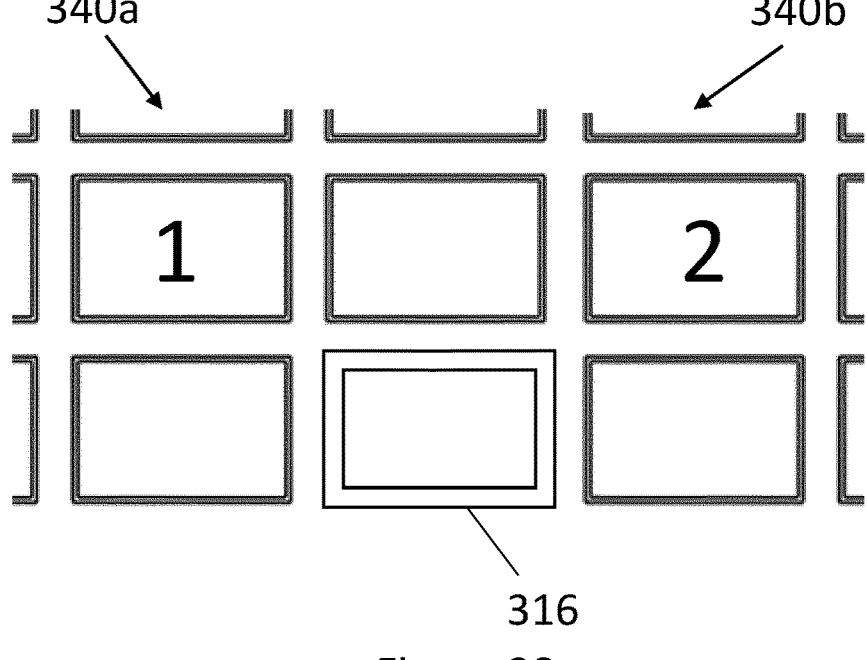
FIG. 28 is a perspective view showing a section of a grid structure from neighbouring modular units, each modular unit being the grid framework structure of FIG. 27.

As with the embodiment shown in FIG. 23, the grid framework structure shown in FIG. 27 can form a single modular unit 300. Multiple modular units can be assembled together to increase the storage space. FIG. 28 shows a top plan view of the corner sections of two adjacent or neighbouring modular units 340*a*, 340*b* whereby a common vertical upright 316 is shared amongst two modular units 340*a*, 340*b* at the corner sections of the modular units 340*a*, 340*b*. In order for adjacent or neighbouring modular units to be assembled together to extend the storage space, the corner section of one of the module units 340*a* has a grid cell missing so as to accommodate a vertical upright 316. The grid structure 340 of a neighbouring or adjacent modular can then butt up next to the modular unit accommodating the vertical upright 316 to extend the grid structure and thus the storage space as demonstrated in FIG. 28.

As with the embodiment described with reference with FIG. 23 above, the stacks of containers are stored in an open space and therefore guided through a respective grid cell above by a load handling device operative on the grid structure by releasably grabbing a container below via the grabber device and lifting the container up through a grid cell. The grabber device suspended by four lifting tethers at the corners of the grabber device helps to maintain the stability of the container as it is hoisted by the lifting mechanism of the load handling device. To provide further guidance for a container as it is lifted or lowered from a stack by the load handling device, one or more guidance tethers as discussed above can be anchored to the grid structure and the floor or floor rail in strategic locations and placed under tension to offer a guiding surface to guide the container as it is lifted or lowered by the load handling device.

In both embodiments shown in FIGS. 23 and 27, the grid members bear the weight of one or more load handling devices operative on the grid structure 240, 340. Here, the grid members are predominantly load bearing and therefore comprise load bearing beams such as an I beam or other cross-sectional shapes that are able to provide a load bearing beam known in the art. These include but are not limited to load bearing beams having cross-sectional shapes like L (angles), C (channels), or tubes or box sections. In the particular embodiment shown in FIG. 27, the grid members are I beams. As discussed above, the grid members can be welded together at the intersections instead of being bolted together to provide a more rigid and sturdy joint than can be provided by bolting alone. Thus, lateral forces generated in the grid structure are transferred as bending moments at the joints where the grid members cross at each of the vertical uprights. In accordance with one aspect of the present invention, the grid members at the intersections are rigidly connected together to form at least one Vierendeel truss. As with the first embodiment of the present invention described with reference to FIGS. 13 to 17, the term "grid members" is loosely defined as comprising track supports and/or tracks. The tracks can be integrated into the track supports. For example, the profile of the tracks can be shaped into the track supports.

Assembling the grid framework structure involves erecting the vertical uprights and connecting or mounting the grid structure to the vertical uprights at the corner sections. The grid structure can be pre-assembled or assembled together on site. The removal of the vertical uprights at each of the intersections or nodes greatly reduces the time, and thus cost, to erect the grid framework structure of the present invention. Bolts or other suitable attachment means may be used to secure the diagonal braces to the upright columns. The grid members can be fabricated from steel or other metallic material.

Truss Grid Structure

Figures 29, 30:
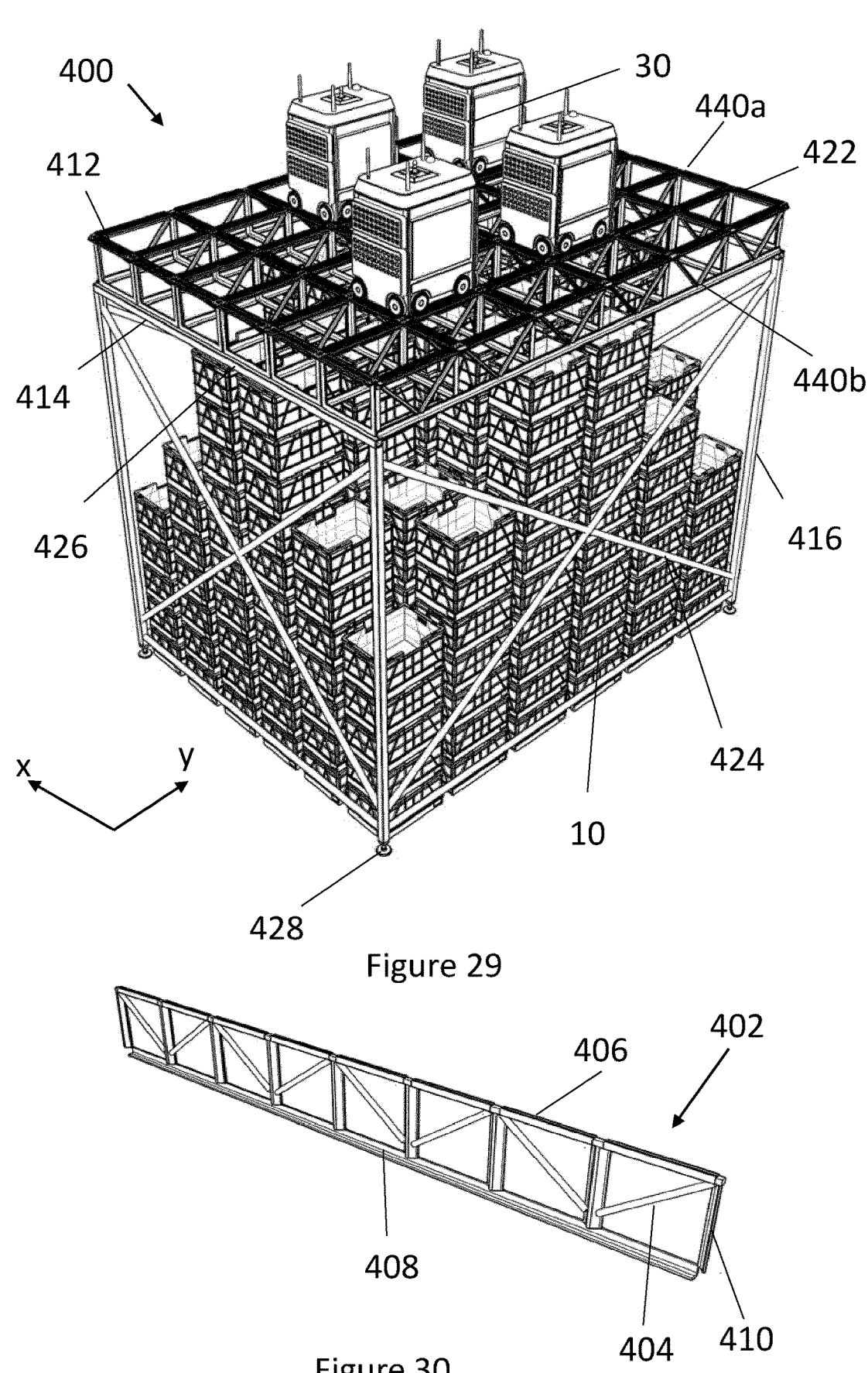
FIG. 29 is a perspective view of a storage system comprising a grid framework structure according to a fourth embodiment of the present invention.
FIG. 30 is a perspective view of a truss making up the grid structure shown in FIG. 29.

In contrast to having the grid members of the grid structure more substantial (in thickness and weight) in order to collectively bear the weight and lateral forces experienced as a result of one or more load handling devices operative on the grid structure, in yet a further embodiment of the present invention (fourth embodiment), the grid structure 440*a* can be supported on or formed from an assembly of trusses. The assembly of trusses provides a lightweight rigid structure comprising a triangulated system of straight interconnected structural elements that are in axial tension or compression. In the particular embodiment (fourth embodiment) of the storage system 400 shown in FIG. 29, the track 422 is supported on an assembly of Warren trusses comprising diagonal bracing members joining upper and lower chords or members. An example of an individual truss member or truss 402 making up the truss assembly is shown in FIG. 30. Whilst the particular embodiment shows an assembly of Warren trusses, the truss assembly can be any type of truss that provides structural rigidity to the grid framework structure against lateral forces including but not limited to Warren Truss or a K Truss or a Fink Truss or a Pratt Truss or a Gambrel Truss or a Howe Truss. In the particular embodiment of the present invention, the diagonal bracing members 404 are arranged between the upper 406 and lower 408 chords to form a K brace. The truss assembly may have a triangular or other non-trapezoidal shape. For example, other diagonal configurations are applicable including but not limited to an X brace between the upper and lower chords. In operation of the grid structure, the upper chords 406 are typically in compression and the lower chords 408 are typically in tension in the assembly. In addition to the diagonal bracing members 404 connecting the upper 406 and lower chords 408, straight downward members or webs 410 are disposed between the upper 406 and lower chords 408.

The assembly of trusses are laterally joined together in the horizontal plane separated with respect to each other by one or more straight cross members 412 extending in a first direction. The straight cross members 412 are fixedly connected between the upper chords 406 of neighbouring trusses 402. Optionally, the straight cross members 414 are fixedly connected between the lower chords 408 of the neighbouring trusses 402. The straight cross members 412 connecting the individual truss members 402 together are spaced apart in equal intervals along the longitudinal length of the truss members 402 extending in a second direction. The separation between the individual trusses 402 and the spacing of the straight cross members 412 connecting the individual trusses members 402 together are arranged to create a grid pattern that resembles the grid pattern of the grid structure discussed above, i.e. the first direction is substantially perpendicular to the second direction. In the particular embodiment of the present invention shown in FIG. 29, the upper chords 406 of neighbouring trusses 402 and the straight cross members 412 connecting the upper chords 406 together are arranged to provide an upper grid structure comprising a plurality of grid cells. Similarly, the lower chords 408 of neighbouring trusses 402 and straight cross members or lower straight cross members 414 connecting the lower chords together are arranged to provide a lower grid structure comprising a plurality of grid cells. To keep consistent with the language used in the other embodiments of the present invention (first, second and third embodiment of the present invention), the grid structure in this embodiment of the present invention comprises an upper grid structure 440*a* and a lower grid structure 440*b*. The grid cells of the upper grid structure 440*a* and the grid cells of the lower grid structure 440*b* align such that a grabber device from a load handling device 30 operative on the upper grid structure 440*a* can be lowered and/or be raised through the grid cells in the upper grid structure 440*a* and the lower grid structure 440*b*, i.e. the grid cells in the upper 440*a* and lower grid structure 440*b* vertically overlap such that their respective grid cells align.

The assembly of the upper chords 406 and the straight cross members 412 between neighbouring trusses 402 are arranged in a grid pattern to provide a track support comprising a plurality of grid cells. Mounted to the track supports are tracks 422 arranged in a similar grid pattern having a first set of tracks extending in a first direction and a second set of tracks extending in a second direction, the first direction being substantially perpendicular to the first direction. The track support and the tracks are arranged in a grid pattern to define the grid structure of the present invention. The plurality of tracks 422 comprise engagement features that can be snap fitted to corresponding engagement features on the track support of the upper grid structure 440*a*. Equally applicable in the present invention is that the tracks 422 are integrated into the upper chords 406 and the straight cross members 412 between neighbouring trusses 402 so as to allow one or more load handling devices 30 to travel on the upper grid structure 440*a*. For example, the profile of the upper chords 406 and the straight cross members 412 between neighbouring trusses 402 are shaped to provide tracks 422. For the purpose of the present invention, the track can comprise either a single track or a double track.

The assembly of trusses 402 is connected together to provide the upper grid structure 440*a* and the lower grid structure 440*b*. The track support comprising the assembly of trusses is raised above the floor by being mounted to four vertical uprights 416 at its corner sections to create an open storage space for the storage of containers 10, 110. The truss assembly is arranged in a square or rectilinear configuration supported by four vertical uprights 416 at the corners of the truss assembly. As with the embodiments shown in FIGS. 13 to 28, the corner sections of the truss assembly, and thus the grid structure 440*a* comprising four adjoined grid cells (e.g. at the upper and/or lower grid structure), is supported by a single vertical upright 416. This is repeated at all four of the corner sections of the truss assembly. The vertical uprights 416 supporting the grid structure 440*a* at the corners of the grid structure can be braced by one or more diagonal 424 and/or straight horizontal bracing members 426. The straight horizontal bracing members 426 bracing the upper end of the vertical uprights 416 can correspond to the straight cross members 414 between neighbouring trusses 402.

In the particular embodiment shown in FIG. 29, the vertical uprights 416 are braced by an X brace at each side or face of the grid framework structure. To compensate for an uneven floor, an adjustable foot 428 is mounted to the lower end of each of the vertical uprights 416. In the particular embodiment of the present invention, the adjustable foot comprises a threaded shaft that can be extended or retracted to adjust the height of the adjustable foot 428. The assembly of beams (chords) or elements 406, 408 making up the trusses 402 and the straight cross members 412, 414 could be an I beam or any other cross sectional shaped beam, e.g. box shape, L shape or C shape.

The advantage of the truss assembly over a grid structure fabricated from heavy load bearing beams described with reference to FIGS. 13 to 28 is that it provides the truss assembly with an opportunity to fabricate the grid structure from lightweight materials. The truss assembly can be pre-assembled fully or partially prior to being mounted to the vertical uprights on site. The triangulated system of straight interconnected structural elements that are in axial tension or compression permit different types of materials to be used for the truss elements including but not limited to steel, aluminium, or even lighter materials such plastic material or composite materials, e.g. carbon fibre reinforced material. Bolts or other suitable attachment means may be used to secure the diagonal braces to the upright columns. The use of composite or polymeric materials for the structural elements of the trusses also permit the use of specialist adhesives to join the structural elements together. The use of lightweight materials or beams making up the truss elements or members 402 permits the grid structure 440*a* to be easily manually handled on site without or with minimum use of heavy lifting machinery.

As with the other embodiments discussed above, the grid framework structure shown in FIG. 29 can form a modular unit 400. Multiple modular units can be assembled together to create a larger storage space for the storage of multiple stacks of containers below the extended grid structure, i.e. the storage space of one modular unit can be extended into multiple adjacent modular units. One or more of the vertical uprights can be shared amongst neighbouring modular units. Equally, as with the other embodiments of the present invention, the containers in a stack are lifted through a grid cell by one or more load handling devices operative on the grid structure. The grabber device releasably engages with a container 10 in the storage space to lift or lower the container through a grid cell, i.e. through the lower 440*b* and upper 440*a* grid structure. One or more stacks of containers can be arranged on the floor in a regular grid pattern by a floor rail as discussed above which allows one or more load handling devices operative on the grid structure to be able to lower containers or storage bins in their correct position in the storage space.

Similarly, as discussed above, the stacks of containers stored in the storage space can be guided into the correct grid cell by guiding tethers held under tension at strategic locations between the grid structure, i.e. the lower grid structure 440*b* and the floor or floor rail. The guiding tethers can be arranged in a grid pattern corresponding to the grid pattern of the grid structure.

Container Grid

Figure 31:
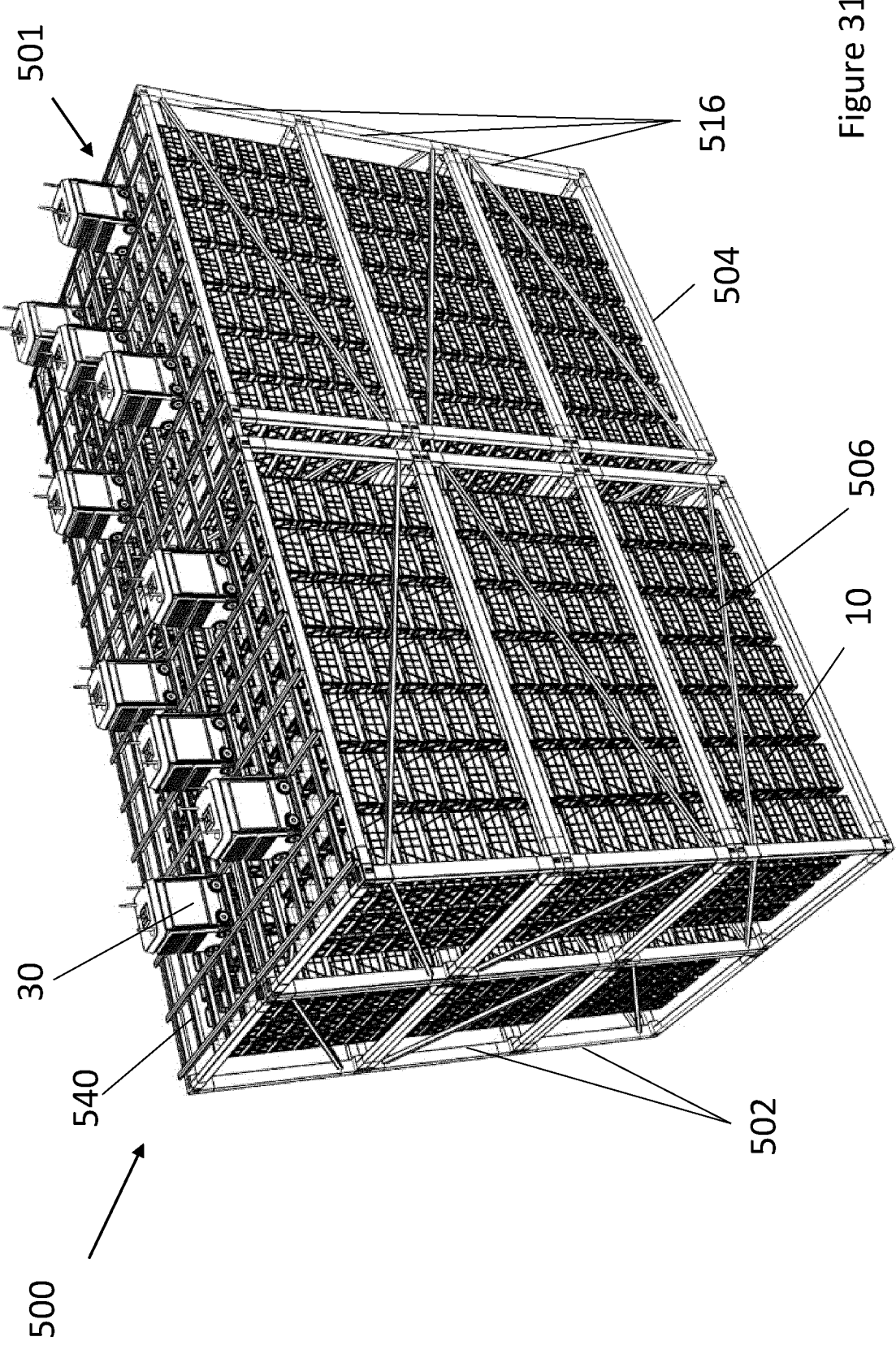
FIG. 31 is a perspective view of a storage system comprising a grid framework structure constituting multiple container frames supporting a grid structure according to a fifth embodiment of the present invention

In yet a further embodiment of the storage system 500 (fifth embodiment of the present invention) shown in FIG. 31, an assembly of multiple modular support unit frames or modular frames or modular storage unit frame 502 are arranged together to support a grid structure 540, i.e. a grid structure 540 extends across or over multiple modular support unit frames 502. For the purpose of the present invention, the term "modular support unit frames", "modular storage unit frame" and "modular frames" are used interchangeably to mean the same feature. The grid structure can be multiple individual grid structures that can be linked or joined together to create a single grid structure that extends across or over multiple modular support unit frames or alternatively, a single integrated grid structure that extends across or over multiple modular support unit frames. Each of the modular support unit frames 502 defines a storage volume or space when assembled together to provide storage for a plurality of stacks of containers. In this way, each of the multiple modular support unit frames 502 can easily be transportable and assembled together to create a storage frame 501 that defines a larger storage volume for the storage of multiple stacks of containers than can be provided by individual modular support unit frames alone. The assembly of the modular support unit frames 502 include but are not limited to stacking the modular support units frames 502, assembling them side-by-side or a combination of both. The grid structure is mounted to the multiple modular support unit frames 502 depending on whether the multiple modular support unit frames 502 are arranged side-by-side or in a stack. Where the multiple modular support unit frames 502 are arranged side-by-side, the grid structure mounted thereon extends across the multiple modular support unit frames 502. Where the multiple modular support unit frames 502 are arranged in a stack, the grid structure extends across one of the multiple modular support unit frames 502 at the top of the stack such that the storage volume of the arrangement extends vertically through the stack.

Each of the modular support units frames 502 comprises four vertical uprights 516 braced together by straight cross or horizontal members 504 and optionally, a diagonal bracing member 506 to form a 3D box frame such that when supporting the grid structure 540, a corner section of the grid structure 540 comprising four adjoining grid cells is supported by a vertical upright 516 of a single modular support unit frame 502. In the particular embodiment of the present invention, the modular support unit frame 502 is fabricated as a container frame, preferably having the dimensions of a shipping container, also known as a shipping container frame. The shape and size of the modular support unit frame 502 permits the modular support unit frames 502 to be transported and assembled on site. For example, fabricating the modular support unit frame 502 to resemble the dimensions of an open shipping container frame allows the modular support unit frame 502 to be transported on the back of a truck to a desired location. Each of the modular support unit frames 502 as shown in FIG. 31 is sized to accommodate a plurality or multiple grid cells and therefore store multiple stacks of containers.

In the particular embodiment of the present invention shown in FIG. 31, multiple modular support unit frames 502 are assembled together in a stack to create a storage frame 501 for mounting the grid structure 540 having a defined storage volume extending through the multiple modular support unit frames 502. The modular support unit frames 502 house or provide a storage volume or space for the storage of a plurality of stacks of containers 10. The storage volume or space can be extended through a stack of modular support unit frames 502 or an assembly of one or more modular support unit frames 502 such that the height of a stack of multiple containers 10 extends through the one or more of the modular support unit frames 502. In the particular embodiment of the invention shown in FIG. 31, the storage volume defined by the storage frame 501 is made up of an assembly of 3×2×2 modular support unit frames 502 (3 modular support unit frames high and 2 modular support unit frames wide and 2 modular support frames deep). However, the storage volume or space can comprise any arrangement of modular support unit frames 502 assembled together in a stack and/or side-by-side. The assembly of modular support unit frames 502 can be connected or interlocked together to create a stable base for mounting the grid structure 540 thereon using various tie members or connecting plates.

Each of the individual modular support unit frames 502 comprise top and bottom frames and side frames that are pre-assembled together prior to delivery on site, e.g. by welding the frames together. The individual modular support unit frames in an assembly are precisely aligned together using various coupling arrangements known in the art. For example, various pins can be used to correctly align the individual modular support unit frames together in the storage frame 501. Alternatively, the individual modular support unit frames can be flat packed for delivery that are subsequently assembled together on site. Various means of flat packing the modular support unit frames 502 known in the art are applicable in the present invention. For example, the top and bottom frames can be transported separately and connected together by vertical uprights at the corners of the top and bottom frames.

The grid structure 540 including the track support is mounted to the assembly of modular support unit frames 502 and secured to the assembly by any known fasteners in the art including but are not limited to welding, bolts, etc. The grid structure 540 is mounted to an assembly of the modular support unit frames 502 such that a corner section of the grid structure comprising four adjoined grid cells is supported by a single vertical upright 516. To accommodate the differing thermal expansion between the grid structure and the storage frame, the joint connecting the grid structure 540 to the modular support unit frames can also include a slip joint as discussed above which allows the joint to move when a load exceeds a predetermined value. One or more load handling devices 30 operative on the grid structure 540 are able to access containers in a stack housed within one or more of the modular support unit frames 502. For example, a load handling device 30 operative on the grid structure is able to retrieve a container housed within a stack of modular support unit frames 502.

The containers 10 are guided through their respective grid cells by a grabber device engaging with the container below and lifting the container through the grid cell. As discussed above, one or more guide tethers can be tensioned to vertically extend between one or more modular storage unit frames 502 in a stack and the floor to provide a surface for guiding the containers towards the correct grid cell. The guide tethers can be tensioned between the grid structure on top and the floor to create a storage column. Furthermore, a floor rail as discussed above can be laid on the floor to assist with the proper alignment or positioning of the containers such that stacks of containers are properly spaced apart in the storage space.

Figure 32:
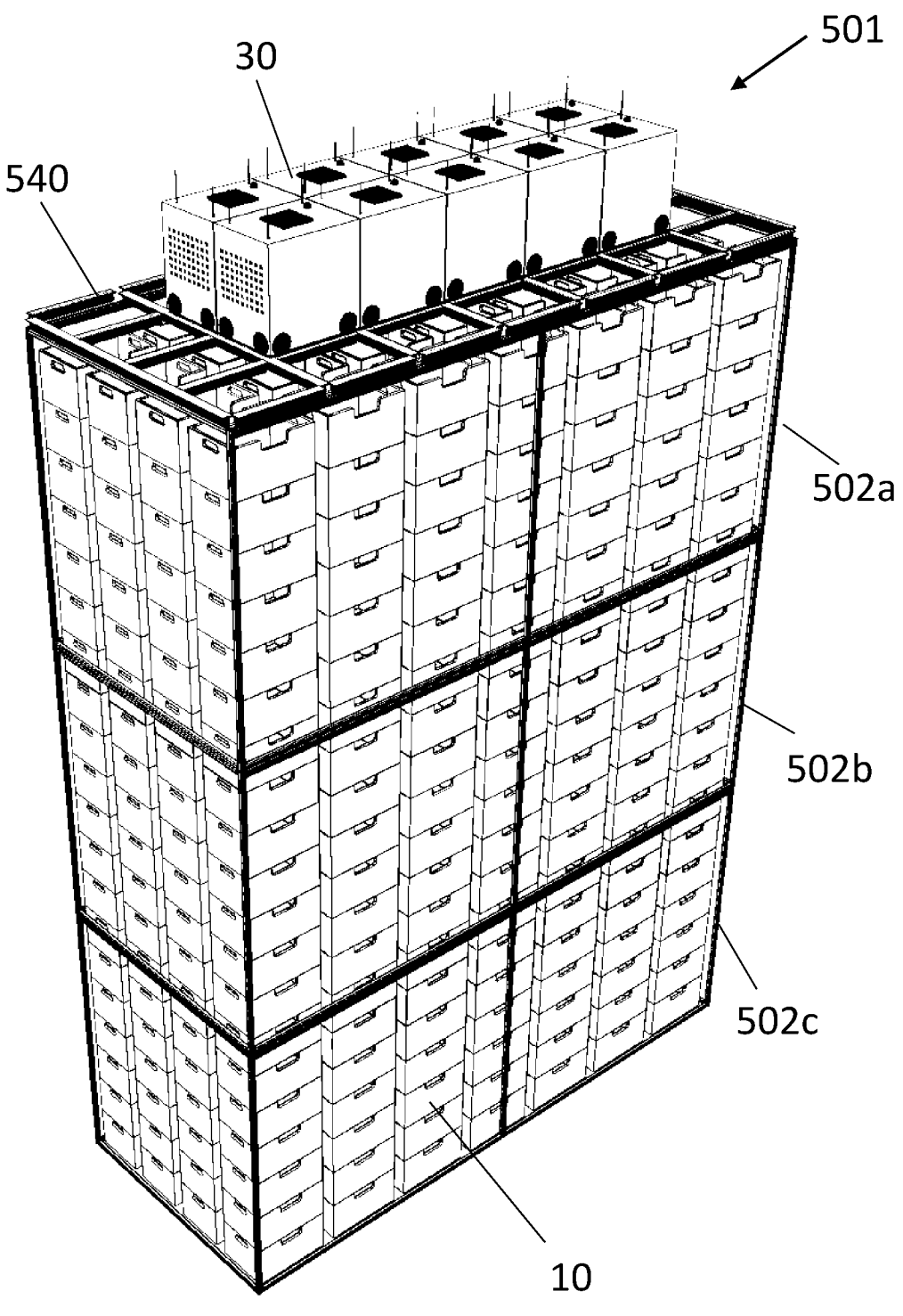
FIG. 32 is a perspective view of a stack of container frames constituting a storage space for storing multiple stacks of containers.

FIG. 32 shows an example of a storage frame 501 comprising a single stack of three container size modular support unit frames 502a, 502b, 502c supporting a grid structure 540 comprising 7×4 grid cells, i.e. each of the modular support unit frames 502a, 502b, 502c is sized to accommodate 7×4 grid cells. The bottom or lower modular support unit frame 502c comprises an adjustable levelling foot (not shown) at each of the corners of the modular support unit frame 502c for adjusting the level of the stack of modular support unit frame 502a, 502b, 502c and thus, the grid structure 540 above. For example, an adjustable foot (not shown) having a threaded shaft can be extended or retracted can be provided at the foot of the corners of the bottom or lower modular support unit frame 502*c* to compensate for an uneven floor.

The middle modular support unit frame 502*b* interposed between the upper modular support unit frame 502*a* and the lower module support unit frame 502*c* is interlocked between the upper 502*a* and lower modular support unit frames 502*c* by one or more fasteners, e.g. fastener plates. The upper modular support unit frame 502*a* supports the grid structure 540 comprising a plurality of grid cells. The grid structure 540 is mounted to and fastened to the upper modular support unit frame 502*a*, e.g. by welding. The grid structure 540 comprising a track or rail can be pre-mounted onto the upper modular support unit frame 502*a* prior to delivery on site. The pre-assembled container frames or modular support unit frames 502*a*, 502*b*, 502*c* provide an assembly that is conducive to assembling the modular support unit frames on-site to create a grid framework structure that is much faster to erect than is currently in the art. The mere fact that the containers or storage bins 10 can be guided by the load handling device 30 operative on the grid structure or track 540 without the need to have vertical supporting uprights at each of the nodes or intersections of the grid members permits the individual modular support unit frames 502*a*, 502*b*, 502*c* to be transported on site on the back of a vehicle. A lifting crane can be used to lift and position the individual containers 502*a*, 502*b*, 502*c* on site where they are assembled and joined together to create an extended storage space for the storage of one or more containers in a stack.

The grid structure 540 including a track or rail for a load handling device to travel is mounted on the assembly of modular support units 502*a*, 502*b*, 502*c*. The ability to pre-assemble the storage space and mount a grid structure 540 on top allows a grid framework structure of the present invention to be assembled on site within one or two days.

Half the Legs Grid

The realisation that little or no physical guides are necessary to guide the containers through a respective grid cell, in yet a further embodiment of the present invention, permits the number of vertical uprights in a storage column shown in FIG. 7 to be reduced such that a container or storage bin is guided along two or a pair of diagonally opposing corners or edges of the container or storage bin. In comparison to a known corner section of a grid structure comprising four adjoined grid cells as shown in FIG. 6, where the grid structure is supported by vertical uprights at each of the nodes or intersections of the grid members, in a particular embodiment of the present invention (sixth embodiment of the present invention) shown in FIG. 33, the grid structure 640 is supported by half the number of vertical uprights 616 such that a container or storage bin is guided along two or pair of diagonally opposing corners or edges of the container or storage bin, i.e. four adjoined grid cells are supported by five vertical uprights rather than nine vertical uprights. Thus, an individual storage column 644 shown in FIG. 34 comprises only two vertical uprights 616 instead of the four vertical uprights for engaging with two corners or edges of a container or storage bin in the storage column. Similarly to the vertical uprights in the art, each of the vertical upright comprises a hollow centre section (typically a box section) with one or more guides mounted to or formed at the corners of the hollow centre section that extends along the longitudinal length of the vertical upright for guiding the movement of the containers along the storage column. The one or more guides comprise two perpendicular container guiding plates.

The two perpendicular container guiding plates are arranged to accommodate a corner of a container or a corner of a stack of containers. In other words, each of the corners of the hollow centre section defines two sides of a substantially triangular area which may accommodate a corner of a container or storage bin. The vertical uprights 616 are arranged within the grid structure 640 in the sixth embodiment of the present invention such that one or more containers in a stack are guided by only two diagonally opposing vertical uprights 616. As a result, the corner section of a grid structure 640 comprising four adjoined grid cells as shown in the top plan view of the grid structure in FIG. 33, is supported by five vertical uprights 616 as opposed to nine vertical uprights as shown in FIG. 6.

Typically, two different lengths of the grid members permits the grid members to be arranged to form a plurality of rectangular shaped grid cells which accommodate the rectangular cross-sectional shaped containers or storage bins. To create an arrangement whereby the number of vertical uprights are reduced by half in a grid framework structure such that alternative nodes or intersections 50 of the grid structure in two perpendicular directions are supported by a vertical upright 616, the grid structure 640 is made up of two or more different lengths of grid members as opposed to a single length grid member to cover the whole of the grid structure.

Figures 33, 34:
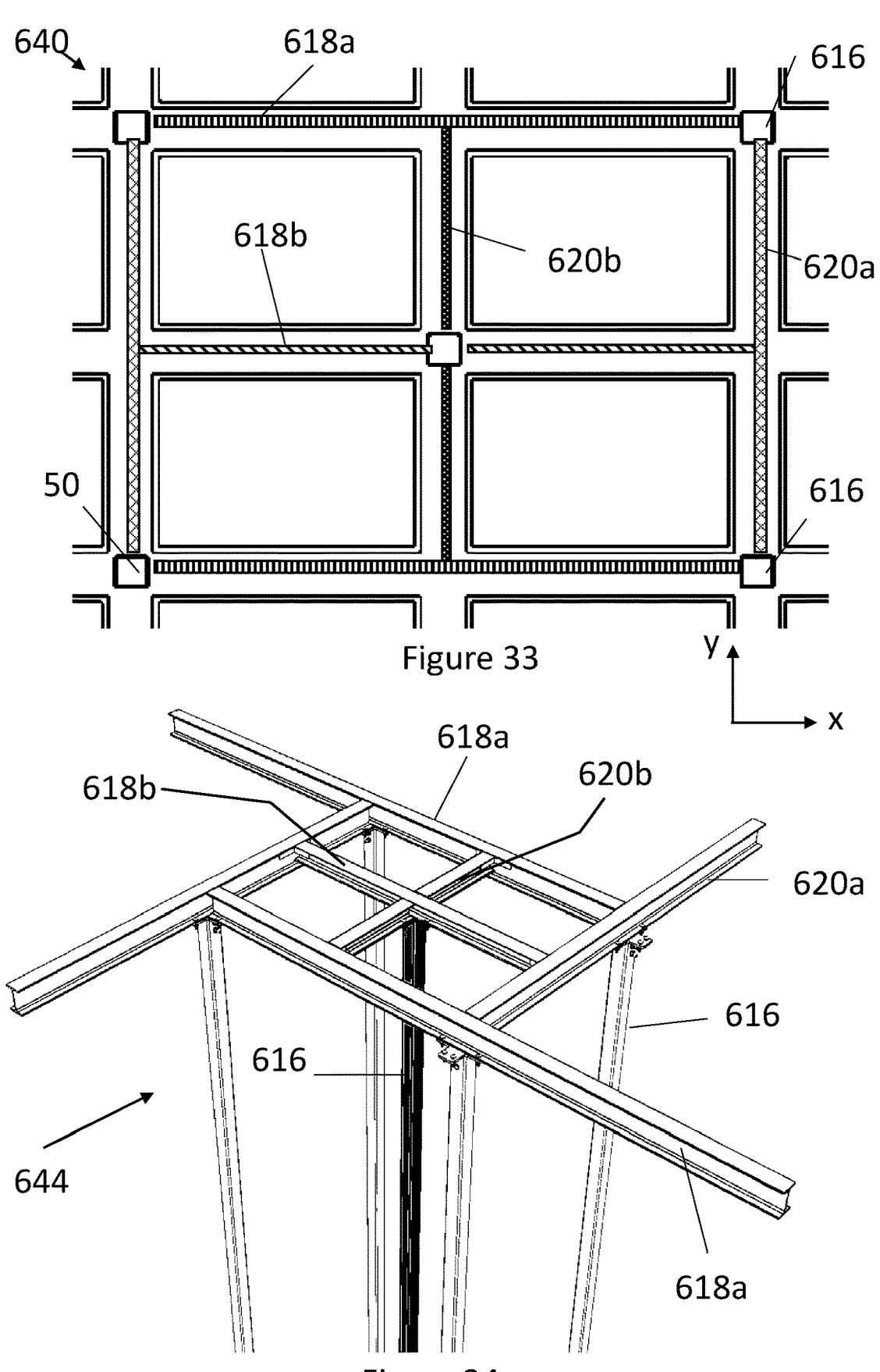
FIG. 33 is a perspective view of a section of the grid structure comprising four adjoined grid cells supported by five vertical uprights at alternative nodes in the x-direction and the y-direction of a grid framework structure according to a sixth embodiment of the present invention.
FIG. 34 is a perspective view of a section of the grid framework structure comprising the grid structure of FIG. 33.

In the particular embodiment of the present invention shown in FIG. 33 and FIG. 34, four different lengths of grid members 618*a*, 618*b*, 620*a*, 620*b* are arranged to form a plurality of rectangular shaped grid cells. Whilst not shown to scale, the arrangement of the grid members creates a pattern where half of the number of nodes or intersections are supported by a vertical upright. As can be clearly made out in FIG. 33, the longer grid members 618*a*, 620*a* represented by the patterned line extends across at least two grid cells and the shorter the grid members 618*b*, 620*b* represented by a different patterned line extends across a single grid cell. The longer grid members 618*a*, 620*a* that extend across at least two grid cells provide the necessary support to remove the need to support a node or intersection by a vertical upright at one or more points or junctions intermediate the ends of the longer grid members 618*a*, 620*a*. Thus, the load experienced by at least one node or intersection unsupported by a vertical upright is borne by the grid members 618*a*, 620*a* extending across at least two grid cells.

A section of the grid structure comprising four adjoined grid cells shown in FIG. 34 comprises a first grid member 618*a* having a first length extending across four grid cells in a first direction (e.g. x-direction), a second grid member 620*a* having a second length extending across four grid cells in a second direction (e.g. y-direction), a third grid member 618*b* having a third length extending across two grid cells extending in the first direction and a fourth grid member 620*b* having a fourth length extending across a single grid cell in the second direction. Whilst the particular example shown in FIG. 34 shows four different lengths of grid members, supporting the grid structure at alternative nodes or intersections can utilise any number of different numbers of lengths of grid members so that at least one length extends across two or more grid cells. Having two or more different lengths of grid members allows the longer of the grid members to extend across two or more grid cells removing the need to support the grid member at every intersection or node between the two or more grid cells by a vertical upright. The grid members 618*a*, 620*a*, 618*b*, 620*b* of different lengths are laid in a grid pattern comprising equally sized grid cells such that the longer of the grid members extends across two or more grid cells and the shortest of the grid members extends across single grid cell. The longer of the grid members 618a, 620a are laid in a staggered arrangement in the grid structure such that they are offset by at least two grid cells in the both the first direction and the second direction.

Various fasteners known in the art can be used to join the individual grid members 618a, 620a, 618b, 620b together at the nodes or intersections and largely depends on the cross-sectional shape of the grid members. These include but are not limited to bolts, rivets, or welding. The grid members can be back-to-back C sections discussed above with reference to FIG. 8 and FIG. 9. However, to provide the necessary structural support, preferably the grid members is an I-beam as shown in FIG. 34 or alternatively, other cross-sectional shapes that provide the necessary structural support for the grid structure to support one or more load handling devices operative on the grid structure are permissible in the present invention. In the particular embodiment shown in FIG. 35, a cap plate 58 discussed above can be used to interconnect the grid members together at the nodes or at the intersections 50. The grid members comprise a track support 618, 620 and/or track 622, where the track 622 is mounted to the track support 618, 620. The track support can be integrated into or form part of the grid members to allow a track to be mounted to the track support. For example, in the case where the cross-sectional profile of the track support 618, 620 is an I-beam, the underside of the track 622 is profiled to cradle a beam flange of the I-beam and engage with the track support in a snap fit arrangement. Alternatively, the track can be integrated into the track support such that the grid member comprises both the track support and the track.

Figure 35:
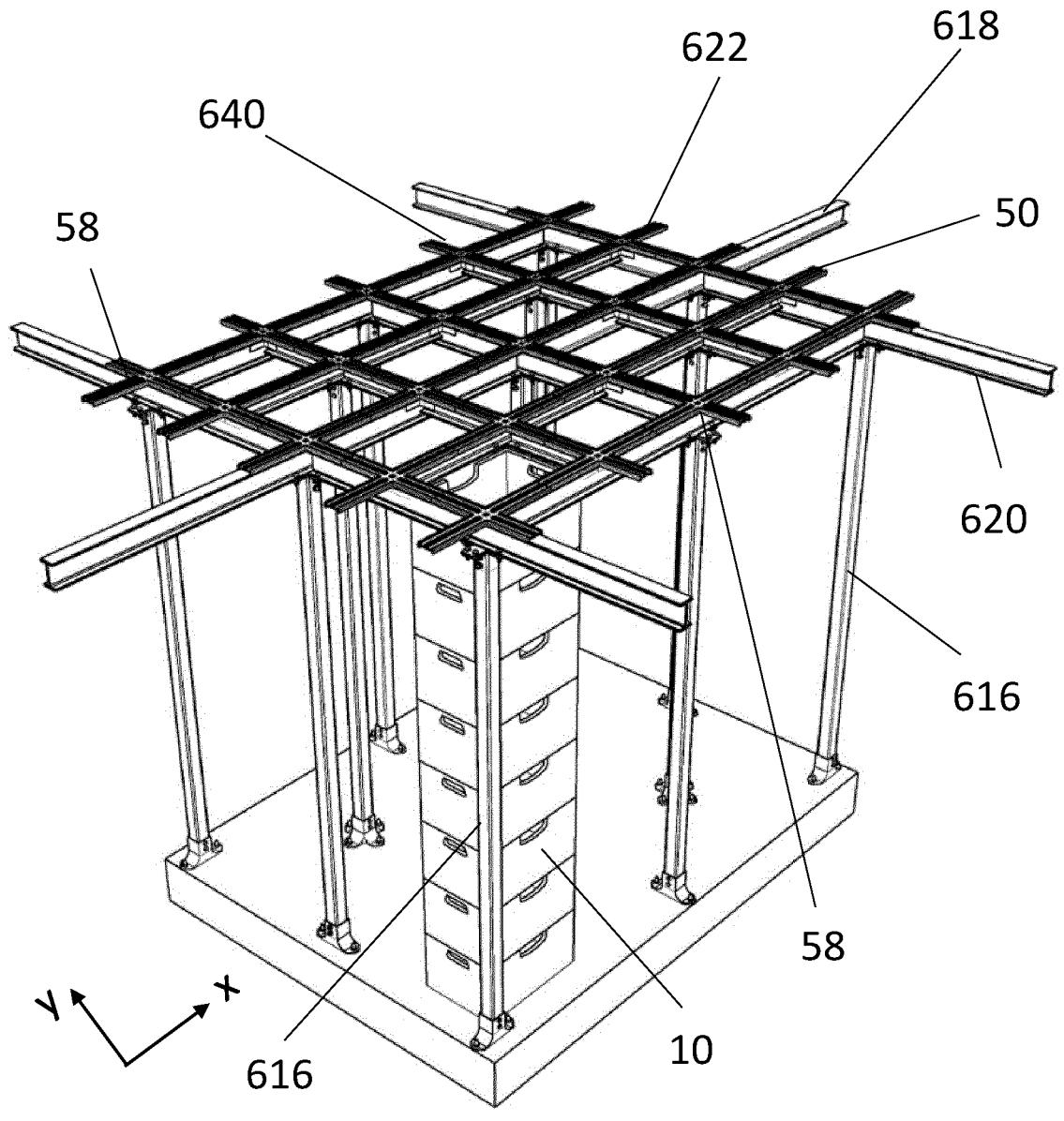
FIG. 35 is a perspective view showing the arrangement of the vertical uprights supporting the grid structure of FIG. 33.
Figure 36:
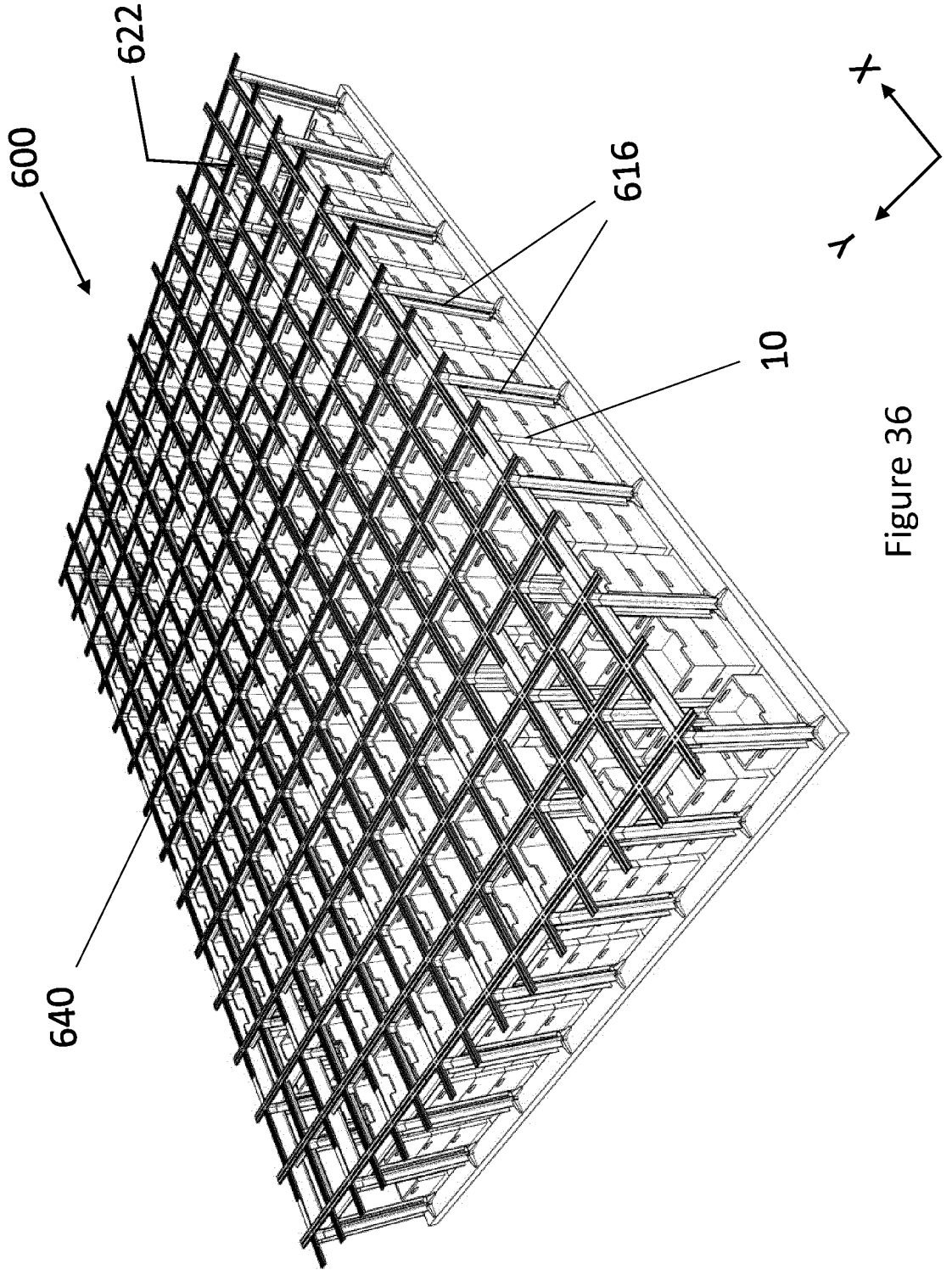
FIG. 36 is a perspective view of a storage system comprising a grid framework structure according to the sixth embodiment of the present invention.

In comparison to the prior art, where an individual storage column comprises a group of four vertical uprights arranged in a grid like pattern as shown in FIG. 6, in the particular embodiment of the present invention shown in FIG. 33, an individual storage column 644 comprises two vertical uprights 616 that are arranged in a pattern such that diagonally opposing corners or edges of a container or storage bin are accommodated by only two vertical uprights 616. Thus, where each of the four vertical uprights of a given storage column is shared with a neighbouring storage column, in the particular embodiment of the present invention only two vertical uprights 616 are shared with a neighbouring storage column. A single stack of containers 10 is shown in FIG. 35 being stored along diagonally opposing corners of the stack. Reducing the number of vertical uprights whilst still having the ability to guide a container or storage bin in the correct position through a grid cell by guiding the container only along diagonally opposing corners or edges reduces the time and cost to erect the grid framework structure. Moreover, the grid structure 640 would only need to be supported at alternative nodes or intersections 50 in the X and Y direction rather than at every node or intersection. The arrangement of the stacks of containers below the grid structure stays the same but they are only guided along two edges or corners of the containers. This is demonstrated in the storage system 600 shown in FIG. 36. It is clearly apparent in the grid framework structure shown in FIG. 36 that not all of the nodes or intersections of the grid members are supported by a vertical upright 616. Using the terminology of the directions of the grid members discussed above with reference to FIG. 1, alternate nodes or intersections of the grid members in the first direction are supported by a vertical upright. Equally, alternate nodes or intersections of the grid members in the second direction are supported by a vertical upright.

The first direction and the second direction could represent the X and Y direction of the grid structure.

Grid Level

In all of the embodiments shown in FIGS. 13 to 36, an adjustable foot (not shown) having a threaded shaft that can be extended or retracted, can optionally be provided at each of the vertical uprights or the mounting between the vertical uprights and the grid structure to compensate for an uneven floor. In a preferred embodiment of the present invention, the lower end of one or more of the vertical uprights in a grid framework structure is anchored to a floor, e.g. a concrete foundation, by an anchor foot. The anchor foot is secured to the flooring by one or more anchor bolts. Various types of anchor feet to rigidly anchor the vertical uprights to the floor are applicable in the present invention. The anchor foot functions to bear the load of the vertical upright and any bracing load of the vertical uprights. An example of an anchor foot 700 is shown in FIG. 37 and is an example where the anchor foot 700 has been topology optimised within given physical constraints based on the load experienced at the base of the vertical upright. In the particular embodiment of the present invention shown in FIG. 37 (a and b), the anchor foot 700 has two anchor points 702 for bolting the anchor foot 700 to the floor or a concrete foundation and an opening 704 for receiving the lower end of a vertical upright 716 whereupon the lower end is inserted into the opening 704. The lower end of the vertical upright 716 is secured to the anchor foot 700 by an additional two bolts 706 (see FIG. 37b).

As one or more load handling devices are operative on the grid structure, it is paramount that the grid structure lies in a substantially horizontal plane as this will affect the direction in which the containers or storage bins are hoisted into the correct position through a grid cell. As the level of the grid structure deviates from the horizontal plane, this will not only put a strain on the one or more load handling devices travelling on the grid structure but will cause the lifting tethers to sway to one side depending on the direction of deviation and in a worst case scenario, cause the grabber device to fail to engage with the container or storage bin below. The problem is exacerbated when the floor on which the grid framework structure is installed is uneven. The problem is particularly exacerbated when the grabber device and the containers are not guided by the vertical uprights as in the present invention, i.e. the stacks of containers are stored in free space. Traditionally, the level of the grid structure mounted on the vertical uprights is adjusted by having an adjustable levelling foot at the base or lower end of the vertical uprights to compensate for an uneven floor. The level of the grid structure is adjusted by successively adjusting the adjustable levelling foot at the base of one or more vertical uprights in a grid framework structure and checking the level of the grid structure at the top of the grid structure each time an adjustment is made, e.g. by use of a suitable levelling measurement instrument such as a laser level commonly known in the art. In a majority of cases, this requires the use of specialist tooling to rotate a threaded shaft to allow the height of the adjustable levelling foot to be varied. However, the problem with this approach is the separation between the adjustable foot and the grid structure, which can be in excess of 21 containers or storage bins high, making incremental adjustments to the level of the grid structure at the uppermost level laborious and time consuming due to this separation. Moreover, the weight and the changeable forces to which the grid framework structure is continuously subjected during its operation may cause the initially level grid structure to become uneven over time, requiring the level of the grid structure to be periodically adjusted. This requires a user to identify the area of unevenness in the grid structure and to adjust the base of the grid framework structure, which involves adjusting one or more adjustable levelling feet at the base of one or more vertical uprights and periodically inspecting the level of the grid structure on top. The time and effort to periodically inspect the level of the grid structure at the top of the structure and adjust the adjustable levelling feet at the base of the grid framework structure becomes a problem as the inspection of the level of the grid is not truly being carried out in real time or contemporaneously where the adjustments are being made.

Figure 38:
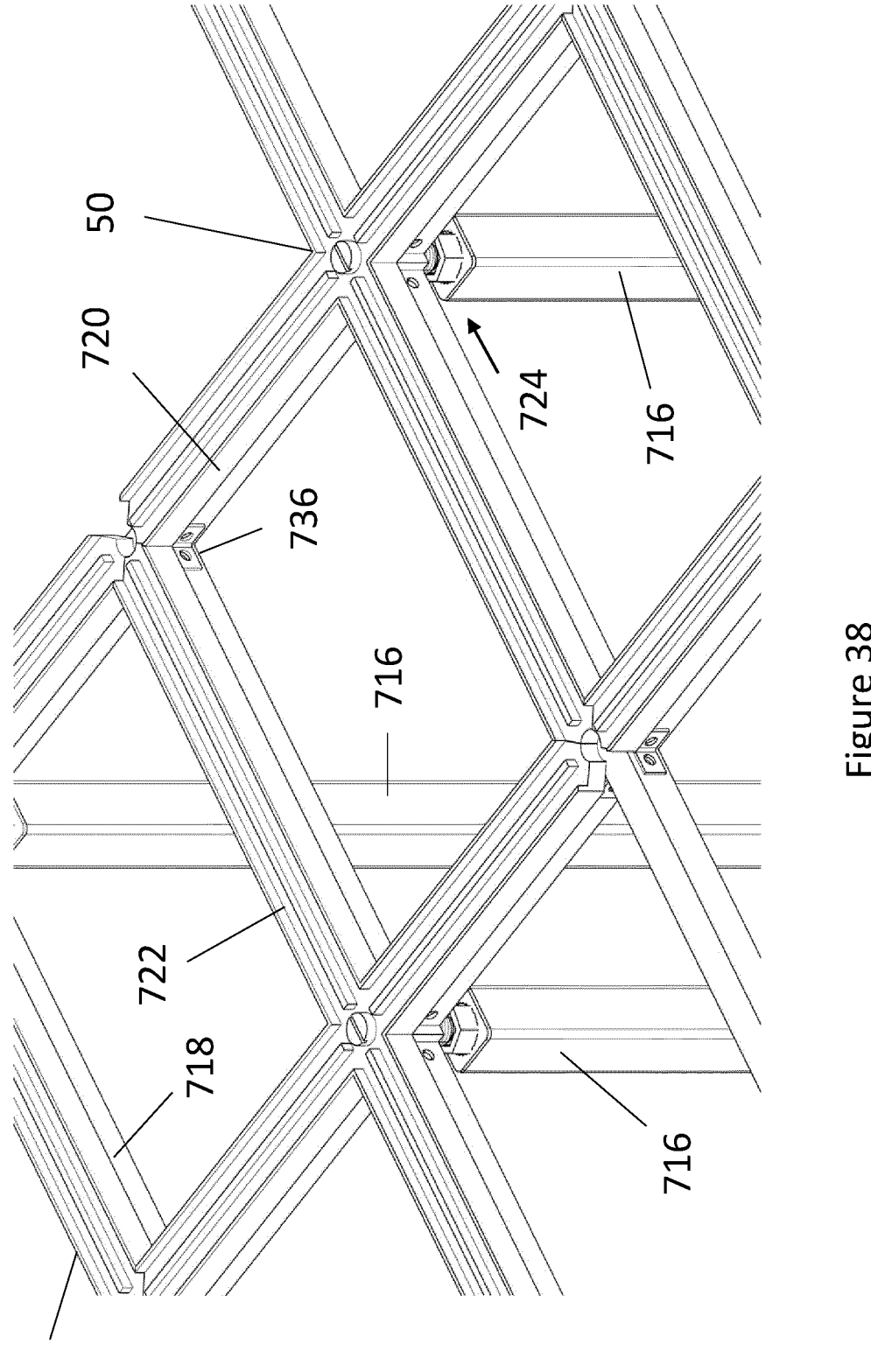
FIG. 38 is a perspective view of a section of the grid framework structure according to the sixth embodiment of the present invention showing the mounting of the grid structure to the vertical uprights by an adjustable grid levelling mechanism.

To overcome this problem, an adjustable grid levelling mechanism is interposed between the top of the vertical upright and the grid structure. This allows the adjustment of the grid level to be made at the point where the measurement of the grid level is being carried out. Thus, adjustments of the grid level can be made in-situ or in real time as it is measured. An example of transferring the adjustable grid levelling mechanism to the connection at the upper end of the vertical upright is shown in FIG. 38 and represents the embodiment (sixth embodiment) where the grid structure 740 is supported at alternate nodes or intersections where the grid members intersect in the grid structure 740. In the particular embodiment of the present invention shown in FIG. 38, the grid members 718, 720 comprise a track support having a box cross-sectional shape that are connected together at a node or an intersection 50 by a suitable connecting joint 724. In the particular embodiment of the present invention, the connecting joint is an adjustable grid levelling mechanism 724. Detail of the adjustable grid levelling mechanism 724 is discussed below with reference to FIG. 41.

Figure 39:
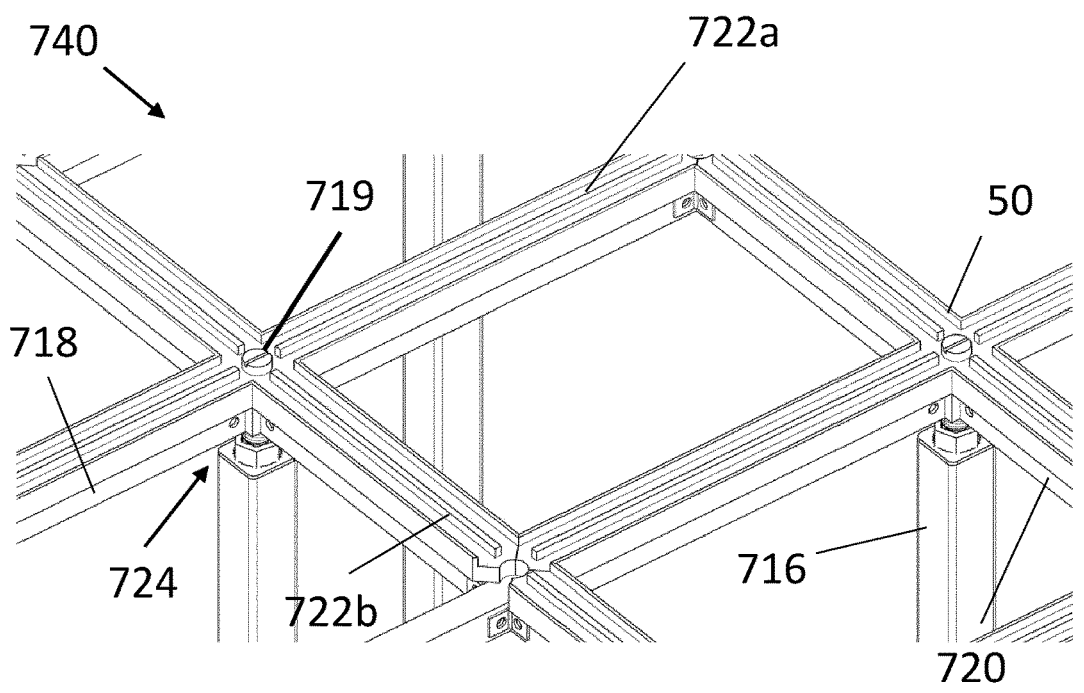
FIG. 39 is a perspective view of a section of the grid framework structure showing the tracks fastened to the track supports according to the embodiment of the invention shown in FIG. 38.
Figure 40:
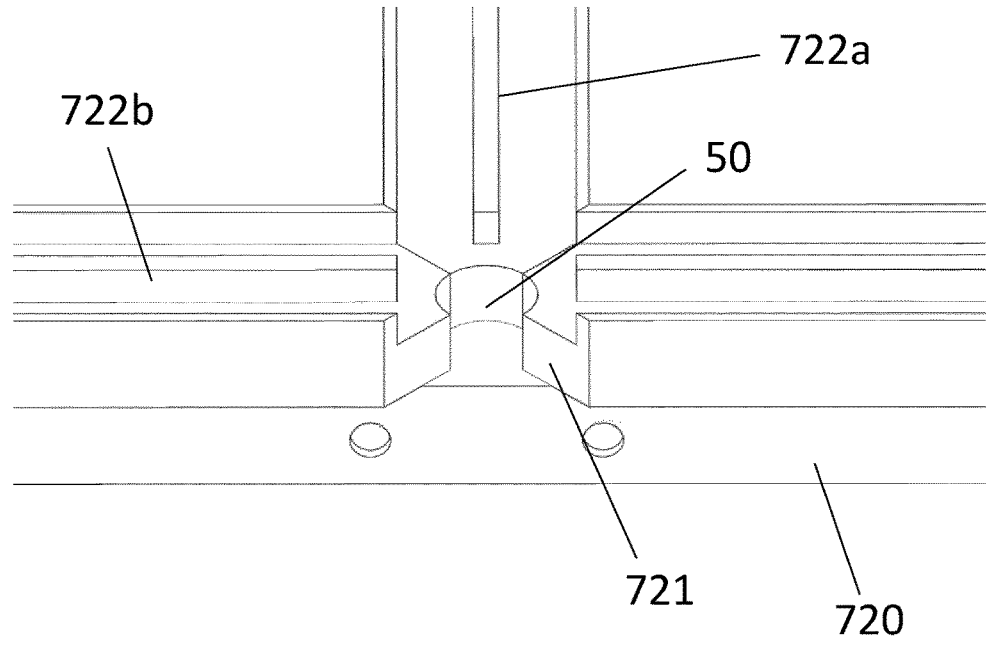
FIG. 40 is an enlarged view of the connections of the tracks at the nodes according to the embodiment shown in FIG. 39.

Tracks 722a, 722b are mounted to the tracks supports 718, 720 to guide one or more load handling devices on the grid structure 740. One or more fasteners 719 can be used to secure the tracks 722a, 722b to the track supports 718, 720. The tracks 722a, 722b are secured to the track supports 718, 720 at the nodes 50 where the track supports 718, 720 intersect in the grid structure 740. In the particular embodiment shown in FIG. 39, the tracks 722a, 722b are secured to the track supports 718, 720 by a threaded bolt 719 which threadingly engaging with an adjustable grid levelling mechanism 724. Also shown in FIG. 39 and clearly shown in FIG. 40 is that the end 721 of the tracks are V shaped with a substantially 45° angle that meet where the tracks intersect at a node 50 of the grid structure to provide a stable joint. The V shape ends of the tracks improves the stability of the tracks at the intersections where the tracks meet at the node. The V shaped ends of the tracks are primarily at the nodes where the grid structure is unsupported by a vertical upright as demonstrated in FIG. 40.

Figure 41:
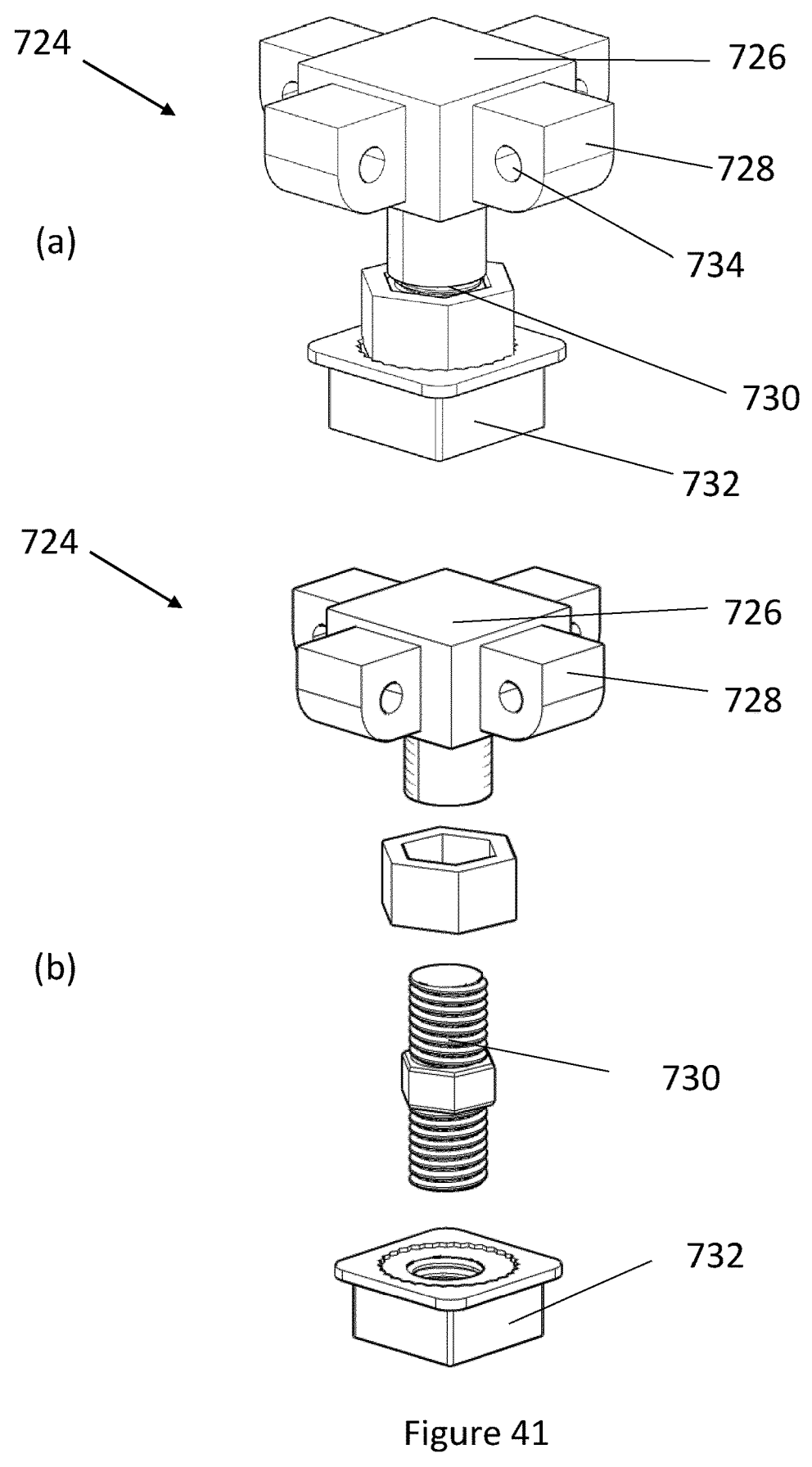

As an alternative to the cap plate discussed above with reference to FIG. 8, the connecting joint or adjustable grid levelling mechanism 724 comprises a head 726 comprising nodules or shaped bosses 728 mounted to a central post or shaft 730 (see FIG. 41). The nodules or shaped bosses 728 are receivable in the box section at an open end of a track support 718, 720 at an intersection or node of the grid structure (see FIG. 38). Four nodules or bosses 728 are shown extending in perpendicular directions from the central post or shaft 730 and arranged to be receivable in four track supports at a node or intersection 50. The central post 730 threadingly engages with an insert 732 that is receivable in the hollow centre section of a vertical upright 716. The central post 730 can be extended or retracted relative to the insert to adjust the height of the head and thus, the level of the grid structure at a node or intersection. FIG. 41(*a*) shows the head 726 of the connecting joint 724 in a retracted configuration and FIG. 41(*b*) shows the head 726 of the connecting joint 724 in an extended configuration relative to the insert. The threaded post or shaft 730 can be extended or retracted relative to the insert to adjust the height and thus, level of the track support mounted thereon. To further secure the track support to the connecting joint 724 once the nodule or boss 728 of the head 726 is received into a box section of the track support, each of the nodules comprise a hole 734 for receiving a bolt that is threaded through a hole in the track support 718, 720 proximal to its end. The connecting joint 724 is used to join the track support 718, 720 to a vertical upright 716 at alternate intersections or nodes 50 of the grid structure 740. An L-shaped bracket 736 can be used to join track supports 718, 720 at the other nodes or intersections which are not supported by a vertical upright (see FIG. 38). The ends of the tracks 722a, 722b butt up against each other in the grid structure 740 at the junction where the tracks supports 718, 720 are unsupported by a vertical upright. As discussed above, the end of the tracks 722a, 722b are V shaped to provide lateral stability to the ends of the track 722a, 722b in the grid structure 740 (see FIG. 40).

Interposing an adjustable grid levelling mechanism between the grid structure and the upper end of the vertical upright can be applied to all of the embodiments of the present invention described with reference to FIGS. 13 to 36. The adjustable grid levelling mechanism interposed between the grid structure and the upper end of the vertical upright can be used in conjunction with an additional adjustable grid levelling mechanism at the foot or lower end of the vertical upright. For example, coarse levelling adjustments can be made at the foot of one or more vertical uprights and the finer grid levelling adjustments can then be made at the grid structure.

In all of the embodiments of the present invention described with reference to FIGS. 13 to 41, a section of a grid structure comprising four adjoined grid cells is supported by five or fewer vertical uprights.

Further features of the present invention include:—

A. A grid framework structure configured to support one or more load handling devices thereupon comprising:

a truss assembly comprising a plurality of spaced apart parallel trusses lying in a horizontal plane, each of the plurality trusses comprising an upper chord and a lower chord connected together by one or more diagonal braces and/or one or more straight vertical members, the plurality of trusses are connected together by a plurality of straight parallel upper cross members extending in a first direction, the plurality of straight parallel upper cross members connecting the plurality of trusses are spaced apart along the longitudinal length of each of the plurality of trusses in a second direction, the first direction being substantially perpendicular to the second direction such that the upper chords of the plurality of trusses and the plurality of straight parallel upper cross members connecting the plurality of trusses are arranged in a grid like pattern to form a grid structure comprising a plurality of grid cells, the grid structure comprises a plurality of tracks or rails for a load handling device to move one or more containers on the grid structure, wherein the truss assembly is supported above the ground by a plurality of vertical uprights to create a storage space for the storage of one or more containers in a stack such that, in use, one or more load handling devices operative on the grid structure is able to lift one or more containers through a grid cell from a stack below the grid structure.

B. The grid framework structure of feature A, wherein the upper chords of neighbouring trusses are connected together by the plurality of straight parallel upper cross members.

C. The grid framework structure of feature A or B, wherein neighbouring trusses are connected together a plurality of straight parallel lower cross members.

D. The grid framework structure of feature C, wherein the lower chords of neighbouring trusses are connected together by the plurality of straight parallel lower cross members.

E. The grid framework structure of feature D, wherein the plurality of straight parallel lower cross members connecting the plurality of trusses are spaced apart along the longitudinal length of each of the plurality of trusses in the second direction such that the lower chords of the plurality of trusses and the plurality of straight parallel lower cross members extending between the plurality of trusses are arranged in a grid like pattern to form a grid structure comprising a plurality of grid cells that cooperates with the grid structure formed by the upper chords and the plurality of straight parallel upper cross members.

F. The grid framework structure of any of the features A to E, wherein the one or more diagonal braces are arranged to form a K brace between the upper chord and the lower chord.

G. The grid framework structure of any of the features A to F, wherein the plurality of tracks are mounted to the upper chords and to the plurality of straight parallel upper cross members extending between the upper chords.

H. The grid framework structure of feature G, wherein the plurality of tracks are snap fitted to the upper chords and the plurality of straight parallel upper cross members extending between the upper chords.

I. The grid framework structure of any of the features A to F, wherein the plurality of tracks are integrated to the upper chords and the plurality of straight parallel upper cross members extending between the upper chords.

J. The grid framework structure of any of the features A to I, wherein the truss assembly is supported by at least one of the plurality of vertical uprights at the corners of the truss assembly.

K. The grid framework structure of feature J, wherein the at least one of the plurality of vertical upright at the corners of the truss assembly are braced by at least one bracing member such that the at least one bracing member extends between the at least one of the plurality of vertical uprights at the corners of the truss assembly.

L. The grid framework structure of feature K, wherein the at least one bracing member is a diagonal bracing member.

M. The grid framework structure of feature K or L, wherein four vertical uprights are arranged at four corners of the truss assembly to form a substantially cuboid structure.

N. The grid framework structure of any of the features J to M, wherein the at least one of the plurality of vertical upright at the corners of the truss assembly comprises an adjustable foot for adjusting the height of the grid structure.

O. The grid framework structure of any of the features A to N, wherein at least one of the plurality of trusses is moulded or extruded.

P. The grid framework structure of feature O, wherein the at least one of the plurality of trusses is fabricated from a fibre reinforced composite material.

Q. The grid framework structure of feature O or P, wherein the at least one of the plurality of trusses is composed of a polymer material.

R. The grid framework structure of any of the features A to Q, wherein the upper chord and/or the lower chord of at least one of the plurality of trusses is tubular or an I-beam.

S. A grid framework structure comprising:
   i) a first modular storage unit frame arranged to define a first storage volume when assembled for the storage of a plurality of stacks of containers,
   ii) a second modular storage unit frame arranged to define a second storage volume when assembled for the storage of a plurality of stacks of containers, wherein the first modular storage unit frame and the second modular storage unit frame are configured to be arranged together to define a storage volume comprising at least a portion of the first storage volume and the second storage volume,
   iii) a grid structure comprising a first set of grid members extending in a first direction and a second set of grid members extending in a second direction, the first direction being substantially perpendicular to the second direction to form a grid pattern comprising a plurality of grid cells,
   wherein the grid structure is mounted to at least one of the first modular storage unit frame and the second modular storage unit frame such that the at least one of the first modular storage unit frame and the second modular storage unit frame supports a plurality of grid cells so that, in use, a load handling device operative on the grid structure is able to retrieve a container from the storage volume.

T. The grid framework structure of feature S, wherein the first modular storage unit frame and the second modular storage unit frame are configured to be arranged side-by-side or stacked.

U. The grid framework structure of feature T, wherein the grid structure extends across the first modular storage unit frame and the second modular storage unit frame.

V. The grid framework structure of any of the features S to U, wherein each of the first modular storage unit frame and the second modular storage unit frame comprises a container frame comprising four vertical uprights arranged in a substantially rectangular cuboid shape braced together by at least one bracing member.

W. The grid framework structure of feature V, wherein the at least one bracing member is a straight bracing member and/or a diagonal bracing member.

X. The grid framework structure of any of the features P to S, wherein the first modular storage unit frame and the second modular storage unit frame are coupled together at one or more connection faces of the first modular storage unit frame and the second modular storage unit frame.

Y. The grid framework structure of any of the features P to T, wherein each of the first modular storage unit frame and the second modular storage unit frame is flat packed.

Z. A storage system comprising:
   i) a grid framework structure as defined in any of the features S to Y;
   ii) a plurality of a stack of containers located below the grid structure, wherein each of the stack of containers occupies a single grid space or grid cell;
   iii) one or more load handling devices remotely operated to move the one or more containers stored in the grid framework structure, each of the one or more load handling devices comprises:

i) a wheel assembly for guiding the load handling device on the grid structure;

ii) a container-receiving space located above the grid structure; and iii) a lifting device arranged to lift a single container from a stack into the container-receiving space.

The invention claimed is:

1. A grid framework structure configured to support one or more load handling devices thereupon, said grid framework structure comprising:

i) a first set of grid members extending in a first direction and a second set of grid members extending in a second direction, the first direction being substantially perpendicular to the second direction, to form a grid structure containing a plurality of grid cells lying in a horizontal plane, wherein the first set of grid members and the second set of grid members intersect at nodes; and ii) a plurality of vertical uprights for supporting the grid structure above ground to create a storage space for storage of one or more containers in a stack such that, when in use, one or more load handling devices operative on the grid structure can lift one or more containers through a grid cell from a stack below the grid structure, wherein the plurality of vertical uprights are arranged such that a section of the grid structure containing four adjoined grid cells is supported by five or fewer vertical uprights and the plurality of vertical uprights are arranged to support the grid structure at alternate nodes in the first direction and in the second direction and the plurality of vertical uprights are arranged for guiding the one or more containers in a stack along a pair of diagonally opposing corners of the one or more containers.

2. The grid framework structure of claim 1, wherein the section of the grid structure 40 comprises a corner section of the grid structure.

3. The grid framework structure of claim 1, wherein the grid structure has a rectangular or square configuration comprising:

four corner sections, each corner section being supported by a single vertical upright.

4. The grid framework structure of claim 3, wherein the vertical uprights are braced together by at least one bracing member.

5. The grid framework structure of claim 4, wherein the at least one bracing member extends longitudinally between tops of the vertical uprights to form a substantially rectangular or square perimeter bracing structure or frame.

6. The grid framework structure of claim 4, wherein the at least one bracing member is a diagonal bracing member or a straight horizontal bracing member.

7. The grid framework structure of claim 2, wherein the plurality of vertical uprights comprises:

four vertical frame members arranged in a rectangular or square configuration to define one or more grid cells for one or more containers to be stacked between the four vertical frame members.

8. The grid framework structure of claim 7, comprising: at least one diagonal bracing member, wherein a pair of the four vertical frame members are braced together by the at least one diagonal bracing member.

9. The grid framework structure of claim 1, comprising: at least one brace member, wherein the vertical uprights are braced together by the at least one brace member extending from each of the vertical uprights to form a modular frame.

10. The grid framework structure of claim 9, comprising: one or more modular frames, wherein the grid structure is supported by the one or more modular frames.

11. The grid framework structure of claim 10, wherein the one or more modular frames are arranged in a stack such that the one or more stacks of containers will extend through the one or more modular frames.

12. The grid framework structure of claim 1, wherein the grid structure supports a plurality of tracks or rails configured for a load handling device to move one or more containers on the grid structure.

13. The grid framework structure of claim 1, wherein said grid structure comprises:

i) an upper grid structure; and ii) a lower grid structure, each of the upper and the lower grid structures including a first set of grid members extending in the first direction and a second set of grid members extending in the second direction to form a plurality of grid cells, the upper grid structure being vertically spaced from the lower grid structure such that grid cells in the upper grid structure are in registration with grid cells in the lower grid structure;

wherein the upper grid structure and the lower grid structure are connected together by a plurality of diagonal and straight bracing members to form an assembly of trusses.

14. The grid framework structure of claim 13, wherein the plurality of diagonal and straight bracing members extend between opposing first and second sets of grid members in the upper grid structure and lower grid structure.

15. The grid framework structure of claim 14, wherein the plurality of diagonal bracing members are arranged to form a K or X brace between the opposing first and second sets of grid members in the upper grid structure and the lower grid structure.

16. The grid framework structure of claim 13, comprising: a plurality of tracks mounted to the upper grid structure.

17. The grid framework structure of claim 16, wherein the first set of grid members comprises:

a first set of track supports, and the second set of grid members comprises:

a second set of track supports; and wherein the plurality of tracks are snap fitted to the first set of track supports and the second set of track supports.

18. The grid framework structure of claim 13, wherein the grid structure has a rectangular or square configuration comprising:

four corner sections, each corner section being supported by a single vertical upright.

19. The grid framework structure of claim 1, wherein the grid structure is fabricated of a fibre reinforced composite material.

20. The grid framework structure of claim 1, wherein the grid structure is fabricated of a polymer material.

21. The grid framework structure of claim 1, wherein the first set of grid members and the second set of grid members are tubular or are an I-beam.

22. A storage system including a grid framework structure according to claim 1, the storage system comprising:

a plurality of stacks of containers located below the grid structure, wherein each of the stacks of containers occupies a single grid space or grid cell;

one or more load handling devices configured to be remotely operated to move the one or more containers stored in the grid framework structure, each of the one or more load handling devices including:

i) a wheel assembly for guiding the load handling device on the grid structure;

ii) a container-receiving space located above the grid structure; and iii) a lifting device arranged to lift a single container from a stack into the container-receiving space.

23. The storage system of claim 22, wherein the lifting device comprises:

a lifting drive assembly;

a grabber device configured to, in use, releasably grip a container and lift a container from the stack into the container-receiving space, and a driving mechanism operatively configured and arranged for moving the load handling device on the grid structure.

\* \* \* \* \*